United States Patent
McGregor et al.

(10) Patent No.: US 9,817,138 B2
(45) Date of Patent: Nov. 14, 2017

(54) GAS-FILLED NEUTRON DETECTORS AND IMAGING SYSTEM AND ARRAY OF SUCH DETECTORS

(71) Applicant: Douglas S. McGregor, Riley, KS (US)

(72) Inventors: Douglas S. McGregor, Riley, KS (US); Steven L. Bellinger, Manhattan, KS (US); Kyle A. Nelson, Manhattan, KS (US)

(73) Assignee: Douglas S. McGregor, Riley, KS (US)

( * ) Notice: Subject to any disclaimer, the term of this patent is extended or adjusted under 35 U.S.C. 154(b) by 716 days.

(21) Appl. No.: 13/773,831

(22) Filed: Feb. 22, 2013

(65) Prior Publication Data

US 2013/0228696 A1 Sep. 5, 2013

Related U.S. Application Data

(63) Continuation-in-part of application No. 13/404,751, filed on Feb. 24, 2012, now Pat. No. 8,519,350, which
(Continued)

(30) Foreign Application Priority Data

Aug. 27, 2010 (WO) ................ PCT/US2010/046736

(51) Int. Cl.
*G01T 3/08* (2006.01)
*G01T 3/00* (2006.01)

(52) U.S. Cl.
CPC ................ *G01T 3/008* (2013.01); *G01T 3/00* (2013.01)

(58) Field of Classification Search
None
See application file for complete search history.

(56) References Cited

U.S. PATENT DOCUMENTS

| | | |
|---|---|---|
| 2,986,636 A | 5/1961 | Carlson et al. |
| 4,272,680 A | 6/1981 | Cotic |

(Continued)

FOREIGN PATENT DOCUMENTS

| | | | |
|---|---|---|---|
| JP | 2002181948 A | | 6/2002 |
| RU | 2110080 | * | 4/1998 |
| WO | 2007109535 A2 | | 9/2007 |

OTHER PUBLICATIONS

G.F. Knoll; "Radiation Detector and Measurement" 3rd Ed., Chapter 6 pp. 159-199 and chapter 14 pp. 505-535 (Wiley, New York, 2000).

(Continued)

*Primary Examiner* — Yara B Green
(74) *Attorney, Agent, or Firm* — Brooks Kushman P.C.

(57) ABSTRACT

Gas-filled neutron detectors, an imaging system and an array of such detectors are provided. Surfaces or surface portions incorporated into the gas-filled neutron detectors are coated with and/or composed of at least partially, neutron reactive material. The surfaces may be flat or curved, fins or plates, foils, thin sheets, porous or filamentary material, or semi-solid material or aerogel. The incorporation of the extended surfaces coated with or composed of neutron reactive material increases the neutron detection efficiency of the gas-filled detectors. The surfaces can be made of conductive, semiconductive, semi-insulating, or insulative materials. The surfaces are arranged such that they do not detrimentally detract from the main function of a gas-filled detector with particular attention to gas-filled proportional detectors. The surfaces may be arranged in the detectors to allow for modular construction. The surfaces are designed and arranged such that more than a single reaction product may escape the surface.

60 Claims, 40 Drawing Sheets

Related U.S. Application Data is a continuation-in-part of application No. PCT/US2010/046736, filed on Aug. 26, 2010.

(60) Provisional application No. 61/601,668, filed on Feb. 22, 2012, provisional application No. 61/275,278, filed on Aug. 27, 2009.

(56) References Cited

U.S. PATENT DOCUMENTS

| | | | |
|---|---|---|---|
| 4,365,159 A * | 12/1982 | Young | H01J 47/1244 250/385.1 |
| 4,447,727 A | 5/1984 | Friesenhahn | |
| 4,481,421 A | 11/1984 | Young et al. | |
| 5,973,328 A | 10/1999 | Hiller et al. | |
| 6,175,120 B1 | 1/2001 | McGregor et al. | |
| 6,426,504 B1 | 7/2002 | Menlove et al. | |
| 6,479,826 B1 | 11/2002 | Klann et al. | |
| 6,781,132 B2 | 8/2004 | McGregor | |
| 6,921,903 B2 | 7/2005 | McGregor | |
| 7,002,159 B2 | 2/2006 | Lacy | |
| 7,078,704 B2 | 7/2006 | Lacy et al. | |
| 7,164,138 B2 | 1/2007 | McGregor et al. | |
| 7,233,007 B2 * | 6/2007 | Downing et al. | 250/390.11 |
| 7,910,893 B2 | 3/2011 | Glesius et al. | |
| 7,952,078 B2 | 5/2011 | McCormick et al. | |
| 7,964,852 B2 | 6/2011 | McCormick | |
| 8,084,747 B2 | 12/2011 | Weissman et al. | |
| 8,330,116 B2 | 12/2012 | Lacy | |
| 2003/0034456 A1 | 2/2003 | McGregor | |
| 2003/0152186 A1 | 8/2003 | Jurczyk et al. | |
| 2005/0012048 A1 | 1/2005 | Lacy et al. | |
| 2005/0205798 A1 * | 9/2005 | Downing | G01T 1/167 250/390.11 |
| 2005/0258372 A1 | 11/2005 | McGregor et al. | |
| 2006/0023828 A1 | 2/2006 | McGregor et al. | |
| 2006/0043308 A1 | 3/2006 | McGregor et al. | |
| 2006/0056573 A1 | 3/2006 | McGregor et al. | |
| 2006/0138340 A1 | 6/2006 | Ianakiev et al. | |
| 2006/0291606 A1 | 12/2006 | McGregor et al. | |
| 2007/0018110 A1 | 1/2007 | McGregor et al. | |
| 2008/0315109 A1 | 12/2008 | Stephan et al. | |
| 2009/0302231 A1 | 12/2009 | McGregor et al. | |
| 2010/0155617 A1 * | 6/2010 | Stephan | G01T 1/00 250/382 |
| 2010/0258736 A1 | 10/2010 | McCormick et al. | |
| 2010/0258737 A1 * | 10/2010 | McCormick | G01T 3/008 250/390.01 |
| 2010/0301226 A1 | 12/2010 | Lacy | |
| 2011/0278468 A1 | 11/2011 | Lacy | |
| 2012/0153180 A1 | 6/2012 | Lacy | |

OTHER PUBLICATIONS

R.D. Lowde; "The Design of Neutron Counters Using Multiple Detecting Layers", The Review of Scientific Instruments, 21 (1950) #10 pp. 835-842.

P.M. Dighe, D.N. Prasad, K.R. Prasad, S.K. Kataria, S.N. Athavale, A.L. Pappachan, A.K. Grover; "Boron-Lined Proportional Counters with Improved Neutron Sensitivity," Nuclear Instruments and Methods in Physics Research, A 496 (2003) pp. 154-161.

P.M. Dighe; "New Cathode Design Boron Lined Proportional Counters for Neutron Area Monitoring Applications", Nuclear Instruments and Methods in Physics Research, A 575 (2007) pp. 461 465.

M. Alex, J.P. Singh, D.N. Prasad, and P.K. Mukhopadhyay; "Development of a Gamma Compensated Boron Lined Ionisation Chamber for Reactor Safety and Control Applications", Nuclear Instruments and Methods in Physics Research, A 580 (2007) pp. 1395-1399.

P.M. Dighe and P.K. Mukhopadhyay; "Design and Development of a Wide Range Ion Chamber for Reactor Instrumentation", Nuclear Instruments and Methods in Physics Research, A 614 (2010) pp. 449-452.

D.S. McGregor, M.D. Hammig, H.K. Gersch, Y-H. Yang, and R.T. Klann; "Design Considerations for Thin Film Coated Semiconductor Thermal Neutron Detectors, Part I: Basics Regarding Alpha Particle Emitting Neutron Reactive Films", Nuclear Instruments and Methods in Physics Research, A500 (2003) pp. 272-308.

Preliminary Report on Patentability; International Application No. PCT/US2010/046736; dated Mar. 8, 2012.

International Search Report and Written Opinion; International Application No. PCT/US2010/046736; dated Oct. 20, 2010.

* cited by examiner

GAS-FILLED NEUTRON DETECTORS AND IMAGING SYSTEM AND ARRAY OF SUCH DETECTORS

CROSS-REFERENCE TO RELATED APPLICATIONS

This application claims the benefit of U.S. provisional Application No. 61/601,668 filed Feb. 22, 2012. This application is a continuation-in-part application of U.S. application Ser. No. 13/404,751 filed Feb. 24, 2012 which is a continuation-in-part of U.S. national phase of PCT Appln. No. PCT/US2010/046736, filed Aug. 26, 2010, which claims the benefit of U.S. provisional patent application No. 61/275,278, filed Aug. 27, 2009.

TECHNICAL FIELD OF THE INVENTION

This invention generally relates to gas-filled radiation detectors and, in particular, to gas-filled radiation detectors designed to detect neutrons of various energy ranges in the form of a large vessel with inserts at least partially composed of neutron reactive or absorbing material and imaging system and array of such detectors.

OVERVIEW

Gas-filled detectors are arranged in three various forms, those forms being ion chambers, proportional counters, and Geiger-Mueller counters. Of these basic forms, the proportional counter design is often used as the fundamental instrument for a gas-filled neutron detector. Proportional counters rely upon avalanche multiplication in the gas to produce large electronic signals, each signal being proportional to the energy deposited in the detector chamber. Quite differently, ion chambers do not produce avalanche multiplication and Geiger-Mueller counters produce excessive avalanching such that the electronic signal is no longer proportional to the energy deposited in the chamber.

Gas-filled proportional counters used for neutron detectors can be further subdivided into two types, those being detectors filled with a neutron reactive gas and those detectors that are coated with a neutron reactive material. Neutron interactions in either the neutron reactive gas or the neutron reactive coating eject energetic charged particles that create ionization in the detector gas. A voltage applied to the gas chamber causes the ions and electrons to move, and this ionization is subsequently measured as a current, thereby, indicating a neutron interaction occurred.

The most popular type of gas-filled neutron detector is the type filled with a neutron reactive gas. However, in recent times, these neutron reactive gases have been deemed hazardous, as is the case for $BF_3$, or have become rare and difficult to acquire, as is the case for $^3He$. The gas-filled neutron detector design with neutron reactive materials coating the walls does not suffer from these issues, yet these coated detectors have an intrinsic problem in that they are limited to relatively low neutron detection efficiency. The low detection efficiency is a direct result of the reaction products having a limited range in the coating, hence any coating thicker than the reaction product particle ranges simply absorbs all of the particle energy, which is therefore not transferred to the detecting gas.

The converter films attached to gas-filled proportional counters most often used for neutron detection utilize either the $^6Li(n,t)^4He$ reaction or the $^{10}B(n,\alpha)^7Li$ reactions. Due to low chemical reactivity, the most common materials used are pure $^{10}B$ and $^6LiF$. Neutron reactive films based on the $^{157}Gd(n,\gamma)^{158}Gd$ reaction show a higher neutron absorption efficiency than $^{10}B(n,\alpha)^7Li$ and $^6Li(n,t)^4He$-based films, however the combined emission of low energy gamma rays and conversion electrons from $^{157}Gd(n,\gamma)^{158}Gd$ reactions make neutron-induced events difficult to discriminate from background gamma-ray events. As a result, Gd-based films are less attractive for devices where background gamma ray contamination is a problem. Alternatively, the particle energies emitted from the $^6Li(n,t)^4He$ and the $^{10}B(n,\alpha)^7Li$ reactions are relatively large and produce signals easily discernible from background gamma ray noise. Thus far, thermal neutron detection efficiencies have been limited to only 4% for $^6LiF$ and $^{10}B$ single-coated devices. However, devices that utilize pure $^6Li$ as the converter can have efficiencies as high as 13% for a single coated device. Unfortunately, pure Li decomposes rapidly in most circumstances, making a pure Li coated device impractical at present. As a result the most commonly used neutron converter films are B and LiF, both of which are poor electrical conductors. There are some cases in which fissionable material, such as $^{235}U$, $^{238}U$ and $^{232}Th$ are used in gas-filled detectors, yet these same coatings are generally used for gas-filled ion chambers.

The $^{10}B(n,\alpha)^7Li$ reaction leads to the following reaction products:

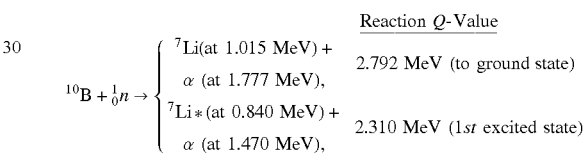

which are released in opposite directions when thermal neutrons (0.0259 eV) are absorbed by $^{10}B$. After absorption, 94% of the reactions leave the $^7Li$ ion in its first excited state, which rapidly de-excites to the ground state (~$10^{-13}$ seconds) by releasing a 480 keV gamma ray. The remaining 6% of the reactions result in the $^7Li$ ion dropping directly to its ground state. The microscopic thermal neutron absorption cross-section is 3840 barns. Additionally, the microscopic thermal neutron absorption cross-section decreases with increasing neutron energy, with a dependence proportional to the inverse of the neutron velocity (1/v) over much of the energy range.

The $^6Li(n,\alpha)^3H$ reaction leads to the following products:

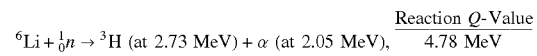

which again are oppositely directed if the neutron energy is sufficiently small. The microscopic thermal neutron (0.0259 eV) absorption cross-section is 940 barns. The thermal neutron absorption cross-section also demonstrates a 1/v dependence, except at a salient resonance above 100 keV, in which the absorption cross-section surpasses that of $^{10}B$ for energies between approximately 150 keV to 300 keV. Additional resonances characteristic to either isotope cause the absorption cross-section to surpass one or the other as the neutron energy increases. Due to its higher absorption cross-section, the $^{10}B(n,\alpha)^7Li$ reaction leads to a generally higher reaction probability than the $^6Li(n,t)^4He$ reaction for neutron energies below 100 keV. However, the higher energy reaction products emitted from the $^6$Li(n,t)$^4$He reaction lead to greater ease of detection than the particles emitted from the $^{10}$B(n,$\alpha$)$^7$Li reaction.

The term "effective range" (denoted L) is the distance through which a particle may travel within the neutron reactive film before its energy decreases below the set minimum detectable threshold, or rather, before its energy decreases below the electronic lower level discriminator (LLD) setting. The term does not take into account additional energy losses from interface "dead regions". The neutron reaction products released do not have equal masses, and therefore do not have equal energies or effective ranges. Neutrons may interact anywhere within the reactive film, and the reaction products lose energy as they move through the neutron reactive film. Reaction product self-absorption reduces the energy transferred to the detector gas, and ultimately limits the maximum film thickness that can be deposited in the detector. The measured voltage signal is directly proportional to the number of ion pairs excited within the detector gas. Reaction products that deposit most or all of their energy in the detector will produce much larger voltage signals than those reaction products that lose most of their energy before reaching the detector.

The energy absorbed in the detector is simply the original particle energy minus the combined energy lost in the reactive absorber film and the detector contact during transit. At any reaction location within the reactive film, a reduced energy will be retained by either particle that should enter the detector gas, being the maximum possible from the interaction location if the trajectory is orthogonal to the film/gas interface. Hence, if the interaction occurs in the $^{10}$B film at a distance of 0.5 µm away from the detector gas, the maximum energy retained by the $^7$Li ion when it enters the detector gas will be 430 keV, and the maximum energy retained by the alpha particle will be 1150 keV. For the same interaction distance of 0.5 µm from the detector gas, the energy retained by the particle when it reaches the detector gas decreases as the angle increases from orthogonal (>0°). Given a predetermined minimum detection threshold (or LLD setting), the effective range (L) for either particle can be determined. For instance, an LLD setting of 300 keV yields $L_{Li}$ as 0.810 microns and $L_\alpha$ as 2.648 microns. Similar conditions exist for $^6$LiF and $^6$Li films.

A commonly used geometry involves the use of a cylindrical gas-filled detector over which a neutron reactive film has been deposited inside the cylinder. Assuming that the neutron beam is perpendicular to the cylinder wall and reactive film, the sensitivity contribution for a reaction product species can be found by integrating the product of the neutron interaction probability and the fractional solid angle, defined by the reaction product effective ranges subtending the device interface, which yields:

$$S_p(D_F) = 0.5 F_p \left\{ \left(1 + \frac{1}{\Sigma_F L}\right)(1 - e^{-\Sigma_F D_F}) - \frac{D_F}{L} \right\} \text{ for } D \leq L, \quad (1A)$$

and $$S_p(D_F) = 0.5 F_p e^{-\Sigma_F (D_F - L)} \left\{ \left(1 + \frac{1}{\Sigma_F L}\right)(1 - e^{-\Sigma_F L}) - 1 \right\} \text{ for } D_F > L, \quad (1B)$$

where $\Sigma_F$ is the macroscopic neutron absorption cross-section, $D_F$ is the film thickness, and $F_p$ is the branching ratio of each reaction product ion. The total sensitivity accordingly can be found by adding all of the reaction product sensitivities $$S(D_F)|_{Total} = \sum_{p=1}^{N} S_p(D_F), \quad (2)$$

where N is the number of different reaction product emissions. In the case of $^{10}$B-based films, N equals 4. Notice from equation 1B that the value of $S_p$ reduces as $D_F$ becomes larger than the value of L. As a result of this, there will be an optimum neutron reactive film thickness for front-irradiated detectors. Because the minimum particle detection threshold determines the effective range (L), the optimum film thickness is also a function of the LLD setting. A similar case exists for read irradiated reactive films. For the case of a detector tube With the LLD set at 300 keV, the maximum achievable thermal neutron detection efficiency is 3.95% for neutron entering the detector. The attenuation, however, is 10%, meaning the 10% of thermal neutron would be absorbed, but of those absorptions, only 39.5% of them result in a reaction product entering the detector gas with enough energy to be detected. The remaining 90% of the neutrons proceed to the other side of the detector tube and once again intersect the reactive film. Another 10% of the remaining neutrons (90%) are absorbed with approximately 40% producing detectable reaction products. Overall, the total thermal neutron detection efficiency is 100[(0.4)(0.1)+(0.9)(0.1)(0.4)]%=7.6%. The thermal neutron detection efficiency can be increased to 9% by lowering the LLD setting to nearly zero, but only at the expense of accepting more system noise and gamma-ray background interference. Similar cases exist for $^6$LiF and pure $^6$Li films. Using an LLD setting of 300 keV, obverse detector irradiation yields maximum thermal neutron detection efficiencies of 4.3% for $^6$LiF-coated devices and 11.6% for pure $^6$Li-coated devices. Hence, neutrons entering and exiting the gas detector are limited to a total efficiency of approximately 8.2% for LiF coatings and 22% for Li metal coatings.

General Operation

Gas detectors can be operated in pulse mode or current mode. Pulse mode is generally used in low to moderate radiation fields. In such a case, a single radiation quantum, such as an alpha particle, beta particle or gamma ray, interacts in the chamber volume, giving rise to an ionized cloud. The charge carriers drift apart, and as they move they induce current to flow to the device terminals; a charging circuit, usually consisting of a preamplifier and feedback loop, integrates the current and stores the charge, thereby producing a voltage potential. This voltage is measured as a single event, indicating that a single radiation quantum has been detected. The preamplifier circuit is subsequently discharged and reset, allowing the device to measure the next radiation interaction event. Hence, each voltage pulse from the detector indicates an individual radiation interaction event. Although extremely useful, there are drawbacks to this method. Should another radiation interaction occur while the detector is integrating or discharging the current from a previous interaction event, the device may not, and usually does not, record the new interaction, a condition referred to as pulse pile up. The time duration in which a new pulse cannot be recorded is the detector recovery time, sometimes referred to as dead time. A pulse mode detector operated in low radiation fields has little problem with dead time count losses; however, a detector operated in high radiation fields may have significant dead time losses, thereby yielding an incorrect measurement of the radiation activity in the vicinity.

For high radiation fields, gas detectors are operated in current mode, in which the radiation induced current is measured on a current meter. Under such conditions, many interactions can occur in the device in short periods of time, and the current observed increases with total radiation exposure rate. Hence, current mode can be used to measure high radiation fields, with the magnitude of the current being a measure of the radiation induced ionization rate in the detector, thereby giving a measure of the radiation field in which the device is being operated. The disadvantage of current mode is that it does not identify individual radiation interactions.

FIG. 2 illustrates a gas-filled detector similar to that first explored by Geiger and Rutherford. The detector is exposed to directly ionizing radiation, which would include α-particles and β-particles. Either of these particles can cause ionization in the gas-filled device, thereby, producing electron-ion pairs. Hence, there are both an absorber and an observable, so that to produce a radiation detector only a method is needed to measure the amount of ionization. Suppose the device is connected to a simple electrometer so as to measure the current produced by the motion of the electron-ion pairs. Without an applied voltage, the electron-ion pairs diffuse randomly in all directions and eventually recombine. As a result, the net current from the electrometer is zero. Now apply a positive voltage to the thin wire of the device, or anode, so that the free electrons (negative charge) drift towards the anode and the free ions (positive charge) drift towards the detector wall. At low voltages, some measurable current is seen, yet considerable recombination still occurs, which is the recombination region identified as Region I in FIG. 1. As the voltage is increased, electron-ion pair separation becomes more efficient until practically no recombination occurs. Hence, the current measured is a measure of the total number of electron-ion pairs formed, which is Region II of FIG. 1, and is referred to as the ionization chamber region.

As the voltage is increased further, the electrons gain enough kinetic energy to create more electron-ion pairs through impact ionization. This provides a mechanism for signal gain, often referred to as gas multiplication. As a result, the observed current increases as the voltage increases, but is still proportional to the energy of the original radiation particle. This multiplication occurs in Region IIIa, the proportional region. Increasing the applied voltage further causes disproportional current increases to form, marked in FIG. 1 as Region IIIb, beyond which, in Region IV, all currents, regardless of origin, radiation species or energies, are the same magnitude. Region IV is the Geiger-Mueller region. Finally, excessive voltage drives the detector into Region V where the voltage causes sporadic arcing and other spontaneous electron emissions to occur, hence causing continuous discharging in the detector. Gas detectors should not be operated in the continuous discharge region.

Neutron-Sensitive Proportional Counters

As with the ion chamber, proportional counters that are either coated with a strongly absorbing neutron reactive material or are filled with a neutron reactive gas can be used as neutron detectors. The most commonly used materials for proportional counter neutron detectors are the gases $^3$He and $^{10}$BF$_3$, and the solid $^{10}$B. Although neutron sensitive, neither $^{10}$BF$_3$ nor $^3$He are ideal proportional gases, but they perform adequately well. Because the device operates in proportional mode, a low resolution spectrum associated with the reaction product energies of the $^{10}$B(n,α)$^7$Li reactions or the $^3$He(n,p)$^3$H reactions can be identified, depending on the gas used in the counter. This prior art type of gas-filled neutron detector is depicted in FIGS. 3 and 4.

Shown in FIG. 3 is a prior art gas flow detector in which a neutron reactive gas 6 is constantly purged through the detector chamber composed of cathode walls 1 and lid 2. Voltage is applied to the electrodes 5, typically operated as the anodes. A neutron 8 enters the detector through a thin membrane 7 into the reactive gas 6 and is absorbed. The reaction results in the instantaneous emission of reaction products 9 which cause ionization 11 in the gas 6. The electrons are drawn towards the anodes 5, which cause a Townsend avalanche and voltage output pulse.

Shown in FIG. 4 is a prior art gas-filled detector in which a neutron reactive gas 6 is sealed in detector chamber composed of a cylindrical cathode 1. Voltage is applied to the electrode 5, typically operated as the anode. A neutron 8 enters the detector through the cathode wall 1 into the reactive gas 6 and is absorbed. The reaction results in the instantaneous emission of reaction products 9 which cause ionization 11 in the gas 6. The electrons are drawn towards the anode 5, which cause a Townsend avalanche and voltage output pulse.

The neutron detection efficiency can be increased by increasing the gas pressure of the counter, hence providing more neutron absorber. Typical pressures range from 1 atm to 10 atm. Electron and ion velocities decrease inversely proportional to gas pressure; consequently, increasing the gas pressure in the tube causes the counter dead time to increase. Gas-filled tubes come in a variety of sizes, ranging from small chambers only a few cm long and one cm in diameter to large chambers several feet long and several inches in diameter.

Unfortunately $^3$He is relatively rare gas that has become expensive in recent times, thereby, driving up the cost of these gas-filled detectors. Further, $^{10}$BF$_3$ is a poisonous gas and does have certain health risks associated with their production, use and disposal.

A better proportional gas such as P-10, a gas that is non-reactive with neutrons, may be used in the chamber if, instead of filling the chamber with a neutron reactive gas, the walls are coated with $^{10}$B. Unfortunately, the spectral features from such a device are harder to interpret due to interference from background gamma rays, and the total neutron detection efficiency is limited by the thinness of the optimum $^{10}$B absorber coating, typically only 2 to 3 microns thick.

Shown in FIG. 5 is a common design for a coated proportional counter used for neutron detection, in which a neutron reactive coating 12 is on the cathode wall 1. The detector is filled with a gas 13 generally not reactive with neutrons. Neutrons are absorbed in the reactive coating 12 which results in the emission of ionizing reaction products 9. Due to the geometry, and the fact that the reaction products are emitted in opposite directions, only one of the reaction products 9 can enter the detector gas. The result is a decreased amount of energy deposited in the detector than the total Q value of the reaction, resulting in less ionization 11. Further, due to self-absorption of energy as the reaction product travels through the neutron absorbing film to the detector gas, more energy can be lost, a significant problem with this type of detector. Further, the total overall efficiency that can be achieved with the design is less than 10% efficiency detection of thermal neutrons.

Referring now to FIG. 6, there is shown a prior art detector where metal washers 30 have been inserted down the axis of the cylindrical gas-filled detector. The washers 30 are separated by spacers and the washers 30 are coated on both sides with a neutron reactive material 12. Although the design increases the overall efficiency of the detector, it has a limit to the efficiency that can be realized. Further, the detector of FIG. 6 is designed to point, end to end, at the neutron source. Because of the geometry of the detector of FIG. 6, neutrons will not be detected effectively if the detector is irradiated from the side, which is the preferred method of operating gas-filled neutron detectors. A practical device will be limited to less than 35% detection efficiency of thermal neutrons if the device is irradiated end on, reducing to almost 0% if irradiated from the side. As with the detector of FIG. 5, only one reactive product can enter the gas chamber because the other reaction product enters the metal washer 30.

Referring again to FIG. 3, there is illustrated a prior art gas-filled neutron detector, depicting a cross-section of a typical multi-anode gas-filled neutron detector. The detector is composed of a container 1 with a lid 2 that contains the neutron-reactive detector gas in the cavity 6. The detector gas is generally a material that reacts strongly with neutrons. Example neutron-reactive gases used in these detectors include $^3$He and $^{10}BF_3$. A thin barrier 7 completes the detector enclosure. Aluminized BoPET (Mylar) is typically used as a thin barrier. The detector container 1 serves as an electrode. An additional electrode or series of electrodes 5 are provided, usually thin wires 5, in order to apply a voltage across the gas in the detector cavity 6. Neutrons 8 interact in the neutron reactive gas and subsequently cause the ejection of ionizing radiation 9. The ionizing radiation enters the gas and excites electron-ion pairs 11. These electron-ion pairs are separated by the applied detector voltage. Typically, a positive voltage is applied to the small wire electrodes 5, named the anodes. Electrons drift to the anodes, and upon reaching the anodes, create a Townsend avalanche, thus producing a much larger number of electron-ion pairs. The new positive ions drift toward the outer perimeter and the current produced by their motion is measured and recorded as a neutron interaction event. The neutron-reactive gas is constantly replenished thought ports 3 and 4. The detector efficiency of FIG. 3 can be high, often up to 80%.

Referring again to FIG. 4, there is illustrated a prior art gas-filled neutron detector, depicting a cross-section of a typical coaxial single anode gas-filled neutron detector. The detector is composed of a container 1 that contains the neutron-reactive detector gas in the cavity 6. The detector gas is generally a material that reacts strongly with neutrons. Example neutron-reactive gases used in these detectors include $^3$He and $^{10}BF_3$. The detector container 1 serves as an electrode. An additional electrode 5 is provided, usually a thin wire 5, in order to apply a voltage across the gas in the detector cavity 6. Neutrons 8 interact in the neutron reactive gas and subsequently cause the ejection of ionizing radiation 9. The ionizing radiation enters the gas and excites electron-ion pairs 11. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event. The detector efficiency of FIG. 4 can be high, often up to 80%. The gas in this style of detector is not replenished and can be exhausted over a period of time.

Referring again to FIG. 5, there is illustrated a prior art coated gas-filled neutron detector, depicting a cross-section of a typical coaxial single anode gas-filled neutron detector. The detector is composed of a container 1 that contains the non-reactive detector gas in the cavity 13. The detector gas is generally a material that does not react strongly with neutrons. Example neutron-reactive gases used in these detectors include Ar and P-10, a mixture of 10% methane and 90% Ar. The detector container 1 serves as an electrode. An additional electrode 5 is provided, usually a thin wire 5, in order to apply a voltage across the non-reactive gas in the detector cavity 13. Neutrons 8 interact in the neutron reactive coating 12 and subsequently cause the ejection of ionizing radiation 9. The ionizing radiation enters the gas and excites electron-ion pairs 11. Note that the configuration does not allow for both reaction products 9 to enter the detector cavity 1, but instead only one reaction product 9 can enter the cavity 1. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event. The detector efficiency of FIG. 5 is usually low, limited to less than 10%.

Referring again to FIG. 6, there is illustrated a prior art coated gas-filled neutron detector, depicting a coaxial single anode gas-filled neutron detector. The detector is composed of a container 1 that contains the non-reactive detector gas in the cavity 13. The detector gas is generally a material that does not react strongly with neutrons. Example neutron-reactive gases used in these detectors include Ar and P-10, a mixture of 10% methane and 90% Ar. The detector container 1 serves as an electrode. An additional electrode 5 is provided, usually a thin wire 5, in order to apply a voltage across the non-reactive gas in the detector cavity 13. Torus shaped metal washers 30 are coated with neutron reactive material 12. Neutrons interact in the neutron reactive coating 12 and subsequently cause the ejection of ionizing radiation. The ionizing radiation enters the gas and excites electron-ion pairs 11. Note that the configuration does not allow for both reaction products 9 to enter the detector cavity 1, but instead only one reaction product can enter the cavity 1. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event.

DETAILED DESCRIPTION OF PREVIOUSLY DISCLOSED EXAMPLE EMBODIMENTS

Referring to FIGS. 7 and 8, there are illustrated coated gas-filled neutron detectors of the above-noted PCT application, depicting coaxial single anode gas-filled neutron detectors. The detector is composed of a container 1 that contains the non-reactive detector gas in the cavity 13. The detector gas is generally a material that does not react strongly with neutrons. Example detector gases used in these detectors include Ar and P-10, a mixture of 10% methane and 90% Ar. The detector container 1 serves as an electrode. An additional electrode 5 is provided, usually a thin wire 5, in order to apply a voltage across the non-reactive gas in the detector cavity 13. Fins 19 are coated with neutron reactive material 12. Neutrons interact in the neutron reactive coating 12 and subsequently cause the ejection of ionizing radiation. The ionizing radiation enters the gas and excites electron-ion pairs. Note that the configuration does not allow for both reaction products to enter the detector cavity 1, but instead only one reaction product can enter the cavity 1 because the other reaction products will collide into the fins 19; thereby, reducing the detection efficiency. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event.

Referring to FIG. 9, there is illustrated coated gas-filled neutron detector of the above-noted PCT application, depicting a coaxial single anode gas-filled neutron detector. The detector is composed of a container 1 that contains the non-reactive detector gas in the cavity 13. The detector gas is generally a material that does not react strongly with neutrons. Example detector gases used in these detectors include Ar and P-10, a mixture of 10% methane and 90% Ar. The detector container 1 serves as an electrode. An additional electrode 5 is provided, usually a thin wire 5, in order to apply a voltage across the non-reactive gas in the detector cavity 13. A single helical coil fin 19 is coated with neutron reactive material 12. Neutrons interact in the neutron reactive coating 12 and subsequently cause the ejection of ionizing radiation. The ionizing radiation enters the gas and excites electron-ion pairs. Note that the configuration does not allow for both reaction products to enter the detector cavity 1, but instead only one reaction product can enter the cavity 1 because the other reaction products will collide into the fins 19; thereby, reducing the detection efficiency. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event.

Referring to FIG. 10, there is illustrated a coated gas-filled neutron detector of the above-noted PCT application, depicting a cross-section of a typical coaxial single anode gas-filled neutron detector. The detector is composed of a container 1 that contains the non-reactive detector gas in the cavity 13. The detector gas is generally a material that does not react strongly with neutrons. Example detector gases used in these detectors include Ar and P-10, a mixture of 10% methane and 90% Ar. The detector container 1 serves as an electrode. An additional electrode 5 is provided, usually a thin wire 5, in order to apply a voltage across the non-reactive gas in the detector cavity 13. A reticulated material 14 either composed of, or coated with, neutron reactive material lines the detector cavity 1. Neutrons interact in the neutron reactive coating 14 and subsequently cause the ejection of ionizing radiation. The ionizing radiation enters the gas and excites electron-ion pairs. Note that the configuration does not allow for both reaction products to enter the detector cavity, but instead only one reaction product can enter the cavity. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event. The detector efficiency of FIG. 5 is usually low, limited to less than 10%.

REFERENCES

1. G. F. Knoll, Radiation Detector and Measurement, $3^{rd}$ Ed., (Wiley, New York, 2000).

2. R. D. Lowde, "The Design of Neutron Counters Using Multiple Detecting Layers", The Review of Scientific Instruments, 21 (1950) #10 pp. 835-842.

3. P. M. Dighe, D. N. Prasad, K. R. Prasad, S. K. Kataria, S. N. Athavale, A. L. Pappachan, A. K. Grover, "Boron-Lined Proportional Counters with Improved Neutron Sensitivity," Nuclear Instruments and Methods in Physics Research, A 496 (2003) pp. 154-161.

4. P. M. Dighe, "New Cathode Design Boron Lined Proportional Counters for Neutron Area Monitoring Applications", Nuclear Instruments and Methods in Physics Research, A 575 (2007) pp. 461-465.

5. M. Alex, J. P. Singh, D. N. Prasad, and P. K. Mukhopadhyay, "Development of a Gamma Compensated Boron Lined Ionisation Chamber for Reactor Safety and Control Applications", Nuclear Instruments and Methods in Physics Research, A 580 (2007) pp. 1395-1399.

6. P. M. Dighe and P. K. Mukhopadhyay, "Design and Development of a Wide Range Ion Chamber for Reactor Instrumentation", Nuclear Instruments and Methods in Physics Research, A 614 (2010) pp. 449-452.

7. D. S. McGregor, M. D. Hammig, H. K. Gersch, Y-H. Yang, and R. T. Klann, "Design Considerations for Thin Film Coated Semiconductor Thermal Neutron Detectors, Part I: Basics Regarding Alpha Particle Emitting Neutron Reactive Films", Nuclear Instruments and Methods in Physics Research, A500 (2003) pp. 272-308.

8. J. H. Hiller, S. A. Wallace, S. Dai, entitled "Neutron Detector Using Sol-Gel Absorber", U.S. Pat. No. 5,973,328 dated Oct. 26, 1999.

9. D. J. Cotic, entitled "Modular Array Radiation Detector", U.S. Pat. No. 4,272,680 dated Jun. 9, 1981.

10. C. A. Young, B. D. Geelhood, entitled "Lithium-6 Coated Wire Mesh Neutron Detector", U.S. Pat. No. 4,481,421 dated Nov. 6, 1984.

The following U.S. patent documents are related to the present invention: U.S. Pat. Nos. 6,175,120; 6,479,826; 6,545,281; 6,781,132; 6,921,903; 2006/0023828; 2006/0043308; 2006/0056573; 2006/0291606; U.S. Pat. No. 7,164,138; 2007/0018110; 2009/0302231 and 2012/0217406.

SUMMARY OF EXAMPLE EMBODIMENTS

The above-mentioned and other problems are solved by applying the principles and teachings associated with the hereinafter described different embodiments of compartmentalized gas-filled neutron detectors and imaging system and array of such detectors. Gas-filled detectors are designed such that one or more objects or structures having large surface areas are incorporated into the gas-filled detectors, where these surfaces are composed of neutron reactive material. The surfaces are composed of the material in such a manner that one or more reaction products may exit the material, upon a single neutron reaction, with high probability.

The surface portions may be composed of low-density material, generally below the density of $H_2O$ (<1 g cm$^{-3}$) and in a thin configuration that allows for one or more reaction products to exit the material. The surface portions may be composed of ultra-low-density solid materials, generally below 0.1 g cm$^{-3}$, such that one or more reaction products may exit the material. An example of an ultra-low-density material is aerogel.

The surface portions may be composed of ultra-thin solid materials that can be coated with thin layers of neutron reactive materials, such that one or more reaction products may exit the material. An example is biaxially-oriented polyethylene terephthalate (BoPET) coated with boron or LiF. Mylar is an example of BoPET. Another example of low-density material that can be made ultra-thin is Li foil.

The neutron reactive surfaces or surface portions may be flat or curved, fins or plates, low-density or ultra-low-density material, foils, thin sheets, porous or filamentary material, or semi-solid material or aerogel. The incorporation of the extended surfaces coated with, or composed of neutron reactive material increases the neutron detection efficiency of the gas-filled detectors over conventional coated designs.

These surfaces or surface portions increase the amount of neutron reactive material present in the detectors over conventional coated designs and as a result increase the neutron detection efficiency. The one or more objects or structures can be made of conducting, semiconducting, semi-insulating, or insulating materials. The surfaces or surface portions are arranged such that they do not detrimentally detract from the main function of a gas-filled detector with particular attention to gas-filled proportional detectors. The use of low-density or ultra-low-density material media, such as foam, sponge, filamentary material, or aerogel, allows for neutron reactive structures to be inserted (i.e. inserts) into the detector that allow for one or more reaction products to be released per neutron interaction event into the detector chamber and into the detector gas.

An object of at least one embodiment of the present invention is to provide neutron detectors that have detection efficiencies many times greater than present gas-filled neutron detectors using neutron reactive coatings on one or more surfaces while remaining relatively inexpensive to construct.

Another object of at least one embodiment of the present invention is to provide a neutron detector that does not need to use $^{10}BF_3$ or $^3He$ gases and operates on common proportional gases such as Ar and P-10.

Still another object of at least one embodiment of the present invention is to provide a method to construct gas-filled neutron detectors with solid source neutron absorbers instead of neutron reactive gases, where the solid source neutron absorbers allow for substantially one or more reaction products to enter the non-reactive detector gas.

In carrying out the above objects and other objects of the present invention, an apparatus for efficiently detecting neutrons is provided. The apparatus includes a detector cavity in which a detector gas is contained. The apparatus further includes at least one object disposed within the cavity. At least surface portions of the at least one object include neutron reactive material. The surface portions are sized and arranged in the cavity to reduce or prevent neutron streaming through the cavity. The material absorbs neutrons and the at least one object releases substantially one or more ionizing radiation reaction products resulting from the absorbed neutrons into the gas. The apparatus still further includes a plurality of electrodes including at least one anode and at least one cathode for generating an electric field within the cavity upon the application of a voltage to the electrodes.

The neutron reactive material may include at least one of elemental, enriched, or compound forms of lithium, boron, gadolinium, cadmium, uranium, plutonium and thorium.

The neutron reactive inserts may be composed of at least one of insulating, semi-insulating, semiconducting, and conducting materials to ensure that the inserts do not disrupt the electric field within the cavity.

The substrate portions of the inserts may be composed of neutron reactive low-density or ultra-low-density material that allows one or more reaction products to be released into the surrounding gas for each neutron interaction event.

The substrate portions of the inserts may be composed of low-density neutron reactive material that allows one or more reaction products to be released into the surrounding gas.

The surface portions may be composed of neutron reactive low-density or ultra-low-density material that allows substantially one or more reaction products to be released into the surrounding gas.

The neutron reactive low-density or ultra-low-density material may include at least one of elemental, enriched, or compound forms of lithium, boron, gadolinium, cadmium, uranium, plutonium and thorium.

The at least one object may have a substrate portion. The substrate portions may be composed of a neutron reactive low-density or ultra-low-density material and the substrate may release charged particles and, light or photons that interact with the detector gas.

The low-density or ultra-low-density material may be arranged geometrically within the cavity to reduce or prevent neutron streaming through the cavity.

The low-density or ultra-low-density material may be composed of at least one of a foam, sponge, aerogel, fibrous and filamentary material.

The low-density or ultra-low-density material may be a combination of a foam, sponge, aerogel, fibrous or filamentary material.

The apparatus may still further include a plurality of sub-compartments disposed within the cavity, which may restrict the ranges of the reaction products.

The neutrons may be thermal neutrons.

Still further in carrying out the above objects and other objects of the present invention, an apparatus for efficiently detecting neutrons is provided. The apparatus includes a plurality of walls at least partially defining a detector cavity which encloses a detector gas. The walls of the cavity are operable as an outer electrode. The apparatus further includes a thin conductive wire disposed within the cavity and operable as an inner electrode. The apparatus still further includes a conductive grid surrounding the thin wire and operable as an intermediate electrode. The apparatus further includes at least one object disposed within the cavity. At least surface portions of the at least one object include neutron reactive material. The surface portions are sized and arranged in the cavity to reduce or prevent neutron streaming through the cavity. The material absorbs neutrons and the at least one object releases substantially one or more ionizing radiation reaction products into the surrounding gas.

The apparatus may further include a surface which at least partially defines the cavity and a coating of neutron reactive material on the surface. The at least one object may include inserts having substrate portions. The surface portions may be coatings of neutron reactive materials on the substrate portions.

The total thickness of the insert and coating may be less than the summed ranges of the reaction products.

The substrate portions of the inserts may be composed of neutron reactive low-density and ultra-low density material that allows one or more reaction products to be released into the surrounding gas.

The substrate portions of the inserts may be composed of low-density or ultra-low neutron reactive material and may be porous material that allows one or more reaction products to be released into the surrounding gas.

The neutron reactive material may include at least one of elemental, enriched or compound forms of lithium, boron, gadolinium, cadmium, uranium, plutonium and thorium.

The at least one object may have a substrate portion. The surface portions may be coatings of the material on the substrate portion and the coatings may release charged particles and, light or photons that interact with the detector gas.

The substrate portions of the inserts may be composed of one or more conductive materials.

The substrate portions of the inserts may be composed of at least one of insulating, semi-insulating, semiconducting, and conducting materials to ensure that the inserts do not disrupt the electric field within the cavity.

The inserts may be arranged geometrically within the cavity to reduce or prevent neutron streaming through the cavity.

The surface portions may be composed of neutron reactive low-density or ultra-low-density material that allows substantially one or more reaction products to be released into the surrounding gas.

The surface portions may be composed of neutron reactive low-density or ultra-low-density material may be a porous material that allows substantially one or more reaction products to be released into the surrounding gas.

The neutron reactive low-density or ultra-low-density material may include at least one of elemental, enriched or compound forms of lithium, boron, gadolinium, cadmium, uranium, plutonium and thorium.

The at least one object may have a substrate portion. The surface portions may be composed of a coating of neutron reactive porous material on the substrate portion and the coating may release charged particles and, light or photons that interact with the detector gas.

The surface portions may be arranged geometrically within the cavity to reduce or prevent neutron streaming through the cavity.

The porous material may be composed of at least one of a foam, sponge, aerogel, fibrous and filamentary material.

The porous material may be a combination of a foam, sponge, aerogel, fibrous or filamentary material.

The apparatus may still further include a plurality of sub-compartments disposed within the cavity and which restrict the ranges of the neutron reaction products.

The neutrons may be thermal neutrons.

Yet, still further in carrying out the above objects and other objects of the present invention, an apparatus for efficiently detecting neutrons is provided. The apparatus includes a first surface which partially defines a detector cavity which encloses a detector gas. The first surface is operable as a first electrode. The apparatus further includes a second surface which partially defines the cavity. The second surface is operable as a second electrode. The apparatus still further includes a structure including a plurality of compartments filled with the gas and disposed within the cavity. At least inner surface portions of the structure include neutron reactive material. The surface portions are sized and arranged in the cavity to reduce or prevent neutron streaming through the cavity. The material absorbs neutrons and the structure releases substantially one or more ionizing radiation reaction products having ranges resulting from the absorbed neutrons into the gas. The compartments restrict the ranges of the reaction products and limit total energy deposited in the apparatus such that response signals from background radiation are reduced and substantially eliminated.

The electrodes may be arranged and connected so that the apparatus operates as a single detector.

The structure may include substrate portions. The surface portions may be coatings of the neutron reactive material on the substrate portions.

The substrate portions of the inserts may be composed of neutron reactive porous material that allows one or more reaction products to be released into the gas.

The neutron reactive material may include at least one of elemental, enriched or compound forms of lithium, boron, gadolinium, cadmium, uranium, plutonium and thorium.

The structure may include substrate portions. The surface portions may be coatings of the neutron reactive material on the substrate portions and the coatings may release charged particles and, light or photons that interact with the detector gas.

The substrate portions may be composed of one or more conductive materials.

The substrate portions may be composed of at least one of insulating and semi-insulting materials to ensure that the structure does not disrupt the electric field within the cavity.

The surface portions of the structure may be arranged geometrically within the cavity to reduce or prevent neutron streaming through the cavity.

The surface portions of the structure may be composed of low-density or ultra-low-density material.

The low-density or ultra-low-density material may be a porous material composed of at least one of a foam, sponge, aerogel, fibrous and filamentary material.

The surface portions of the structure may be composed of neutron reactive porous material.

The neutron reactive porous material may include at least one of elemental, enriched or compound forms of lithium, boron, gadolinium, cadmium, uranium, plutonium and thorium.

The structure may include substrate portions. The surface portions may be coatings of neutron reactive porous material and the coatings may release at least one charged particle and, light or photons that interact with the detector gas.

The surface portions may be arranged geometrically within the cavity to reduce or prevent neutron streaming through the cavity.

The porous material may be at least one of a foam, sponge, aerogel, fibrous and filamentary material.

The porous material may be a combination of a foam, sponge, aerogel, fibrous or filamentary material.

The neutrons may be thermal neutrons.

The electrodes may be arranged and separated so that the apparatus operates as a detector array having a plurality of individual detectors.

Inner surface portions of neighboring compartments may include different neutron reactive material.

The structure may include substrate portions. The surface portions may be coatings of the at least one neutron reactive material on the substrate portions.

The neutron reactive material may include at least one of elemental, enriched or compound forms of lithium, boron, gadolinium, cadmium, uranium, plutonium and thorium.

The structure may include substrate portions. The surface portions may be coatings of the neutron reactive material on the substrate portions and the coatings may release charged particles and, light or photons that interact with the detector gas.

The substrate portions may be composed of one or more conductive materials.

The substrate portions may be composed of at least one of insulating and semi-insulting material to ensure that the structure does not disrupt the electric field within the detector cavity.

The surface portions of the structure may be arranged geometrically within the cavity to reduce or prevent neutron streaming through the cavity.

The substrate portions of the inserts may be composed of neutron reactive porous material that allows one or more reaction products to be released into the surrounding gas.

The surface portions of the structure may be composed of low-density or ultra-low-density material.

The low-density or ultra-low-density material may be a porous material composed of at least one of a foam, sponge, aerogel, fibrous and filamentary material.

The surface portions of the structure may be composed of neutron reactive porous material.

The neutron reactive porous material may include at least one of elemental, enriched or compound forms of lithium, boron, gadolinium, cadmium, uranium, plutonium and thorium.

The structure may include substrate portions. The surface portions may be coatings of neutron reactive porous material and the coatings may release charged particles and, light or photons that interact with the detector gas.

The surface portions may be arranged geometrically within the cavity to reduce or prevent neutron streaming through the cavity.

The low-density or ultra-low-density material may be a porous material composed of at least one of a foam, sponge, aerogel, fibrous and filamentary material.

The porous material may be a combination of a foam, sponge, aerogel, fibrous or filamentary material.

The neutrons may be thermal neutrons.

Inner surface portions of neighboring compartments may include different neutron reactive porous material.

Further in carrying out the above objects and other objects of at least one embodiment of the present invention, an array of such detectors is provided and an imaging system for imaging neutron emissions including such an array are provided.

The teachings in the present application are designed primarily for gas-filled proportional counters. However, the teachings can also be used in gas-filled ion chambers and Geiger-Mueller counters. Described and taught herein is a method and apparatus to increase the detection efficiency of coated gas-filled neutron detectors by the insertion of neutron reactive inserts and/or multiple extended surfaces coated with neutron reactive material.

The above objects and other objects, features and advantages of at least one embodiment of the present invention are readily apparent from the following detailed description of the best mode for carrying out the invention when taken in connection with the accompanying drawings.

BRIEF DESCRIPTION OF THE DRAWINGS

FIG. 54b is an isometric view of a smaller embodiment of a similar design as shown in FIG. 54a.

DETAILED DESCRIPTION OF ADDITIONAL EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, and with a few exceptions, parts having the same or similar structure or functions have the same reference number from drawing figure to drawing figure.

Figure 1:
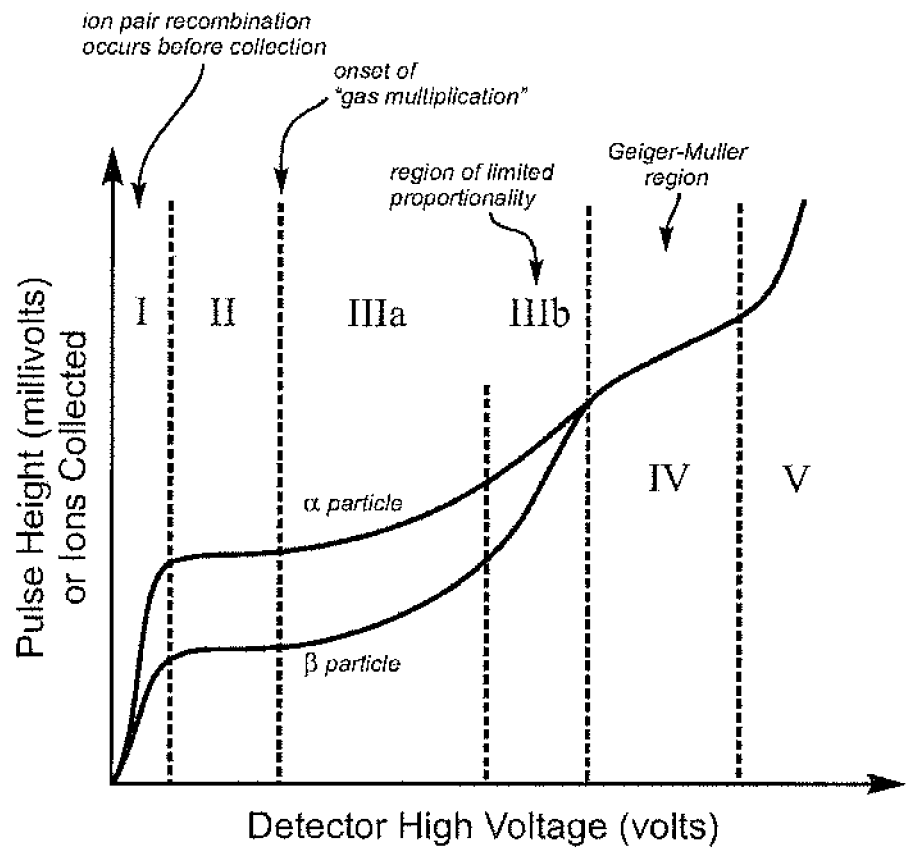
FIG. 1 is a graph of observed output pulse height versus the applied high voltage to alpha and beta particles for a gas-filled detector, showing the main regions: (I) recombination, (II) ion chamber, (III) proportional, (IV) Geiger-Mueller, and (V) continuous discharge; this plot is often referred to as the gas curve.
Figure 2:
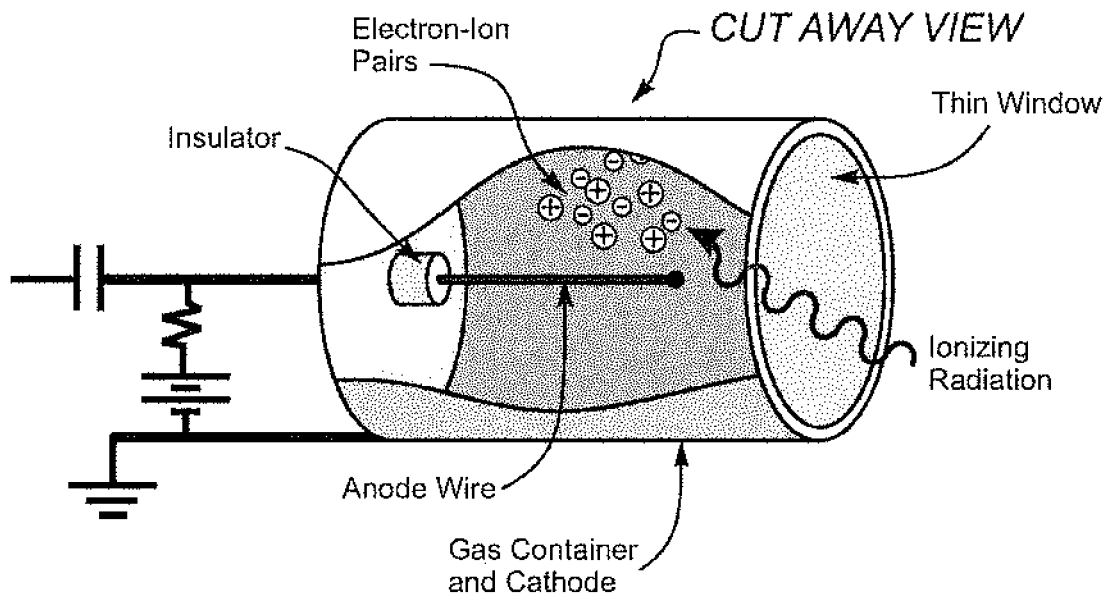
FIG. 2 is a schematic, partially broken away, view of a coaxial gas detector, which is commonly used for Geiger-Mueller tubes, and sometimes used for proportional counters and ionization chambers; high voltage is applied to the central wire anode, while the outer cylinder container or wall, the cathode, is held at ground.
Figure 3:
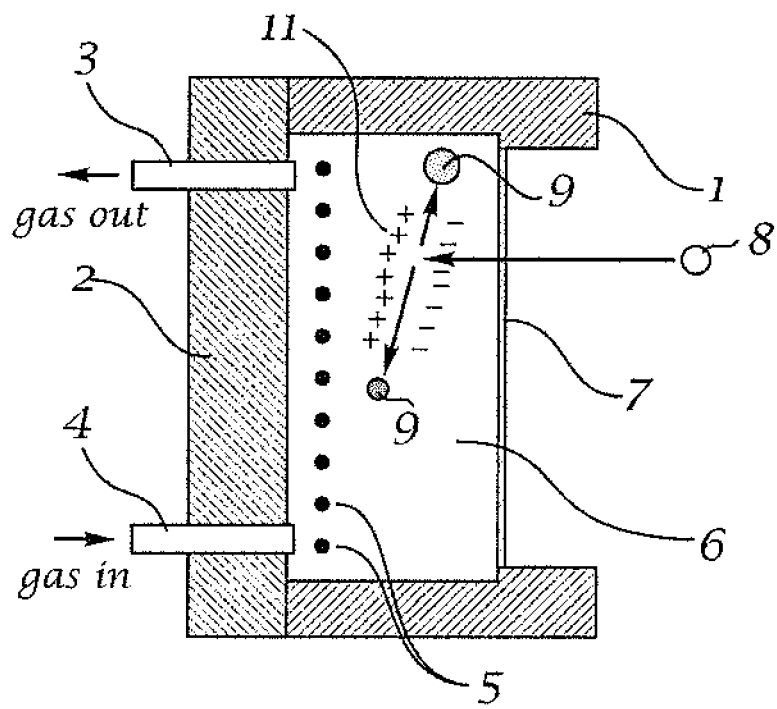
FIG. 3 is a sectional view of a common prior art gas-filled neutron detector.
Figure 4:
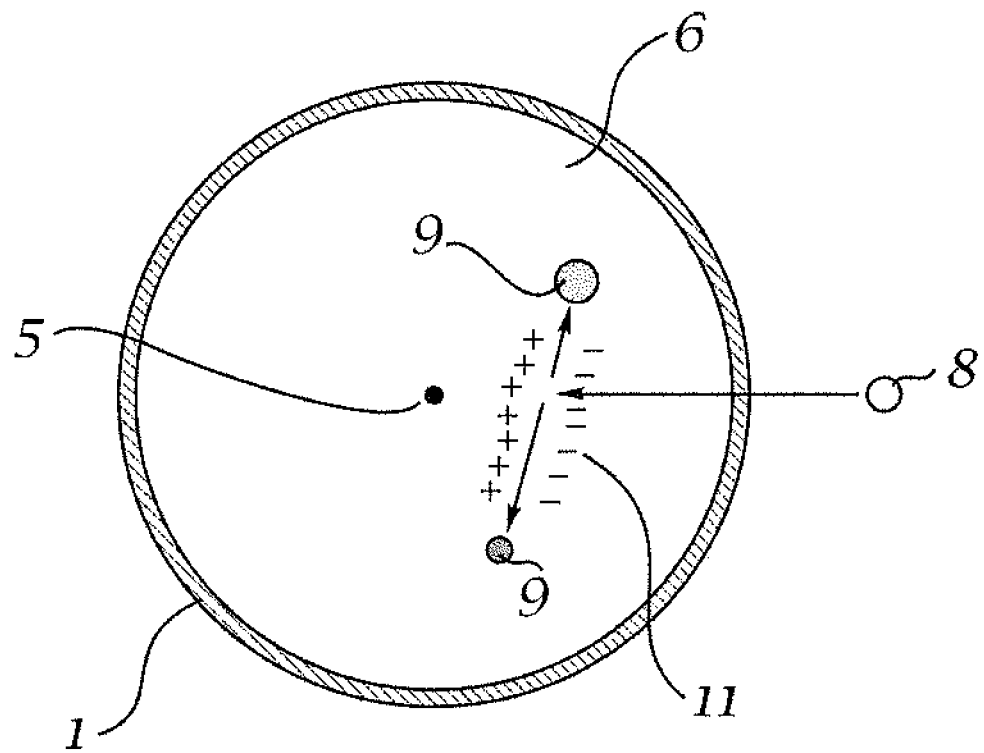
FIG. 4 is a sectional view of a common prior art gas-filled neutron detector.
Figure 5:
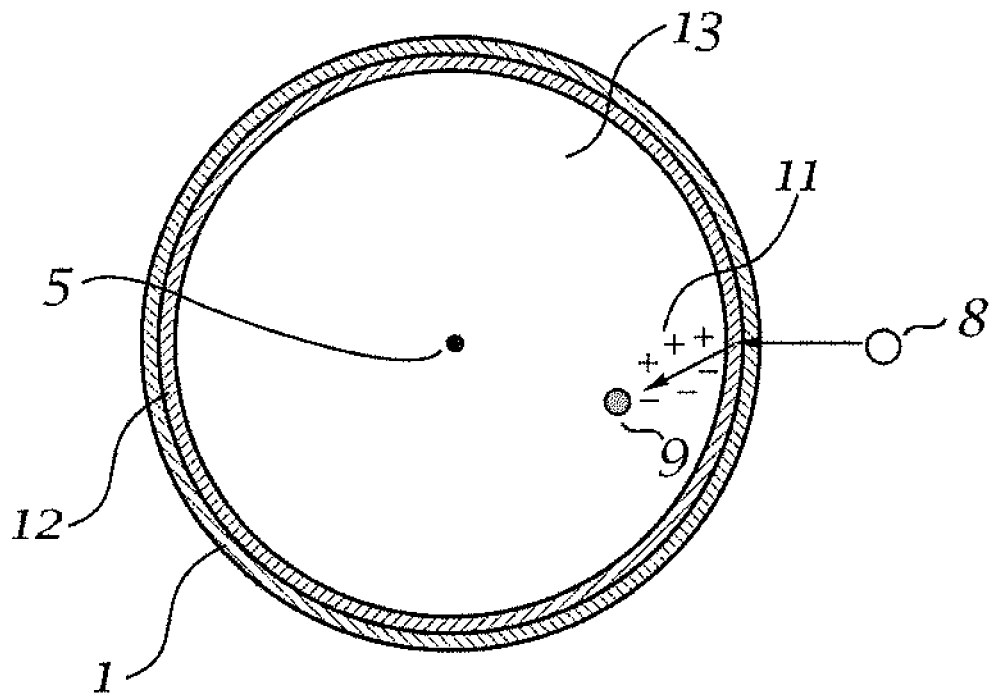
FIG. 5 is a sectional view of a common prior art gas-filled coated neutron detector.
Figure 6:
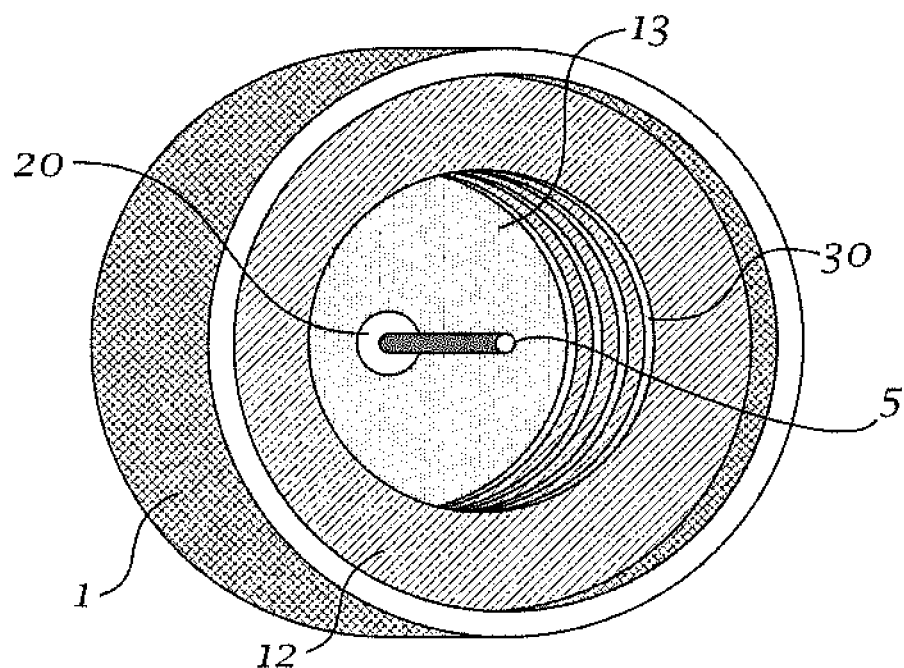
FIG. 6 is a perspective schematic view in cross-section of a prior art gas-filled neutron detector filled with washers which are aligned down a cylindrical axis of the detector and are coated with neutron reactive material.
Figure 7:
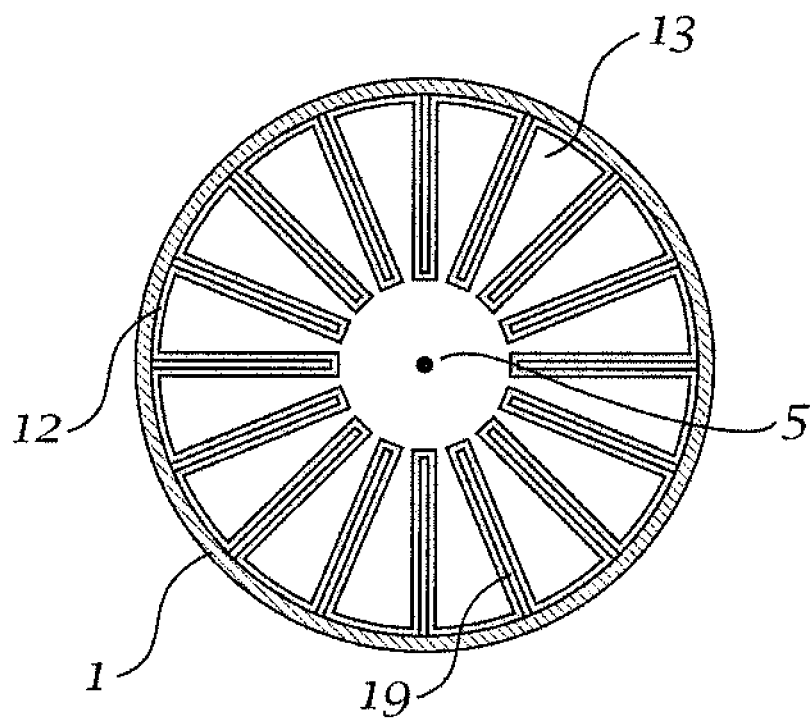
FIG. 7 is a sectional view of the gas-filled neutron detector filled with axial aligned fins coated with neutron reactive material.
Figure 8:
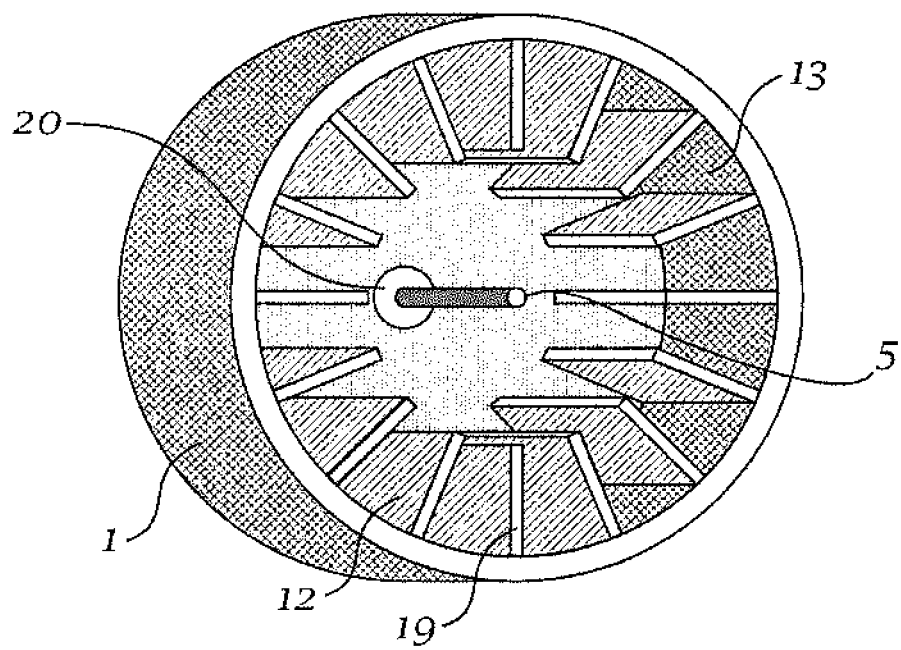
FIG. 8 is a perspective schematic view in cross-section of a gas-filled neutron detector filled with axial aligned fins coated with neutron reactive material.
Figure 9:
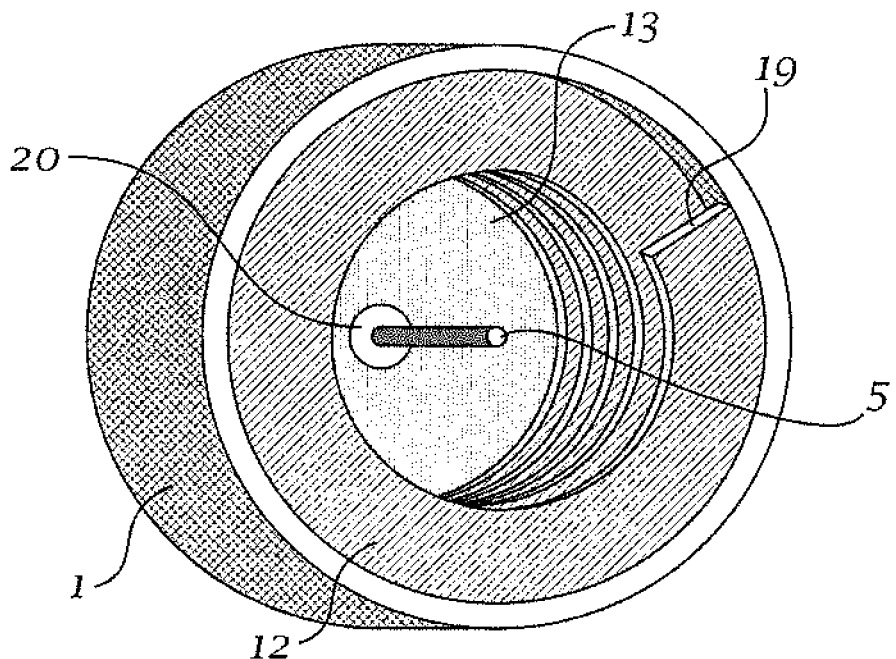
FIG. 9 is a perspective schematic view in cross-section of a gas-filled neutron detector filled with a single curling fin coated with or composed of neutron reactive material.
Figure 10:
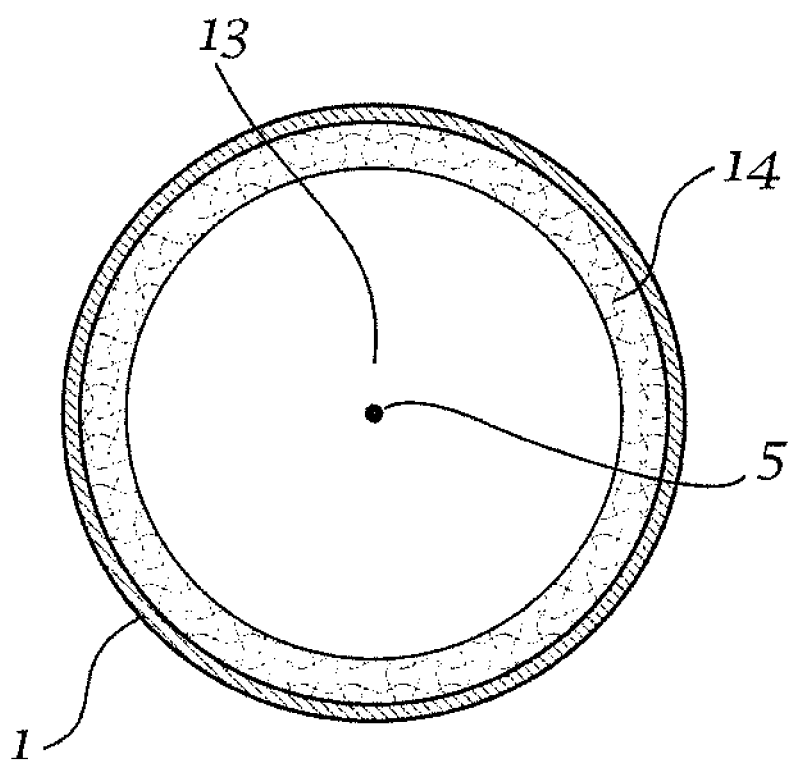
FIG. 10 is a sectional view in cross-section of a gas-filled detector with a blanket of reticulated material coated with or composed of neutron reactive material.
Figure 11:
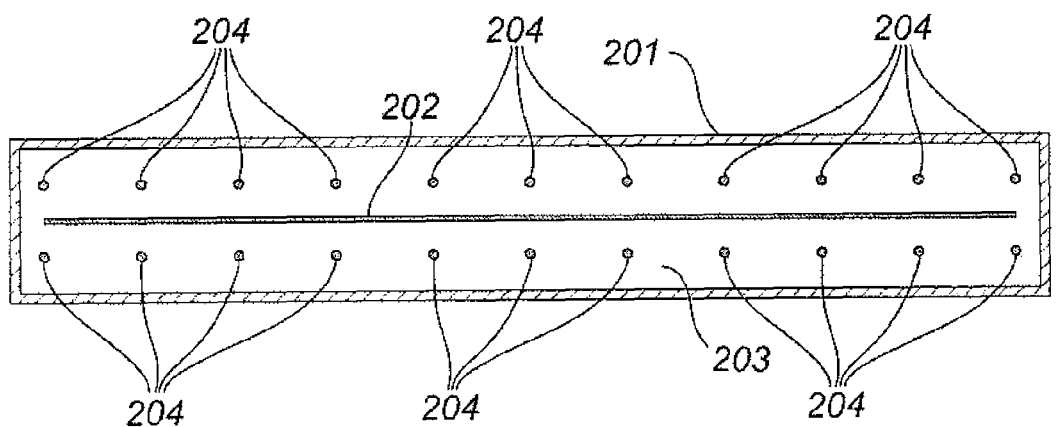
FIG. 11 is a cross sectional view of a gas-filled detector of a planar device showing a single sheet of neutron absorber; multiple anodes line both sides of the neutron absorber to collect the energy from reaction products that may escape both sides of the neutron absorber; the neutron absorber may be a neutron absorbing foil or BoPET (Mylar) coated with aluminum or other conductive material(s) on either one or both sides and coated with a neutron absorbing material on either one or both sides; the neutron absorber may also be a low-density or ultra-low density medium; one or more reaction products may escape both sides of the absorber concurrently; the reaction products may be measured simultaneously.

Referring now to FIG. 11, there is shown a cross-section of a preferred embodiment of the invention, showing a cross sectional view of a gas-filled detector of a planar device showing an outer electrode 201 that also serves as the gas container and cathode, a detector gas cavity 203, a single sheet of neutron absorber 202 and multiple anodes 204 which line both sides of the neutron absorber to collect the energy from reaction products that escape both sides of the neutron absorber 202; the neutron absorber 202 may be a neutron absorbing foil or BoPET that has been coated with aluminum on either one or both sides and coated with a neutron reactive material on either one or both sides; the neutron absorber 202 may also be a low-density medium; the neutron absorber 202 may also be an ultra-low-density medium; reaction products may escape both sides of the absorber 202 concurrently; the escaping reaction products may be measured simultaneously. Examples of the neutron reactive materials include natural cadmium, cadmium-113, boron-10, natural boron, lithium-6 fluoride, lithium-6, natural lithium, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. It is to be understood that whenever a list of examples of neutron reactive material is given herein-below natural cadmium and cadmium-113 should also be included.

Figure 12:
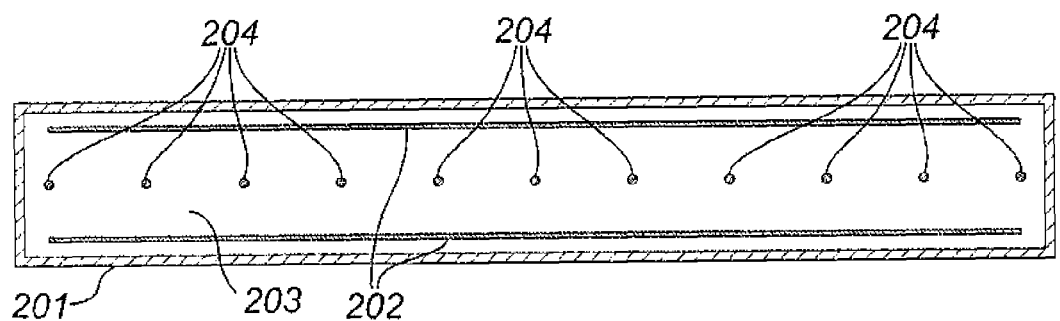
FIG. 12 is a cross sectional view of a gas-filled detector of a double planar neutron absorber showing multiple anode wires encompassed with two sheets of neutron absorber; the neutron absorber may be a neutron absorbing foil or BoPET (Mylar) coated with aluminum or other conductive material(s) on either one or both sides and coated with a neutron absorbing material on either one or both sides; the neutron absorber may also be a low-density medium; the neutron absorber may also be an ultra-low-density medium; one or more reaction products may escape both sides of the absorber concurrently; the reaction products may be measured simultaneously.

Referring now to FIG. 12, there is shown a cross-section of a preferred embodiment of the invention, showing a cross sectional view of a gas-filled detector of a planar device showing an outer electrode 201 that also serves as the gas container and cathode, a detector gas cavity 203 and multiple anode wires 204 encompassed with two sheets of neutron absorber 202; the neutron absorber 202 may be a neutron absorbing foil or BoPET that has been coated with aluminum on either one or both sides and coated with a neutron reactive material on either one or both sides; the neutron absorber 202 may also be a low-density medium; the neutron absorber 202 may also be an ultra-low-density medium; reaction products may escape both sides of the absorber 202 concurrently; the escaping reaction products may be measured simultaneously. Examples of the neutron reactive materials include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. It is to be understood that ultra-thin foil or other ultra-thin neutron absorber materials may be used with respect to FIGS. 11 and 12 and the other drawing figures. For example, while uranium is not a low-density material it can be made thin enough so that more than one reaction product can escape the "ultra-thin" absorber sheet.

Figure 13:
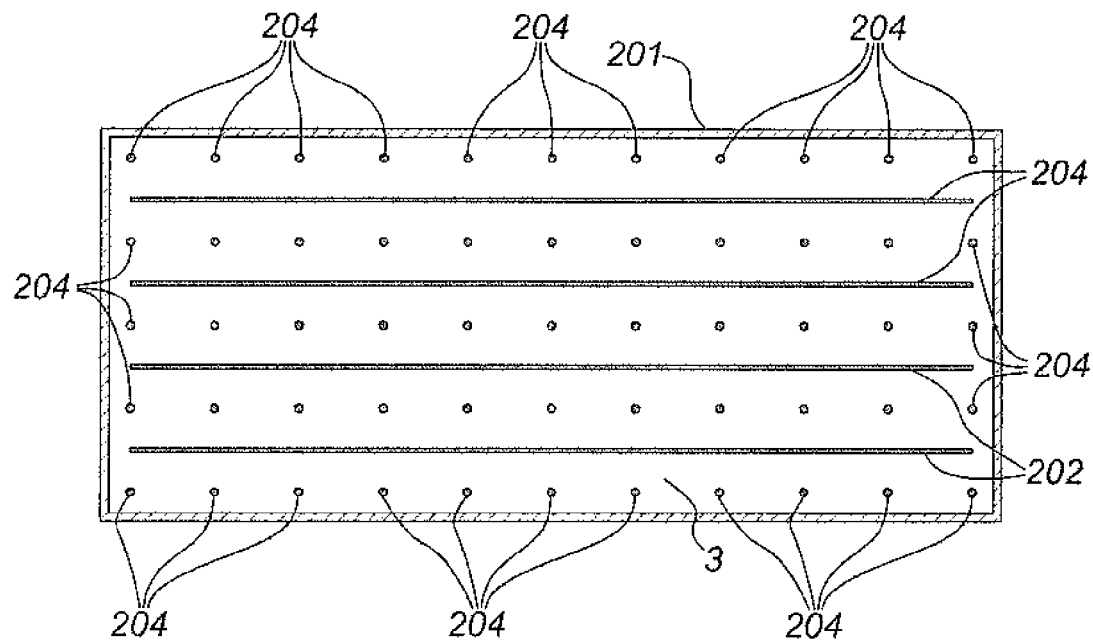
FIG. 13 is a cross sectional view of a gas-filled detector with multiple planar neutron absorbers with multiple anodes placed in between the neutron absorbers; the neutron absorber may be a neutron absorbing foil or BoPET (Mylar) coated with aluminum or other conductive material(s) on either one or both sides and coated with a neutron absorbing material on either one or both sides; the neutron absorber may also be a low-density medium; the neutron absorber may also be an ultra-low-density medium; one or more reaction products may escape both sides of the absorber concurrently; the reaction products may be measured simultaneously.

Referring now to FIG. 13, there is shown a cross-section of a preferred embodiment of the invention, showing a cross sectional view of a gas-filled detector of a planar device showing an outer electrode 201 that also serves as the gas container and cathode, a detector gas cavity 203, and multiple anode wires 204 encompassed by multiple sheets of neutron absorber 202; the neutron absorber 202 may be a neutron absorbing foil or BoPET that has been coated with aluminum on either one or both sides and coated with a neutron reactive material on either one or both sides; the neutron absorber 202 may also be a low-density medium; the neutron absorber 202 may also be an ultra-low-density medium; reaction products may escape both sides of the absorber 202 concurrently; the escaping reaction products may be measured simultaneously. Examples of the neutron reactive materials include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 14:
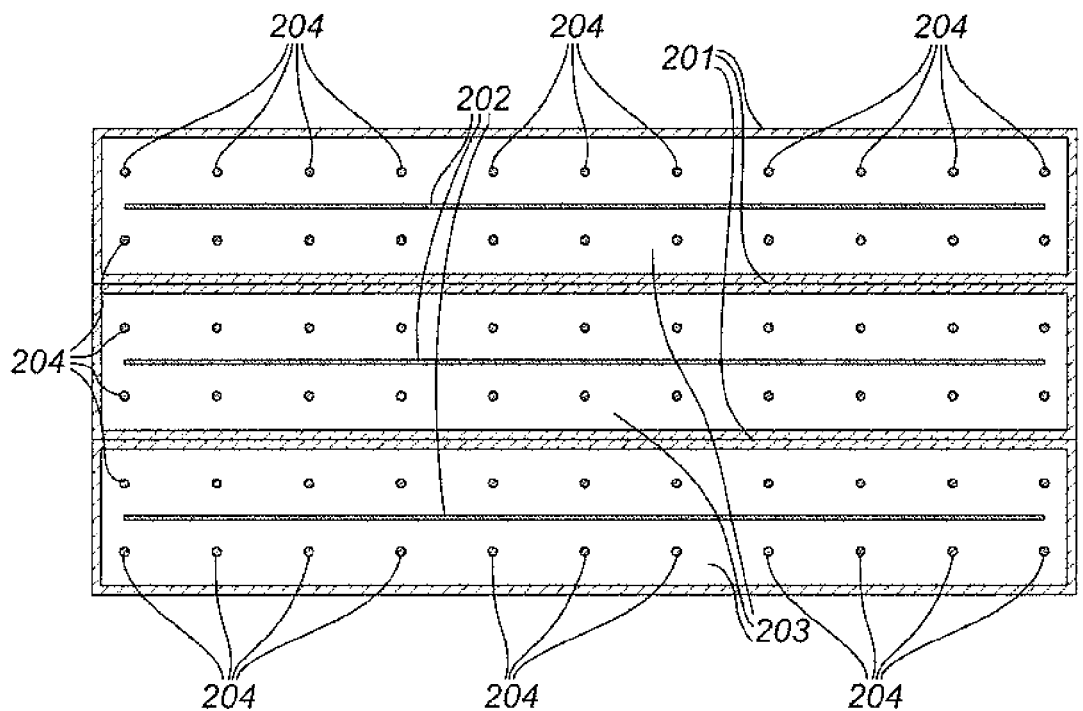
FIG. 14 is a cross sectional view of three single planar gas-filled detectors connected both physically and electronically together to make a larger detector; in the example here, each module contains one neutron absorber enclosed by multiple anode wires and contained within a housing that acts as both a container for the nonreactive gas and ground electrode; the neutron absorber may be a neutron absorbing foil or BoPET (Mylar)coated with aluminum or other conductive material(s) on either one or both sides and coated with a neutron absorbing material on either one or both sides; the neutron absorber may also be a low-density medium; the neutron absorber may also be an ultra-low-density medium; one or more reaction products may escape both sides of the absorber concurrently; the escaping reaction products may be measured simultaneously.

Referring now to FIG. 14, there is shown a cross sectional view of three single planar gas-filled detectors connected both physically and electronically together to make a larger detector; in the example here, each module contains one neutron absorber 202 enclosed by multiple anode wires 204 and contained within a housing 201 that acts as both a container for the nonreactive gas 203 and a ground electrode; the neutron absorber 202 may be a neutron absorbing foil or BoPET that has been coated with aluminum on either one or both sides and coated with a neutron absorbing material on either one or both sides; the neutron absorber 202 may also be a low-density medium; the neutron absorber 202 may also be an ultra-low-density medium; reaction products may escape both sides of the absorber 202 concurrently; the escaping reaction products may be measured simultaneously. Examples of the neutron reactive materials include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 15:
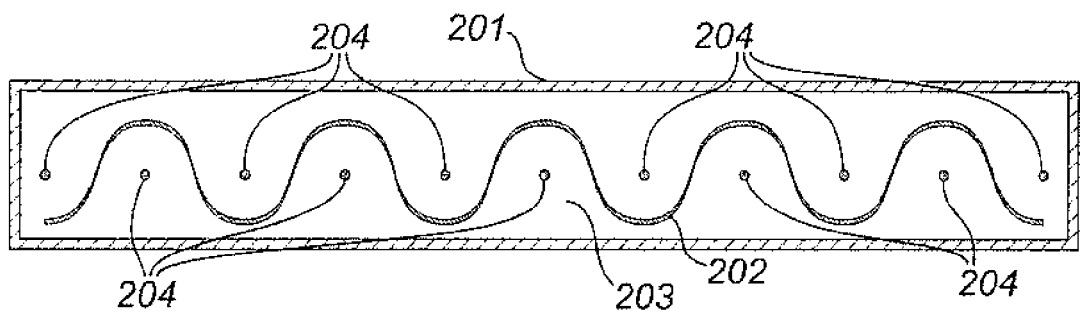
FIG. 15 is a cross sectional view of a single serpentine, or sinusoidal, neutron absorber weaving between multiple anode wires; the serpentine design is to minimize neutron streaming; the neutron absorber is contained within a housing that also acts as a ground electrode and contains the nonreactive gas as well; the neutron absorber may be a neutron absorbing foil or BoPET (Mylar) coated with aluminum or other conductive material(s) on either one or both sides and coated with a neutron absorbing material on either one or both sides; the neutron absorber may also be a low-density medium; the neutron absorber may also be an ultra-low-density medium; one or more reaction products may escape both sides of the absorber concurrently; the escaping reaction products may be measured simultaneously.

Referring now to FIG. 15, there is shown a cross-section of a preferred embodiment of the invention, showing a cross sectional view of a gas-filled detector of a planar device showing an outer electrode 201 that also serves as the gas container and cathode, a detector gas cavity 203, and a single serpentine, or sinusoidal, neutron absorber 202 weaving between multiple anode wires 204. The multiple anodes 204 collect the energy from reaction products that escape both sides of the neutron absorber 202; the neutron absorber 202 may be a neutron absorbing foil or BoPET that has been coated with aluminum on either one or both sides and coated with a neutron reactive material on either one or both sides; the neutron absorber 202 may also be a low-density medium; the neutron absorber 202 may also be an ultra-low-density medium; reaction products may escape both sides of the absorber 202 concurrently; the escaping reaction products may be measured simultaneously. Examples of the neutron reactive materials include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 16:
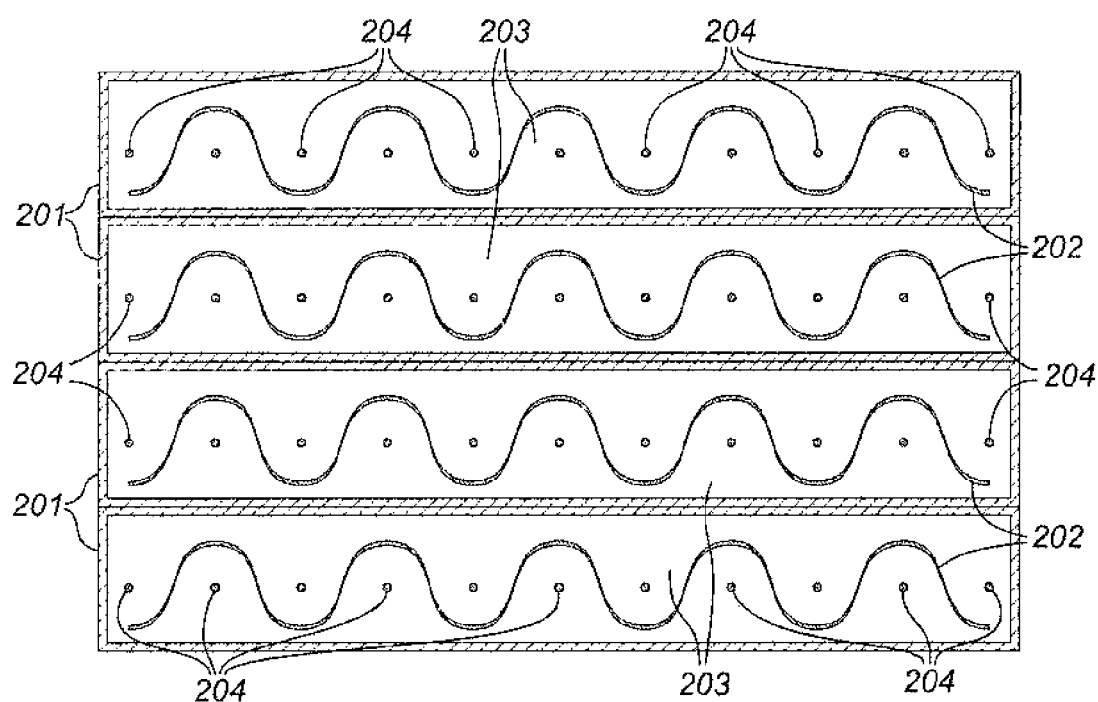
FIG. 16 is a cross sectional view of four single serpentine neutron absorbers in a gas-filled detectors connected both physically and electronically together to make a larger or macro-detector; each module contains one neutron absorber, but is not restricted to a single absorber, weaving between multiple anode wires and contained within a housing that acts as both a container for the nonreactive gas and ground electrode; the neutron absorber may be a neutron absorbing foil or BoPET (Mylar) coated with aluminum or other conductive material(s) on either one or both sides and coated with a neutron absorbing material on either one or both sides; the serpentine pattern reduces the amount of neutron streaming; the neutron absorber may also be a low-density medium; the neutron absorber may also be an ultra-low-density medium; one or more reaction products may escape both sides of the absorber concurrently; the escaping reaction products may be measured simultaneously.

Referring now to FIG. 16, there is shown a cross sectional view of four single planar gas-filled detectors connected both physically and electronically together to make a larger detector; in the example here, each module contains one neutron absorber 202 weaving between multiple anode wires 204 and contained within a housing 201 that acts as both a container for the nonreactive gas within a cavity 203 and ground electrode; the neutron absorber 202 may be a neutron absorbing foil or BoPET that has been coated with aluminum on either one or both sides and coated with a neutron absorbing material on either one or both sides; the neutron absorber 202 may also be a low-density medium; reaction products may escape both sides of the absorber 202 concurrently; the escaping reaction products may be measured simultaneously. Examples of the neutron reactive materials include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 17:
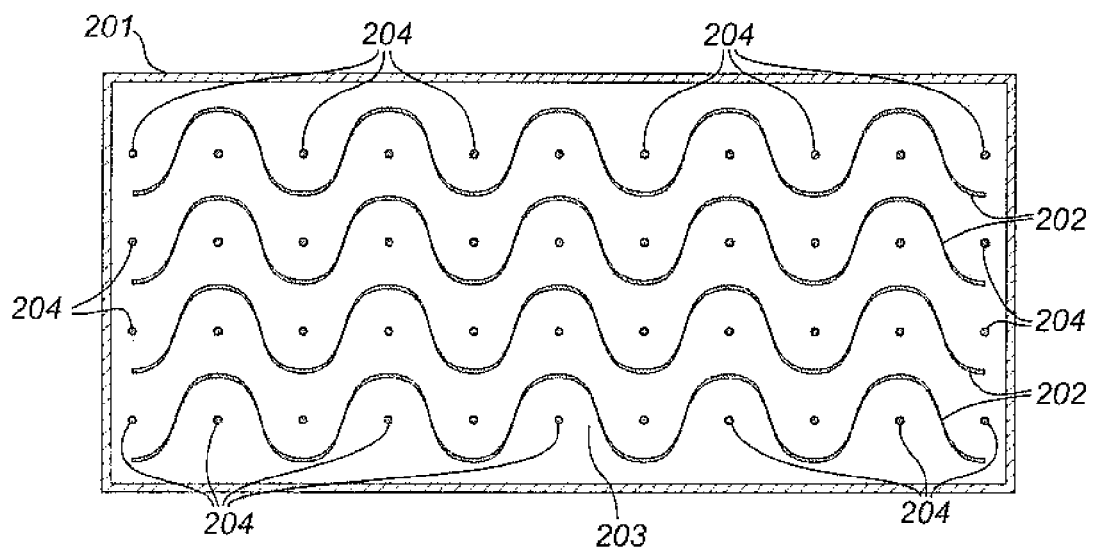
FIG. 17 is a cross sectional view of a gas-filled detector with multiple serpentine neutron absorbers weaving between multiple anodes; the neutron absorber may be a neutron absorbing foil or BoPET (Mylar) coated with aluminum or other conductive material(s) on either one or both sides and coated with a neutron absorbing material on either one or both sides; the neutron absorber may also be a low-density medium; the neutron absorber may also be an ultra-low-density medium; one or more reaction products may escape both sides of the absorber concurrently; the escaping reaction products may be measured simultaneously; the serpentine pattern reduces the amount of neutron streaming.

Referring now to FIG. 17, there is shown a cross-section of a preferred embodiment of the invention, showing a cross sectional view of a gas-filled detector of a planar device showing an outer electrode 201 that also serves as the gas container and cathode, a detector gas cavity 203, and multiple sheets of neutron absorber 202 weaving around multiple anode wires 204; the neutron absorber 202 may be a neutron absorbing foil or BoPET that has been coated with aluminum on either one or both sides and coated with a neutron reactive material on either one or both sides; the neutron absorber 202 may also be a low-density medium; the neutron absorber 202 may also be an ultra-low-density medium; reaction products may escape both sides of the absorber 202 concurrently; the escaping reaction products may be measured simultaneously. Examples of the neutron reactive materials include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 18:
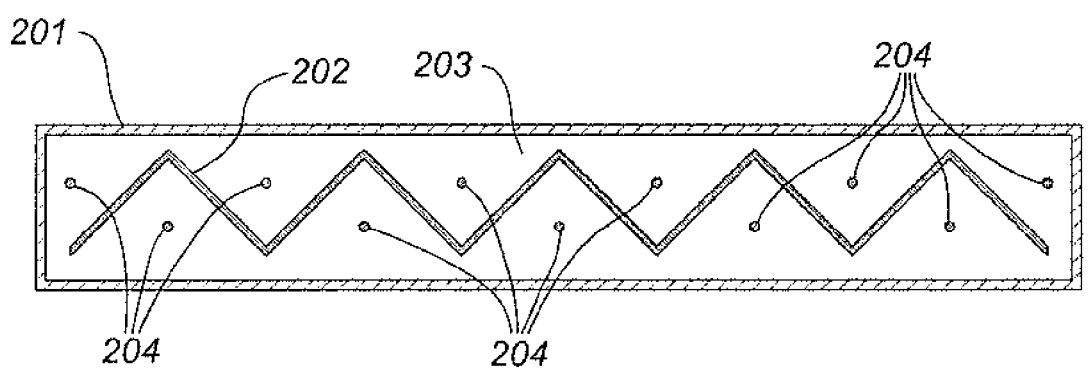
FIG. 18 is a cross sectional view of a gas-filled detector with a single herringbone (i.e. chevron) shaped neutron absorber weaved between multiple anode wires; the herringbone design reduces neutron streaming; the neutron absorber may be a neutron absorbing foil or BoPET (Mylar) coated with aluminum or other conductive materials(s) on either one or both sides and coated with a neutron absorbing material on either one or both sides; the neutron absorber may also be a low density; where one or more reaction products may escape both sides of the absorber concurrently; the escaping reaction products may be measured simultaneously.

Referring now to FIG. 18, there is shown a cross-section of a preferred embodiment of the invention, showing a cross sectional view of a gas-filled detector of a planar device showing an outer electrode 201 that also serves as the gas container and cathode, a detector gas cavity 203, and a single neutron absorber 202 weaving between multiple anode wires 204 in a chevron pattern; the multiple anodes 204 collect the energy from reaction products that escape both sides of the neutron absorber 202; the neutron absorber 202 may be a neutron absorbing foil or BoPET that has been coated with aluminum on either one or both sides and coated with a neutron reactive material on either one or both sides; the neutron absorber 202 may also be a low-density medium; the neutron absorber 202 may also be an ultra-low-density medium; reaction products may escape both sides of the absorber 202 concurrently; the escaping reaction products may be measured simultaneously. Examples of the neutron reactive materials include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 19:
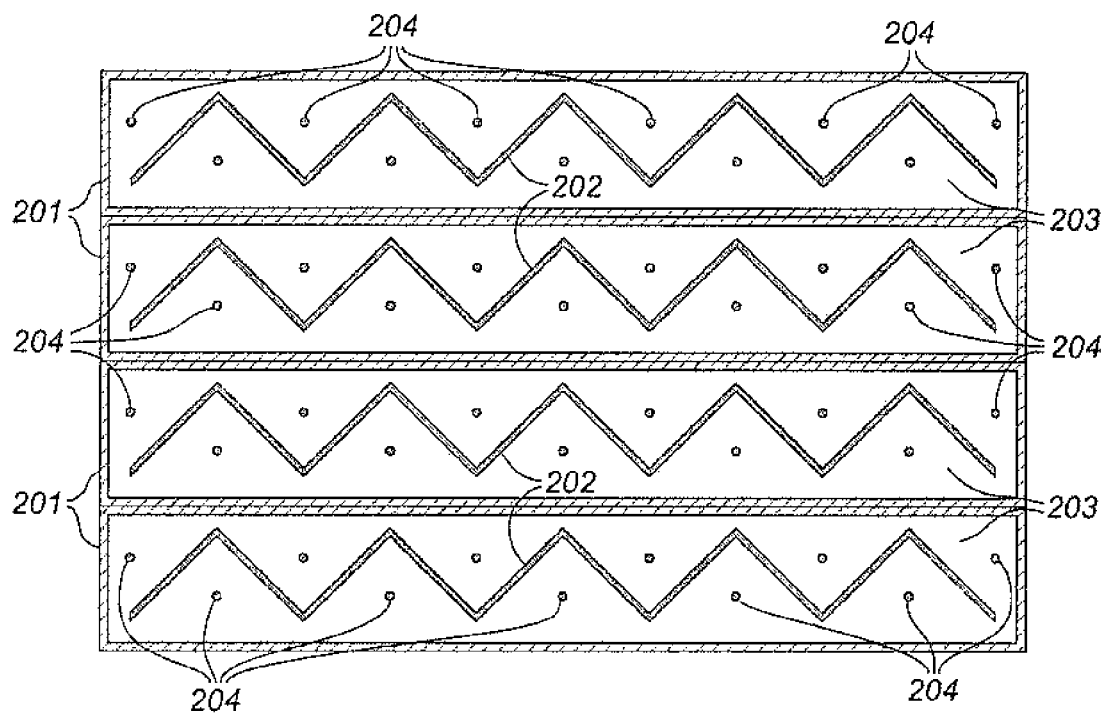
FIG. 19 is a cross sectional view of multiple single herringbone gas-filled detector modules connected together both physically and electrically; connecting multiple detector modules together creates a higher efficiency detector; the neutron absorber may also be a low density medium where one or more reaction products may escape both sides of the absorber concurrently; the escaping reaction products may be measured simultaneously.

Referring now to FIG. 19, there is shown a cross sectional view of four single planar gas-filled detectors connected both physically and electronically together to make a larger detector; in the example here, each module contains one neutron absorber 202 weaving between multiple anode wires in a chevron pattern 204 and contained within a housing 201 that acts as both a container for the nonreactive gas 203 and ground electrode; the neutron absorber 202 may be a neutron absorbing foil or BoPET that has been coated with aluminum on either one or both sides and coated with a neutron absorbing material on either one or both sides; the neutron absorber 202 may also be a low-density medium; the neutron absorber 202 may also be an ultra-low-density medium; reaction products may escape both sides of the absorber 202 concurrently; the escaping reaction products may be measured simultaneously. Examples of the neutron reactive materials include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 20:
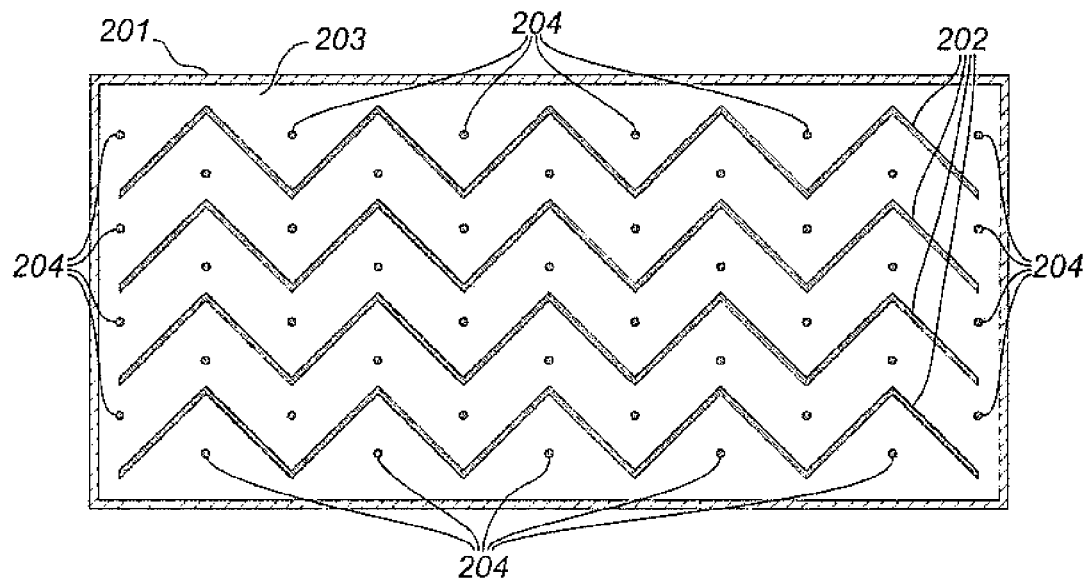
FIG. 20 is a cross sectional view of a single detector with multiple herringbone neutron absorbers weaved between multiple anode wires and all contained within a casing acting as an electrical ground, or cathode; the herringbone design reduces neutron streaming; the multiple layers of neutron absorber increase the detection efficiency; the neutron absorber may be a neutron absorbing foil or BoPET (Mylar) coated with aluminum or other conductive material(s) on either one or both sides and coated with a neutron absorbing material on either one or both sides; the neutron absorber may also be a low density medium where one or more reaction products may escape both sides of the absorber concurrently; the escaping reaction products may be measured simultaneously.

Referring now to FIG. 20, there is shown a cross-section of a preferred embodiment of the invention, showing a cross sectional view of a gas-filled detector of a planar device showing an outer electrode 201 that also serves as the gas container and cathode, a detector gas cavity 203, and multiple sheets of neutron absorber 202 weaving around multiple anode wires 204 in a chevron pattern; the neutron absorber 202 may be a neutron absorbing foil or BoPET that has been coated with aluminum on either one or both sides and coated with a neutron reactive material on either one or both sides; the neutron absorber 202 may also be a low-density medium; the neutron absorber 202 may also be an ultra-low-density medium; reaction products may escape both sides of the absorber 202 concurrently; the escaping reaction products may be measured simultaneously. Examples of the neutron reactive materials include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 21:
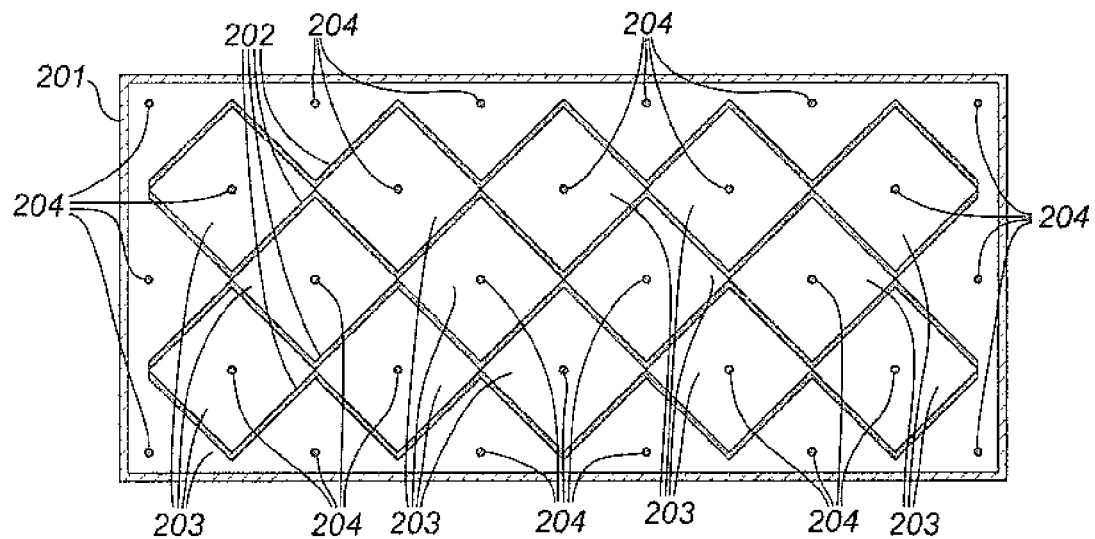
FIG. 21 is a cross sectional view of a gas-filled detector with multiple herringbone neutron absorbers stacked in opposite zigzag directions and weaved between multiple anode wires; the herringbone design reduces neutron streaming; the detector is filled with a nonreactive gas; the neutron absorber may be a neutron absorbing foil or BoPET (Mylar) coated with aluminum or other conductive materials(s) on either one or both sides and coated with a neutron absorbing material on either one or both sides; the neutron absorber may also be a low-density medium; the neutron absorber may also be an ultra-low-density medium; one or more reaction products may escape both sides of the absorber concurrently; the escaping reaction products may be measured simultaneously; the absorber sheet design is not limited to a particular angular orientation in reference to the cathode wall.

Referring now to FIG. 21, there is shown a cross-section of a preferred embodiment of the invention, showing a cross sectional view of a gas-filled detector of a planar device showing an outer electrode 201 that also serves as the gas container and cathode, a detector gas cavity 203, and multiple sheets of neutron absorber 202 weaving around multiple anode wires 204 stacked in opposite zigzag directions and weaved between multiple anode wires producing a form or herringbone pattern; the herringbone design reduces neutron streaming; the detector is filled with a nonreactive gas; the neutron absorber 202 may be a neutron absorbing foil or BoPET that has been coated with aluminum on either one or both sides and coated with a neutron reactive material on either one or both sides; the neutron absorber 202 may also be a low-density medium; the neutron absorber 202 may also be an ultra-low-density medium; reaction products may escape both sides of the absorber 202 concurrently; the escaping reaction products may be measured simultaneously. Examples of the neutron reactive materials include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 22:
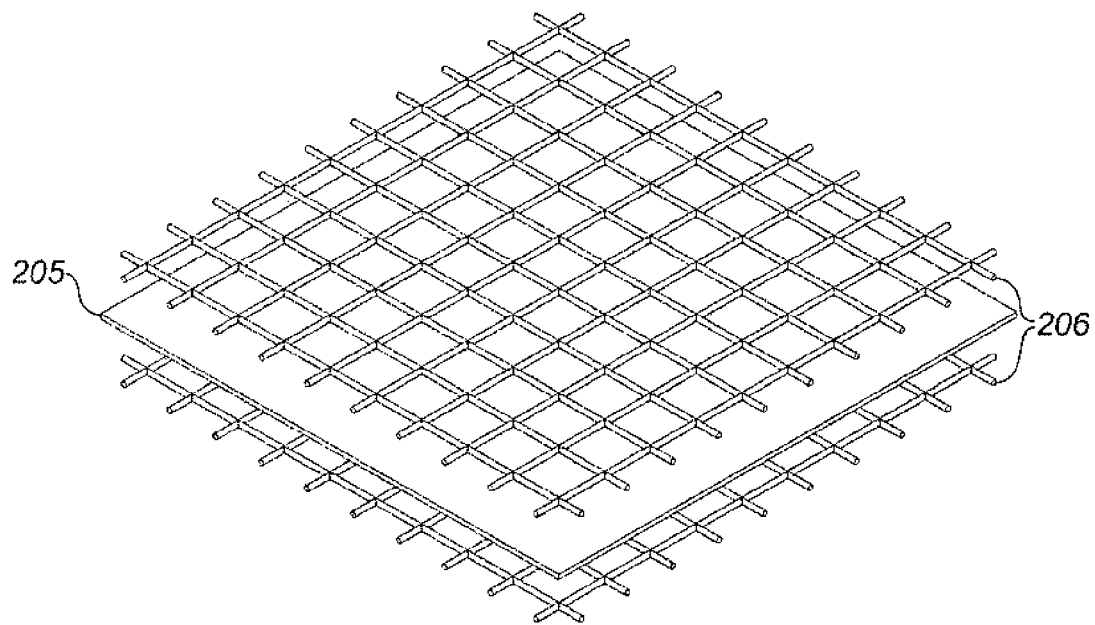
FIG. 22 is a sectional schematic view of a neutron absorber sandwiched between two metal wire frames; the wire frames act to support the neutron absorber structurally but also act as an electrical ground electrode; the wires of the wire frame may be of any diameter and the spacing between adjacent wires may also be any distance; the neutron absorber may be a neutron absorbing foil or BoPET (Mylar) coated with aluminum or other conductive material(s) on either one or both sides and coated with a neutron absorbing material on either one or both sides; the neutron absorber may also be a low-density medium; the neutron absorber may also be an ultra-low-density medium; one or more reaction products may escape both sides of the absorber concurrently; the neutron absorber may be bonded through any number of methods including but not limited to melting, welding, soldering, screws, nuts and bolts, and physical pressure contact; the wire mesh may also be composed of a neutron moderating material that does not affect the electric field in the detector.

Referring now to FIG. 22, there is shown a sectional schematic view of a preferred embodiment of a neutron detector absorber element 205 sandwiched between two metal wire frames 206; the wire frames 206 act to support the neutron absorber element 205 structurally but also act as an electrical ground electrode; the wires of each wire frame 206 may be of any diameter and the spacing between adjacent wires may also be any distance; the neutron absorber 205 may be a neutron absorbing foil or BoPET that has been coated with aluminum on either one or both sides and coated with a neutron absorbing material on either one or both sides; the neutron absorber 202 may also be a low-density medium; the neutron absorber 202 may also be an ultra-low-density medium; reaction products may escape both sides of the absorber 202 concurrently; the neutron absorber 202 may be bonded to the frames 206 through any number of methods including but not limited to melting, welding, soldering, screws, nuts and bolts, and physical pressure contact. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 23:
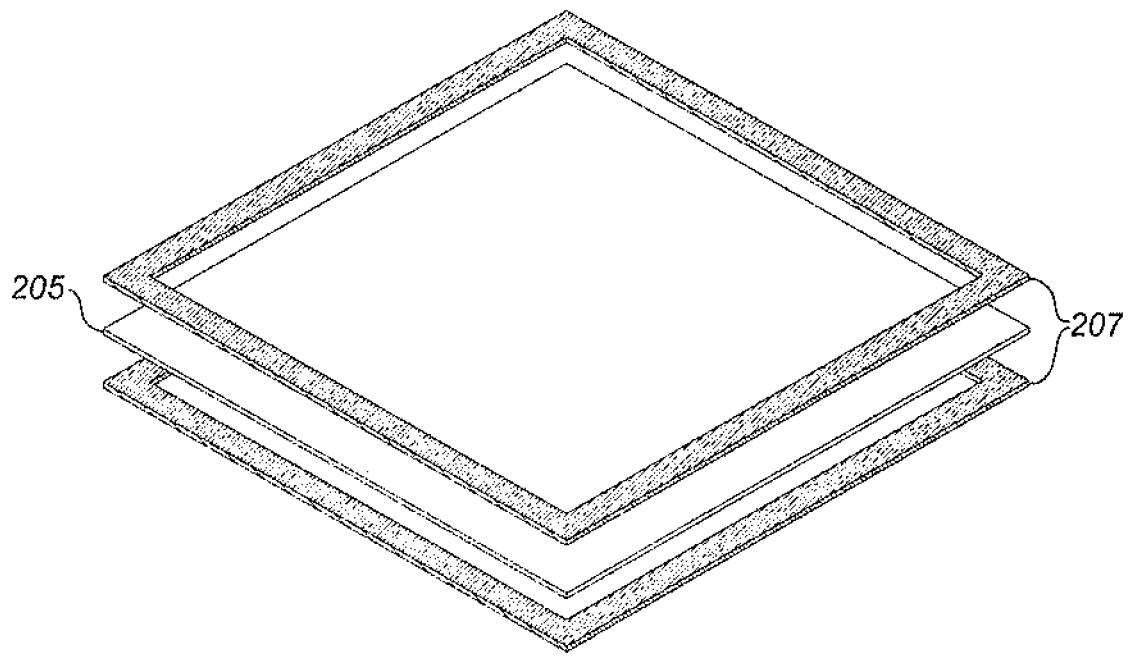
FIG. 23 is a schematic view of a neutron absorber sandwiched between two metal frames; the frames support the neutron absorbers physical structure and act as an electrical ground; the neutron absorber may be a neutron absorbing foil or BoPET (Mylar) coated with aluminum or other conductive material(s) on either one or both sides and coated with a neutron absorbing material on either one of both sides; the neutron absorber may also be a low-density medium; the neutron absorber may also be an ultra-low-density medium; one or more reaction products may escape both sides of the absorber concurrently; the neutron absorber may be clamped or bonded through a number of methods including but not limited to melting, welding, soldering, screws, nuts and bolts, and physical pressure contact; the frame may also be composed of a neutron moderating material that does not affect the electric field in the detector.

Referring now to FIG. 23, there is shown a schematic view of a preferred embodiment of a neutron detector absorber element 205 sandwiched between two metal frames 207; the frames 207 support the neutron absorber's 205 physical structure and act as an electrical ground; the neutron absorber 205 may be a neutron absorbing foil or BoPET that has been coated with aluminum on either one or both sides and coated with a neutron absorbing material on either one of both sides; the neutron absorber 205 may also be a low density medium where reaction products may escape both sides of the absorber 205 concurrently; the neutron absorber 205 may be clamped or bonded through a number of methods including but not limited to melting, welding, soldering, screws, nuts and bolts, and physical pressure contact. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 24:
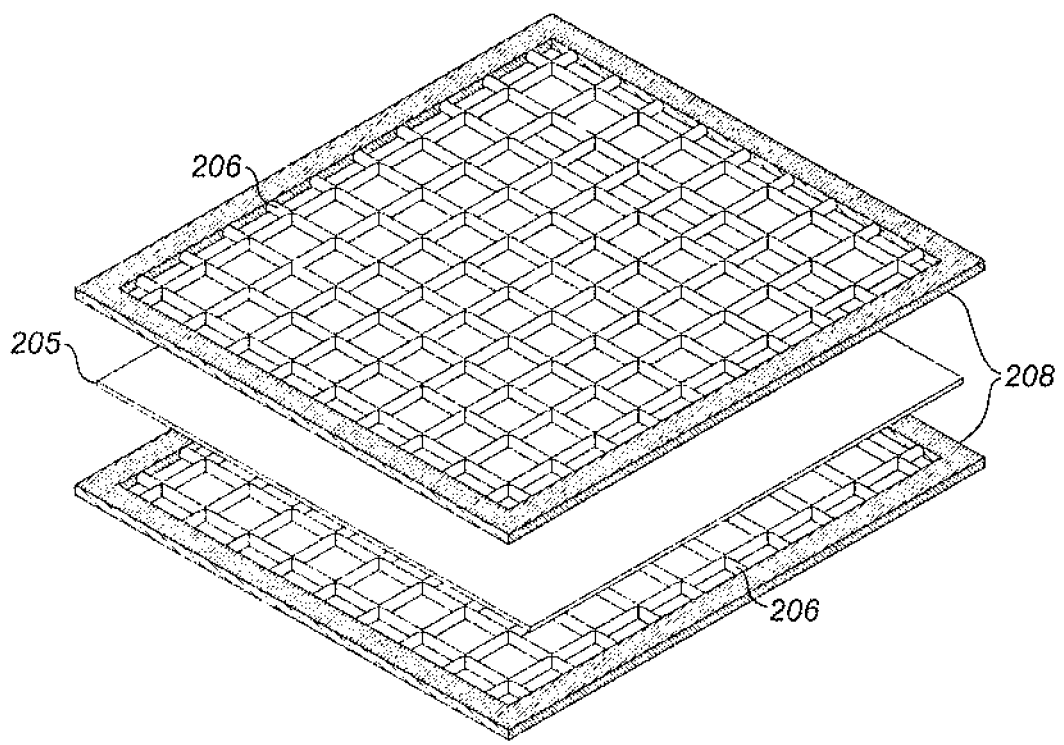
FIG. 24 is a schematic view of FIG. 22 and FIG. 23 combined where a wire mesh is joined with a frame to support the neutron absorber; the neutron absorber may be a neutron absorbing foil or BoPET (Mylar) coated with aluminum or other conductive material(s) on either one or both sides and coated with a neutron absorbing material on either one or both sides; the neutron absorber may also be a low density medium where one or more reaction products may escape both sides of the absorber concurrently; the frame and wire mesh may also be composed of a neutron moderating material that does not affect the electric field in the detector.

Referring now to FIG. 24, there is shown a schematic view of a preferred embodiment of a detector element where a wire mesh 208 is joined with a frame 206 to support a neutron absorber 205; the neutron absorber 205 may be a neutron absorbing foil or BoPET that has been coated with aluminum on either one or both sides and coated with a neutron absorbing material on either one or both sides; the neutron absorber 205 may also be a low-density medium; the neutron absorber 205 may also be an ultra-low-density medium; reaction products may escape both sides of the absorber 205 concurrently. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 25:
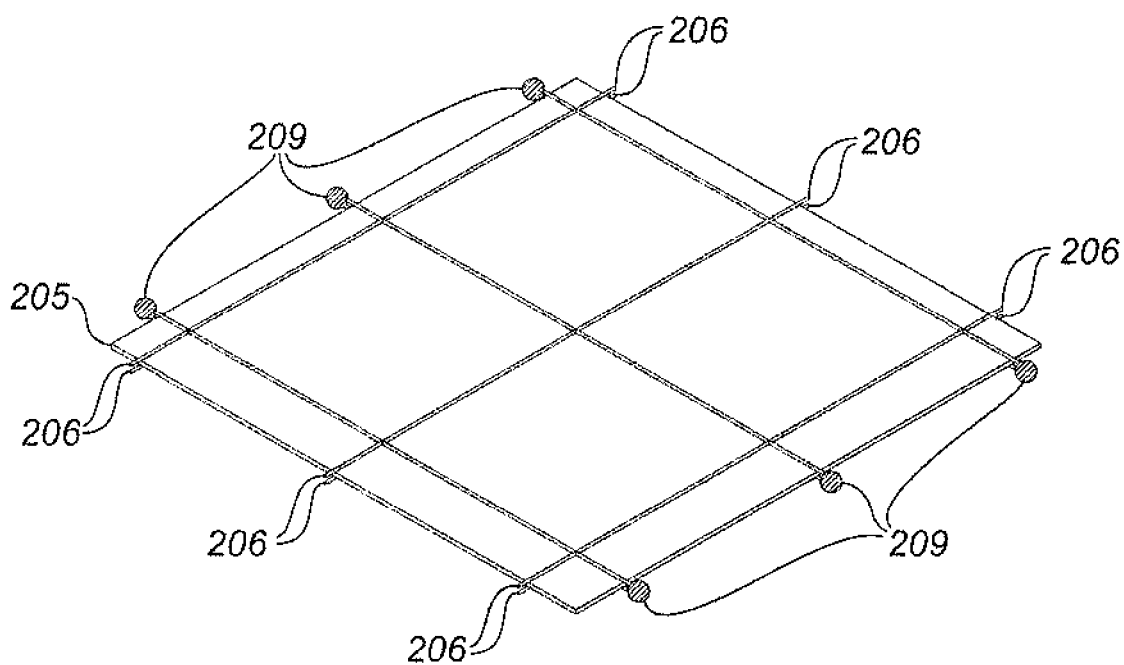
FIG. 25 is a schematic view of a neutron absorber sandwiched between two wire meshes similar to FIG. 22 where the two meshes are bonded together through solder or welding; the neutron absorber may be a neutron absorbing foil or BoPET (Mylar) coated with aluminum or other conductive material(s) on either one or both sides and coated with a neutron absorbing material on either one or both sides; the neutron absorber may also be a low-density medium; the neutron absorber may also be an ultra-low-density medium; one or more reaction products may escape both sides of the absorber concurrently.

Referring now to FIG. 25, there is shown a schematic view of a preferred embodiment of a neutron detector absorber element 205 sandwiched between two wire meshes 206 where the two meshes 206 are bonded together through solder or welding 209; the neutron absorber 205 may be a neutron absorbing foil or BoPET that has been coated with aluminum on either one or both sides and coated with a neutron absorbing material on either one or both sides; the neutron absorber 205 may also be a low density medium; reaction products may escape both sides of the absorber 205 concurrently. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 26:
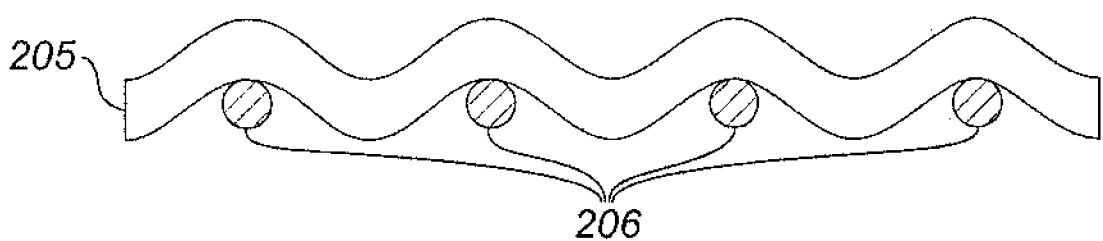
FIG. 26 is a cross sectional schematic view of neutron absorber melted onto a single wire mesh; the melted neutron absorber may begin to sag or bend between the voids but is not required to; the neutron absorber may be a neutron absorbing foil or BoPET (Mylar) coated with aluminum or other conductive material(s) on either one or both sides and coated with a neutron absorbing material on either one or both sides; the neutron absorber may also be a low-density medium; the neutron absorber may also be an ultra-low-density medium; one or more reaction products may escape both sides of the absorber concurrently.

Referring now to FIG. 26, there is shown a cross sectional schematic view of a preferred embodiment of a neutron detector absorber element 205 melted onto a single wire mesh 206; the melted neutron absorber 205 may begin to sag or bend between the voids but is not required to; the neutron absorber 205 may be a neutron absorbing foil or BoPET that has been coated with aluminum on either one or both sides and coated with a neutron absorbing material on either one or both sides; the neutron absorber 205 may also be a low density medium where reaction products may escape both sides of the absorber 205 concurrently. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 27:
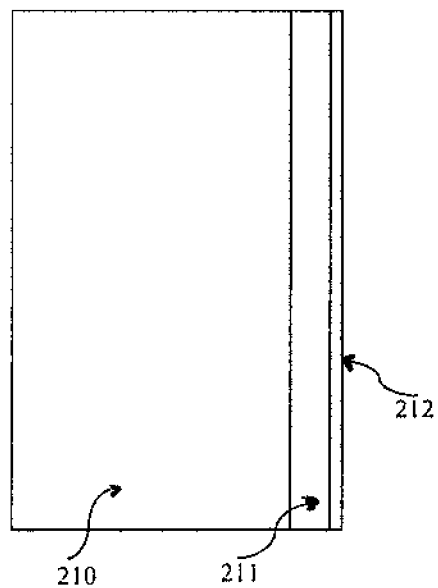
FIG. 27 is a cross sectional schematic view of a neutron absorber composed of BoPET (Mylar) coated with aluminum or other conductive material(s) on one side and a neutron absorbing material on the other; the overall thickness of the assembly is thin enough that more than one reaction product may escape the assembly concurrently; the BoPET (Mylar) may be replaced with other materials and the neutron absorber coating may be on both sides along with the aluminum if necessary; the overall assembly in any order should be thin enough that one or more reaction products may escape both sides of the absorber concurrently and be measured in the non-reactive gas volume simultaneously.

Referring now to FIG. 27, there is shown a cross sectional schematic view of a preferred embodiment of a neutron detector absorber element 211 composed of BoPET that has been coated with aluminum 212 on one side and a neutron absorbing material 210 on the other; the overall thickness of the assembly is thin enough that one or more reaction products may escape the assembly concurrently; the BoPET may be replaced with other materials and the neutron absorber coating may be on both sides along with the aluminum if necessary; the overall assembly in any event should be thin enough so that reaction products may escape both sides of the absorber 211 concurrently and be measured in the non-reactive gas volume simultaneously. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 28:
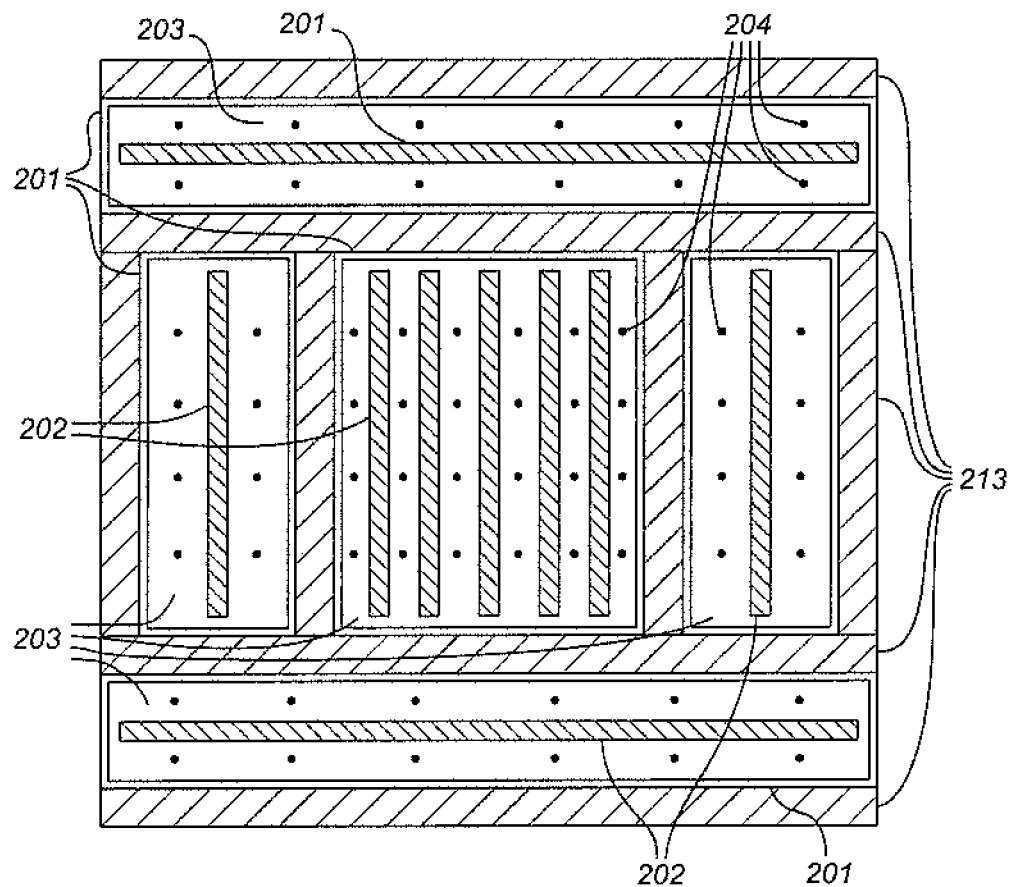
FIG. 28 is a cross sectional schematic view of a plurality of detector modules of different orientation and size bundled together with neutron moderator material layers incorporated into the assembly; the detectors are not limited to planar designs; the detectors are not limited to rectangular shape; the neutron moderator reduces the energy of high energy neutrons through scattering; the probability of absorbing a neutron increases with decreasing neutron energy; the neutron absorber may be an ultra-thin material or low-density high porosity absorber; one or more reaction products may escape the absorber concurrently and be measured in the gas volume simultaneously.

Referring now to FIG. 28, there is shown a cross sectional schematic view of a preferred embodiment of a neutron detector with a plurality of detector modules of different orientation and size bundled together with neutron moderator material layers 213 incorporated into the assembly; the detectors are not limited to planar designs; the detectors are not limited to rectangular shape; the neutron moderator 213 reduces the energy of high energy neutrons through scattering; the probability of absorbing a neutron increases with decreasing neutron energy; a neutron absorber 202 may be an ultra-thin member or a low density, high porosity absorber; one or more reaction products may escape the absorber 202 concurrently and be measured in the gas volume simultaneously. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of moderators include hydrogenous material such as high density polyethylene (HDPE).

Figure 29:
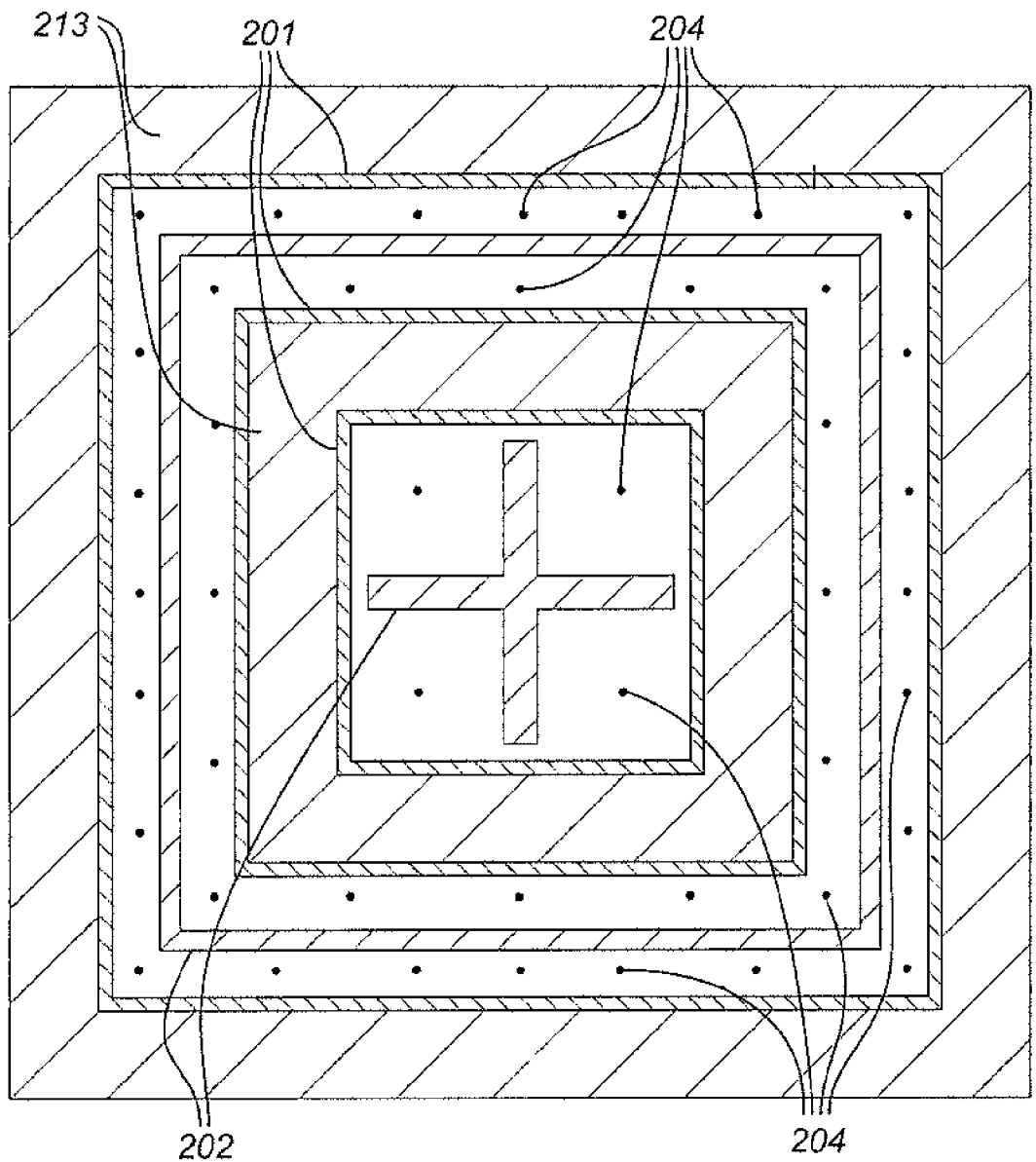
FIG. 29 is a cross sectional schematic view of alternating gas-filled neutron detectors with neutron moderator in a square pattern; the design is not limited to square shapes; the neutron absorber may be an ultra-thin material or low-density high porosity absorber where one or more reaction products may escape the absorber concurrently and be measured in the gas volume simultaneously.

Referring now to FIG. 29, there is shown a cross sectional schematic view of alternating gas-filled neutron detectors with neutron moderator members 213 in a square pattern; the design is not limited to square shapes; a neutron absorber 202 may be an ultra-thin member or low density high porosity absorber; one or more reaction products may escape the absorber 202 concurrently and be measured in the gas volume simultaneously. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of moderators include hydrogenous material such as high density polyethylene (HDPE).

Figure 30:
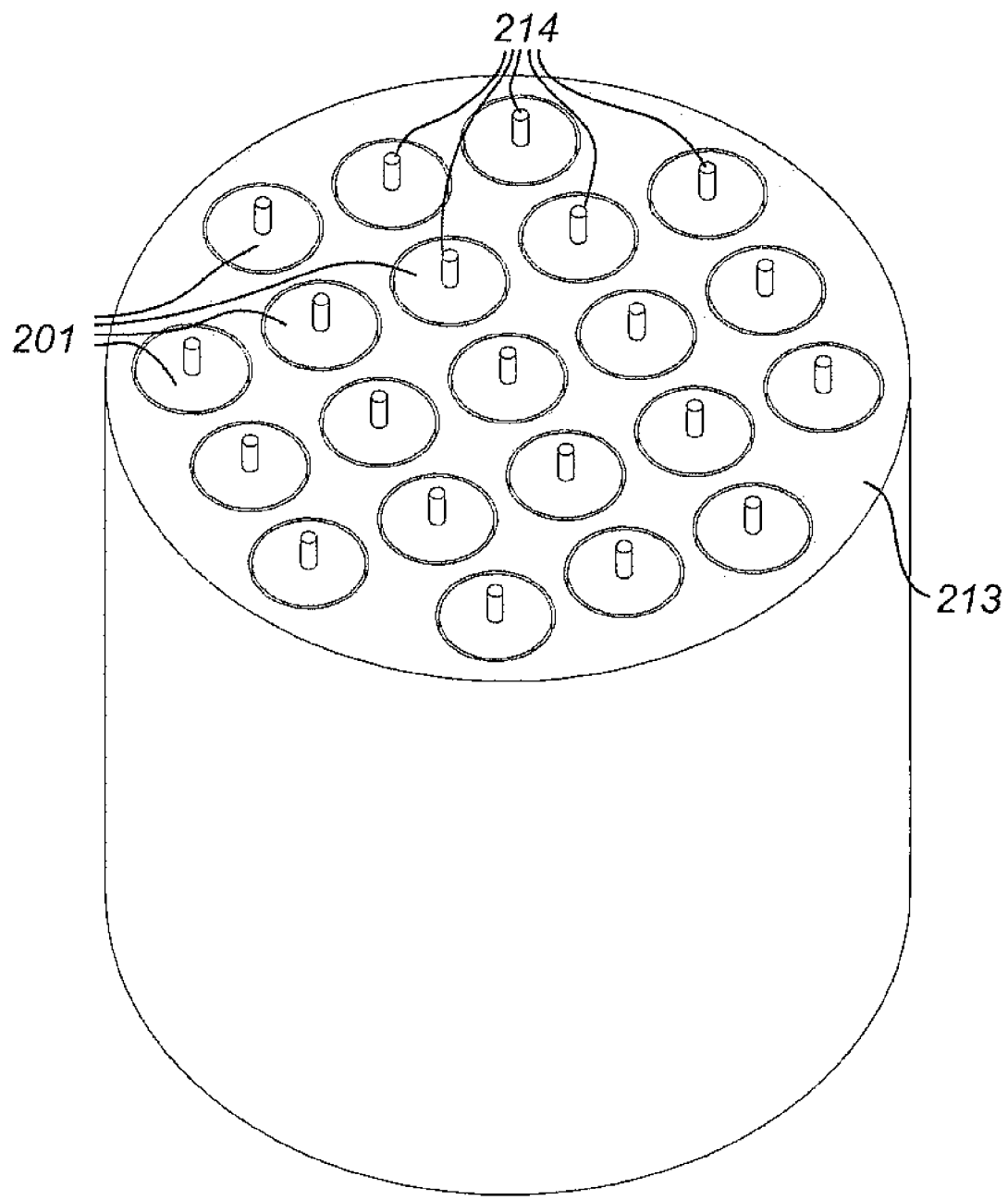
FIG. 30 is an isometric schematic view of a plurality of detectors inserted into a neutron moderator mold; the neutron moderator mold is not restricted to cylindrical shape; the neutron detectors are not limited to tube form factors; the distance between the neutron detectors is not limited in the moderator and the moderator may not be required if the detectors are densely packed.

Referring now to FIG. 30, there is shown an isometric schematic view of a plurality of detectors constructed in accordance with at least one embodiment of the present invention and inserted into a neutron moderator mold 213; the neutron moderator mold 213 is not restricted to cylindrical shape; the neutron detectors 201 are not limited to tube form factors. The outer shell 201 of each of the detectors is biased negatively relative to its respective inner electrode 214.

Figure 31:
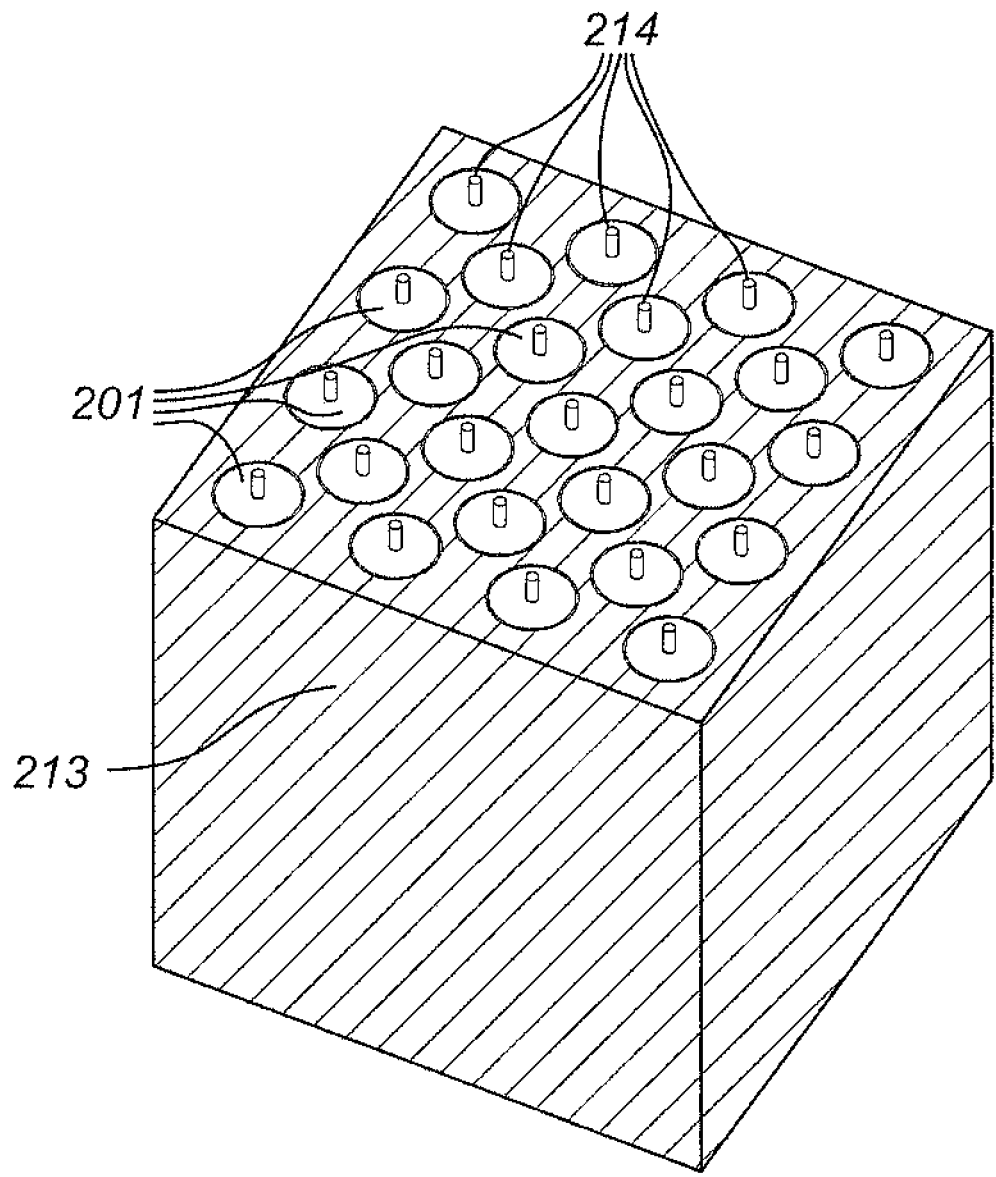
FIG. 31 is an isometric schematic view of a plurality of neutron detectors inserted into a neutron moderator mold; the neutron moderator mold is not restricted to cube shape; the neutron detectors are not limited to tube form factors; the distance between the neutron detectors is not limited in the moderator and the moderator may not be required if the detectors are densely packed.

Referring now to FIG. 31, there is shown an isometric schematic view of a plurality of neutron detectors constructed in accordance with at least one embodiment of the present invention inserted into a neutron moderator mold 213; the neutron moderator mold 213 is not restricted to cube shape; the neutron detectors are not limited to tube form factors. The outer shell 201 of each of the detectors is biased negatively relative to its respective inner electrode 214.

Figure 32:
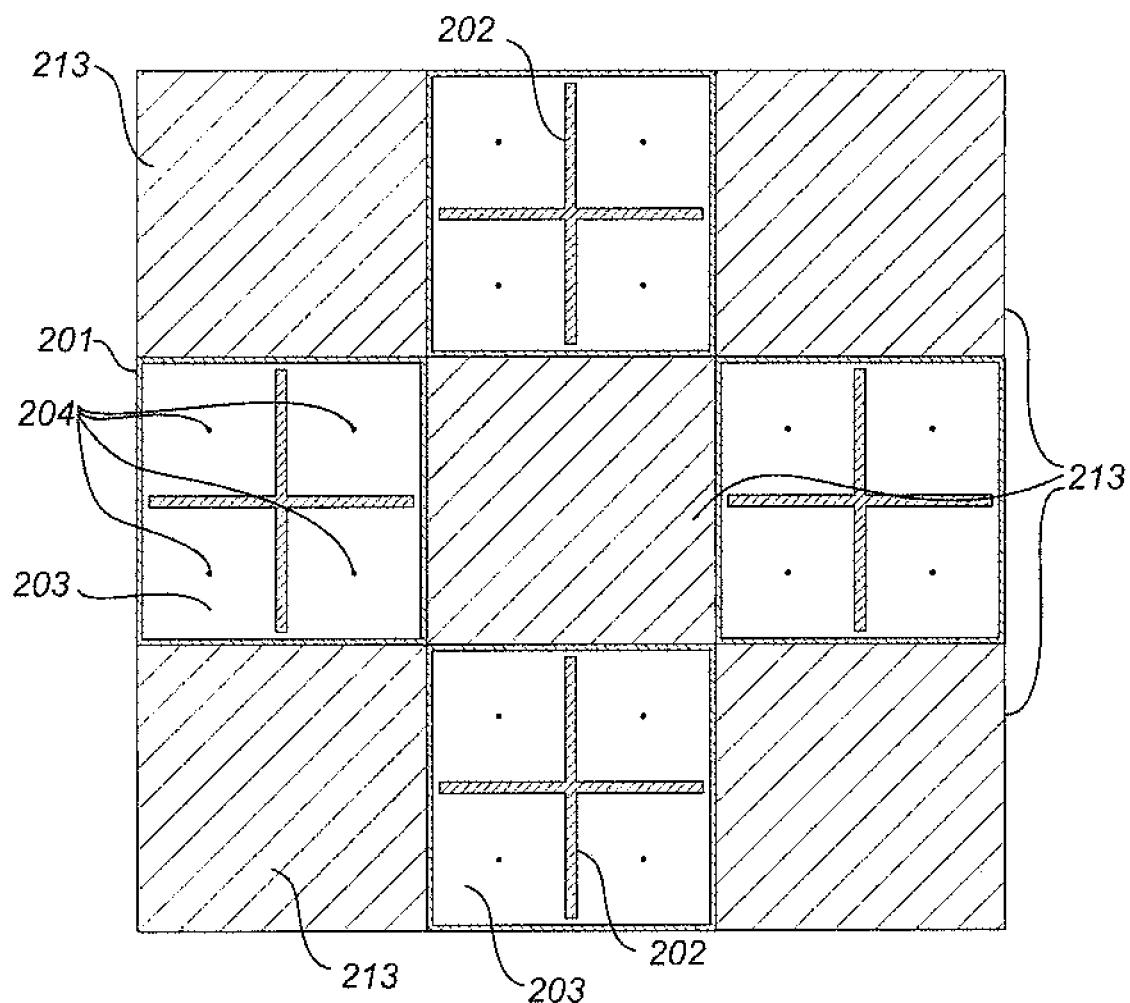
FIG. 32 is a cross sectional schematic view of two directional modular stacking of gas-filled neutron detectors and neutron moderator sections; the moderator is not limited to square dimensions; the gas-filled neutron detectors are not limited to square dimensions; the internal configuration of the absorber layers and anodes in the detectors is not limited to any particular design.

Referring now to FIG. 32, there is shown a cross sectional schematic view of two directional (i.e., 2-D) modular stacking of gas-filled neutron detectors and neutron moderator sections 213; the moderator sections 213 are not limited to square dimensions; the gas-filled neutron detectors are not limited to square dimensions; the neutron reactive members 202 are inserted to reduce neutron streaming. Anodes 204 are biased positively with respect to each detector shell 201.

Figure 33:
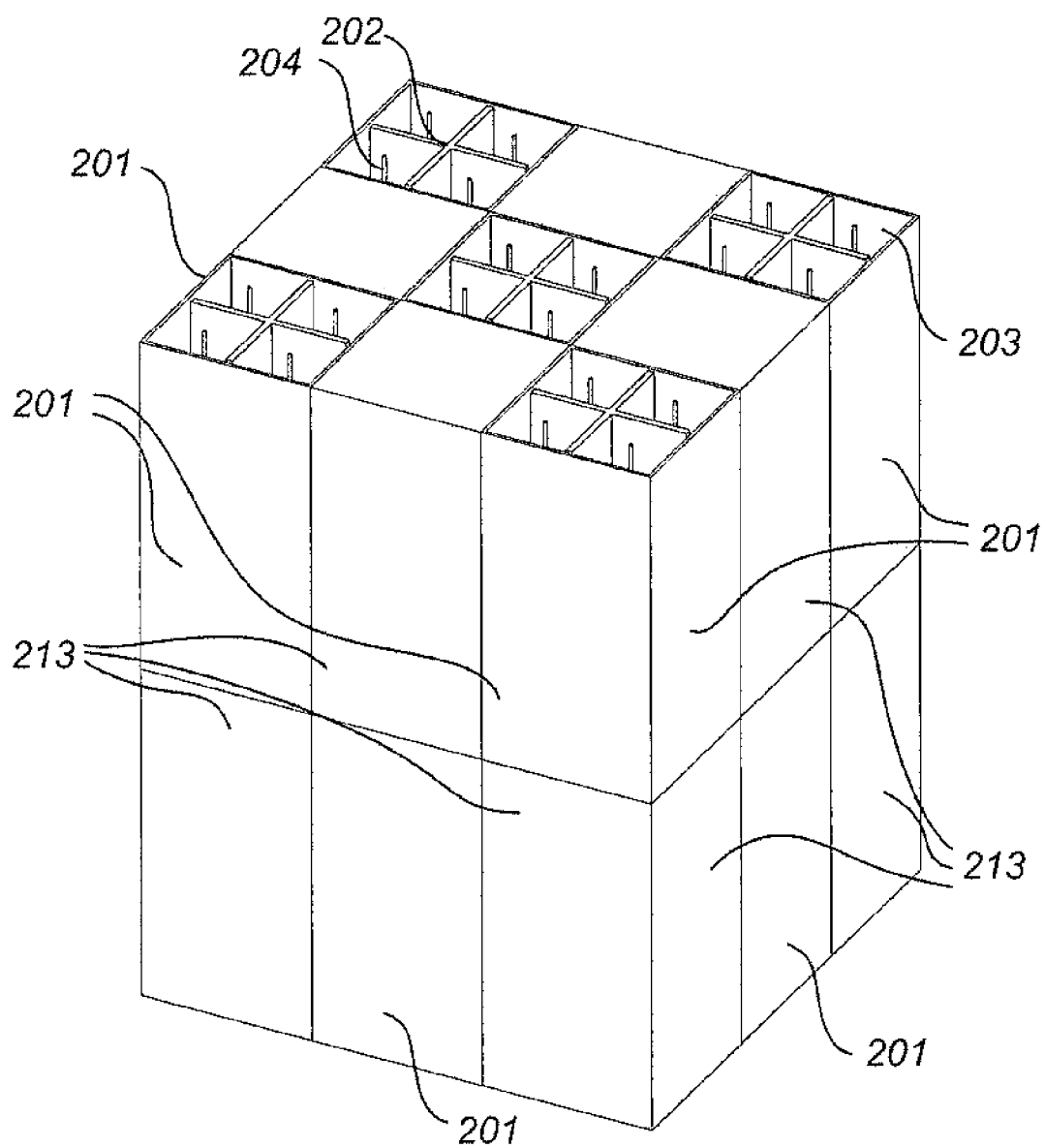
FIG. 33 is an isometric cross sectional schematic view of three directional modular stacking of gas-filled neutron detectors and neutron moderator sections; the neutron moderator and gas-filled neutron detectors are not limited to cube shapes; the neutron absorber in the gas-filled neutron detectors are not limited to quadrant form factors; the neutron absorber is designed that one or more reaction products escape concurrently and are measured in the gas volume simultaneously.

Referring now to FIG. 33, there is shown an isometric cross sectional schematic view of three directional (i.e., 3-D) modular stacking of gas-filled neutron detectors and neutron moderator sections 213; the neutron moderator sections 213 and gas-filled neutron detectors are not limited to cube shapes; a neutron absorber 202 in each gas-filled neutron detector is not limited to quadrant form factors; the neutron absorber 202 is designed so that more than one reaction products may escape concurrently and can be measured in the gas cavity or volume 203 simultaneously.

Figure 34:
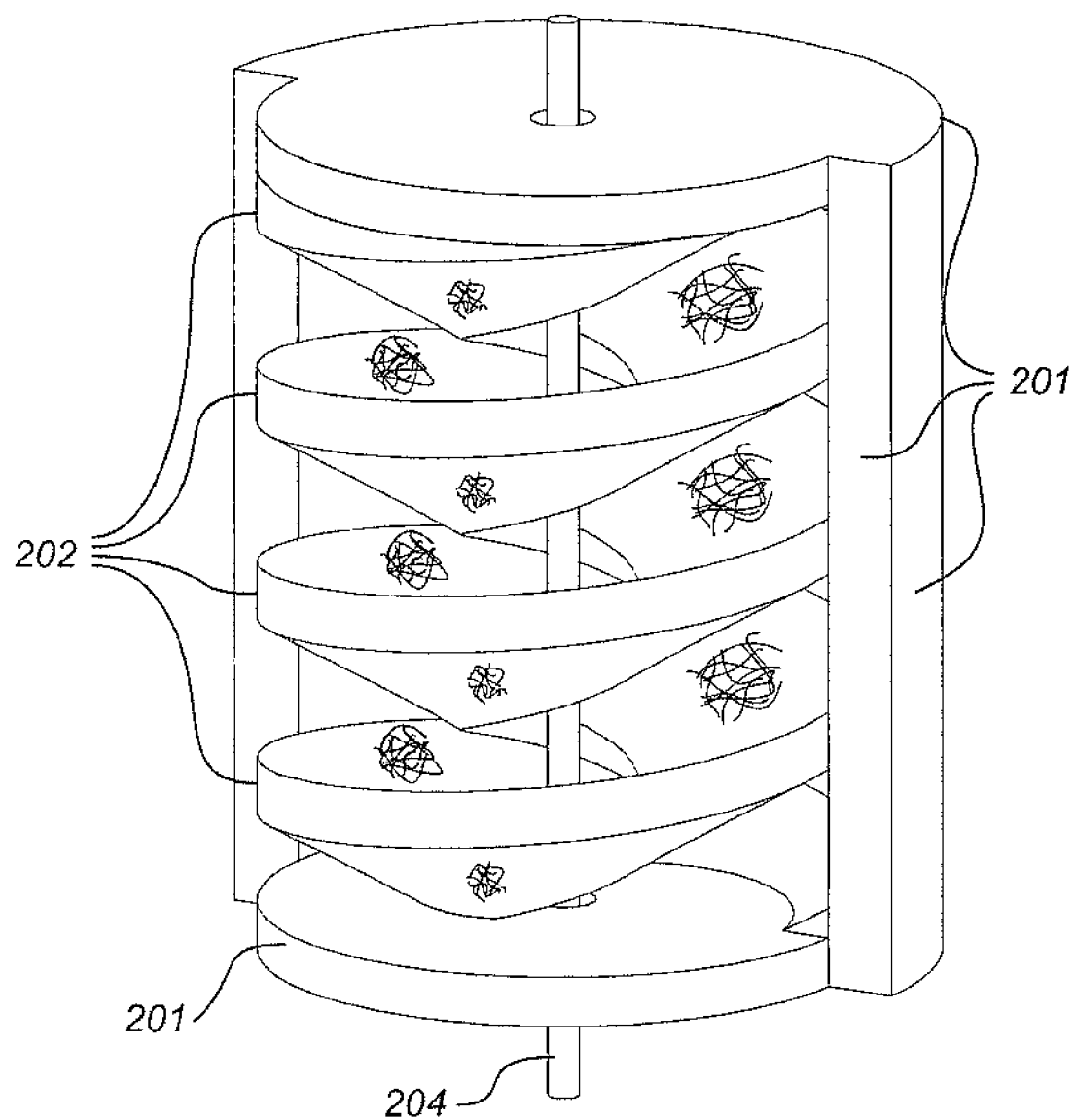
FIG. 34 is a cross sectional schematic view of a coaxial gas-filled neutron detector; the neutron absorber in the gas-filled neutron detector is an angular corkscrew; the angle of the corkscrew is not perpendicular to the longitudinal thin anode wire but angled as to prevent neutron streaming; a third electrical grid may also be included between the absorber and anode wire to assist with charge collection; the neutron absorber is designed such that one or more reaction products may escape the absorber concurrently and be measured in the gas volume simultaneously.
Figure 35:
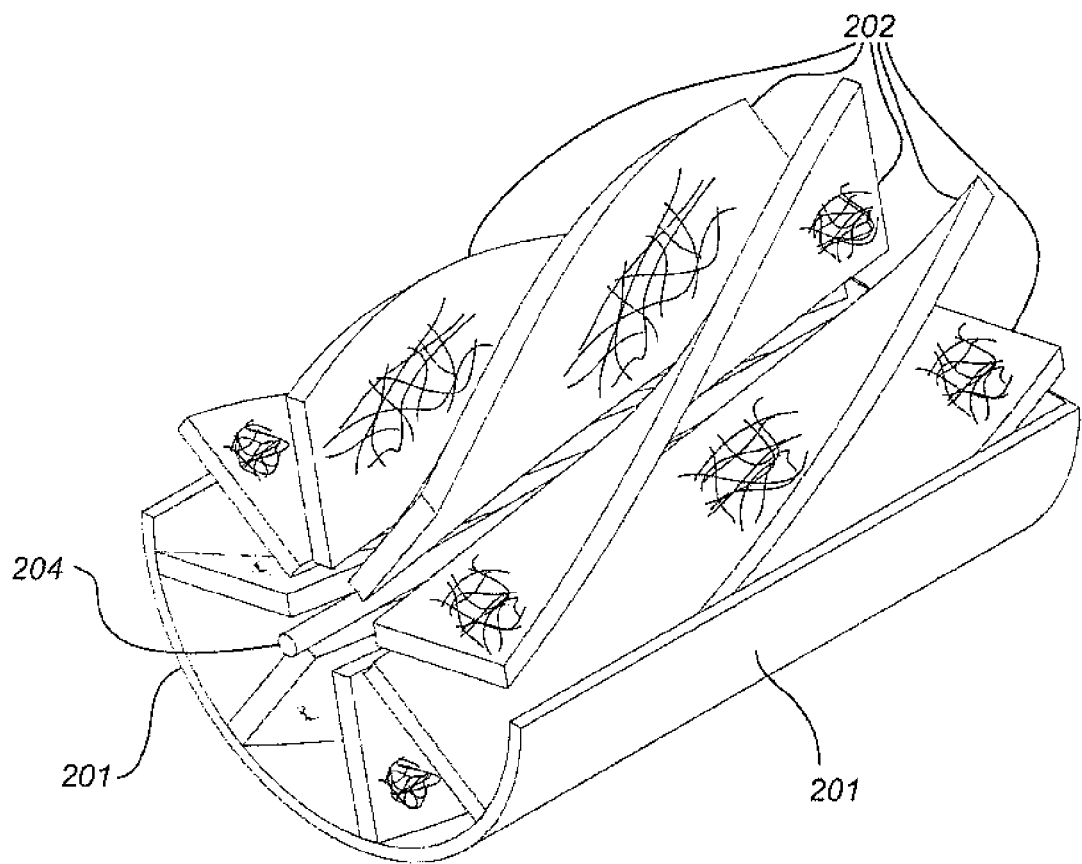
FIG. 35 is a cross sectional schematic view of a coaxial gas-filled neutron detector; the neutron absorber in the gas-filled neutron detector is a rotated, or twisted, finned form factor, similar to the look of a Twizzler (i.e., helical or spiral twist); the neutron absorber is designed such that one or more reaction products may escape the absorber concurrently and be measured in the gas volume simultaneously.

Referring now to FIG. 34, there is shown a cross sectional schematic view of a coaxial gas-filled neutron detector; a neutron absorber 202 in the gas-filled neutron detector is an angular corkscrew; the angle of the corkscrew is not perpendicular to a longitudinal thin anode wire 204 but is angled so as to prevent neutron streaming; a third electrical grid (not shown) may also be included between the absorber 202 and the anode wire 204 to assist with charge collection; the neutron absorber 202 is designed such that more than one reaction product may escape the absorber 202 concurrently and can be measured in the gas volume simultaneously;

Referring now to FIG. 35, there is shown a cross sectional schematic view of a coaxial gas-filled neutron detector; a neutron absorber 202 of the gas-filled neutron detector is a rotated, or twisted, finned form factor, similar to the look of a Twizzler; the neutron absorber 202 is designed such that more than one reaction product may escape the absorber 202 concurrently and can be measured in the gas volume simultaneously.

Figure 36:
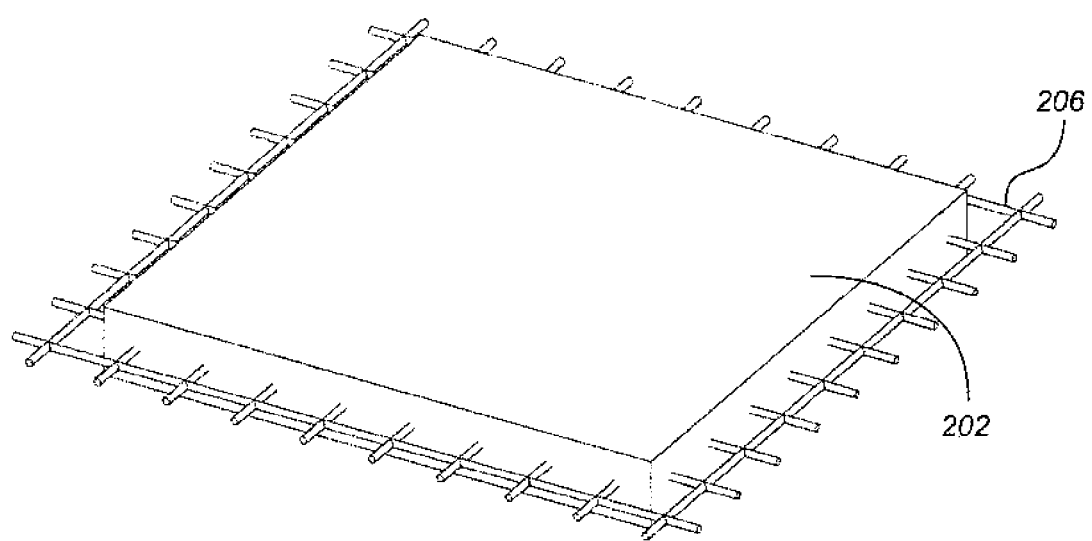
FIG. 36 is a isometric view of an electrical ground grid encased in neutron absorber; the one or more reaction products may escape the neutron absorber sheet concurrently and be measured in a gas volume simultaneously; the grid may also act as a structure support to the neutron absorber; the dimensions are not limited to sheets but may also be, but not limited to, cylinders, parallelepipeds, etc.

Referring now to FIG. 36, there is shown an isometric view of a neutron reactive absorber sheet 202 with an electrical ground grid 206 encased in the neutron absorber 202; reaction products may escape the neutron absorber sheet 202 concurrently and can be measured in a gas volume simultaneously; the grid 206 may also act as a structure support to the neutron absorber 202; the shape of the absorber 202 is not limited to sheets but may also be, but not limited to, cylinders, parallelepipeds, etc. The grid 206 may also be composed of neutron moderating materials which do not affect the electric field in the detector. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 37:
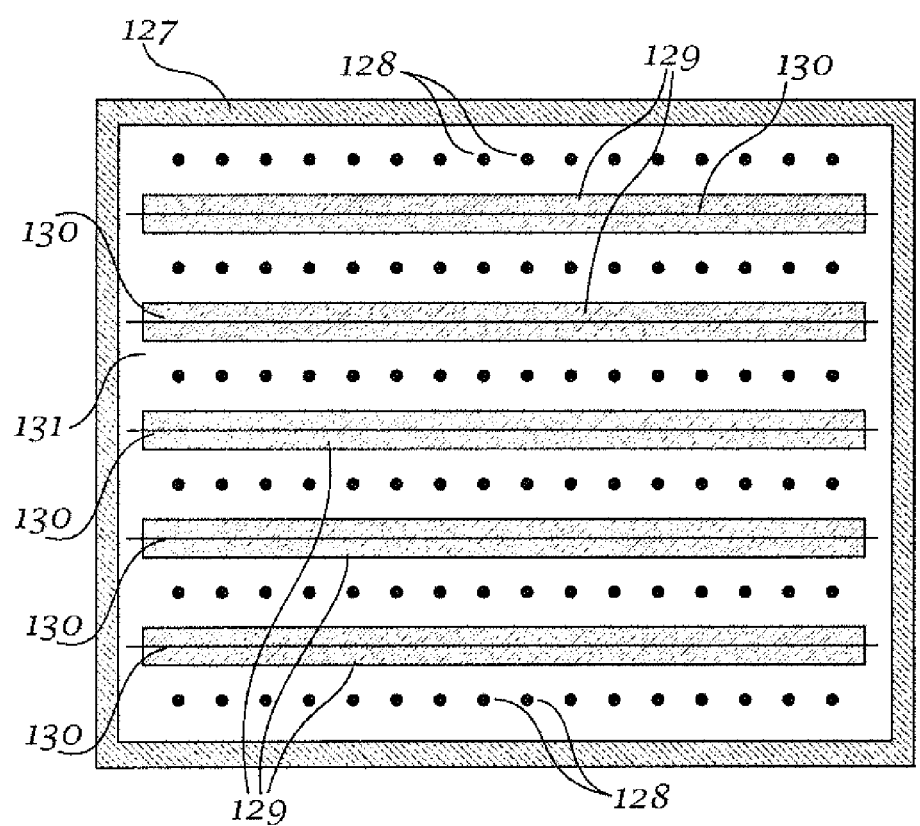
FIG. 37 is a sectional view of a cross section of a preferred embodiment showing several electrical ground grids encased in neutron absorbers suspended in a common detector cavity; the grid may also act as a structure support to the neutron absorber; the dimensions are not limited to sheets but may also be, but not limited to, cylinders, parallelepipeds, etc.

Referring now to FIG. 37, there is shown a sectional view of a cross section of a preferred embodiment of a detector showing several electrical ground grids 130 encased in neutron absorbers 129 suspended in a common detector cavity 127; wire electrodes 128 are strung around the neutron absorbers 129; neutron absorber 129 thickness is of the order of the combined reaction products ranges or less; the grids 130 may also act as structure supports for the neutron absorbers 129; the shapes of the absorbers 129 are not limited to sheets but may also be, but not limited to, cylinders, parallelepipeds, etc. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 38:
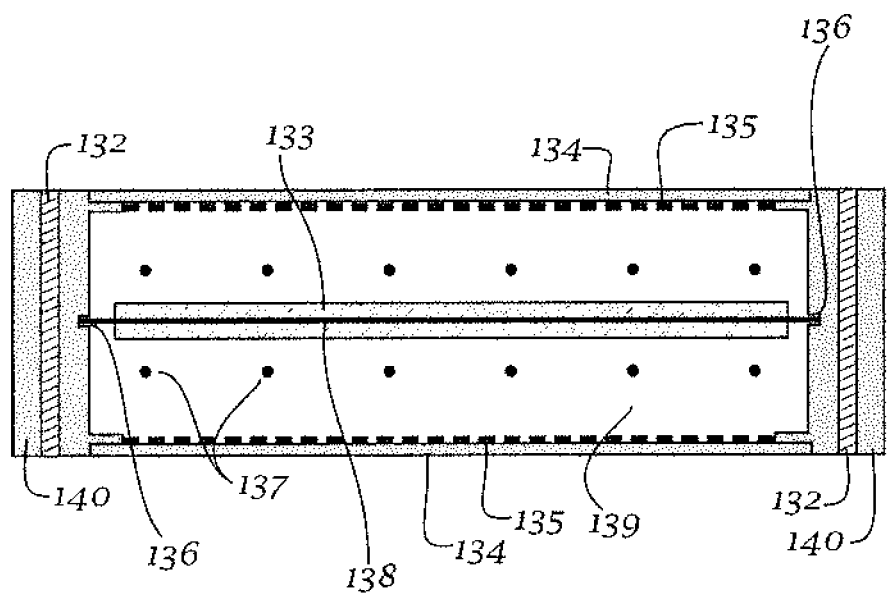
FIG. 38 is a sectional view of a cross section of a preferred embodiment showing a ground grid encased in neutron absorber inserted into indexing grooves in a modular detector cavity; the grid may also act as a structure support to the neutron absorber; the dimensions are not limited to sheets but may also be, but not limited to, cylinders, parallelepipeds, etc.; the sides of the cavity are removable and allow several modules to be connected to form a single detector cavity.

Referring now to FIG. 38, there is shown a sectional view of a cross section of a preferred embodiment showing a modular detector compartment with a grounded grid 138 encased in a neutron absorber 133 inserted into indexing grooves 136 in a modular, gas-filled, detector cavity 139; the grid 138 may also serve as a structural support for the neutron absorber 133; wire electrodes 137 are strung on each side of the neutron absorber 133; removable, conductive, opaque plates 134 seal the detector cavity 139; grid wire planes 135 can also be present on the sides of the detectors cavity, thereby, allowing for a grounding grid boundary for cases in which the opaque plates 134 are removed; the neutron absorber 133 thickness is of the order of the combined reaction products ranges or less; additional modules can be connected with bolts inserted through connecting alignment holes 132 which extend through the cavity box 140; the shape of the absorber 133 is not limited to a sheet but may also be, but not limited to, cylinders, parallelepipeds, etc.; the sides 134 of the cavity 139 are removable and allow several modules to be connected to form a single detector cavity. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 39:
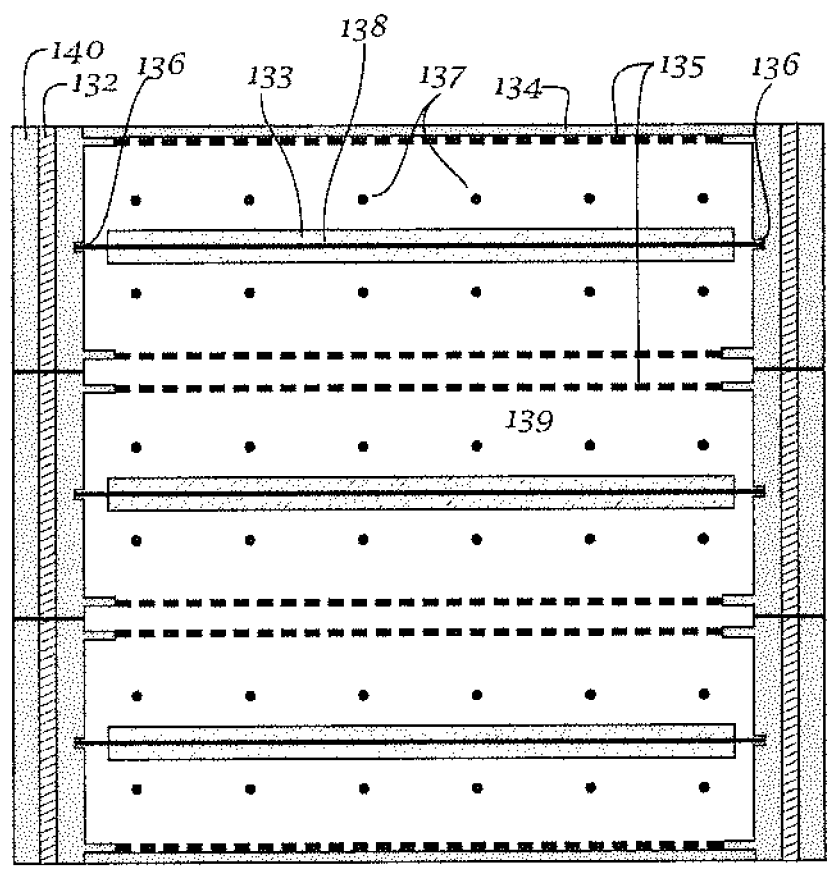
FIG. 39 is a sectional view of a cross section of a preferred embodiment showing ground grids encased in neutron absorbers inserted into indexing grooves in modular detector cavities; showing the stacking of three such modular cavities to construct a single cavity; the grids may also act as structure supports to the neutron absorbers.

Referring now to FIG. 39, there is shown a sectional view of a cross section of a preferred embodiment showing three stacked modular detector compartments with a grounded grid 138 encased in neutron absorber 133 inserted into indexing grooves 136 in a modular, gas-filled, detector cavity 139; the grid 138 may also serve as a structural support for the neutron absorber 133; wire electrodes 137 are strung on each side of the neutron absorber 133; removable conductive opaque plates 134 seal the detector cavity 139; grid wire planes 135 can also be present on the sides of the detector cavity 139, thereby, allowing for a grounding grid boundary for cases in which the opaque plates 134 are removed; the neutron absorber 133 thickness is of the order of the combined reaction products ranges or less; the modules can be fastened together with bolts inserted through connecting alignment holes 132 which extend through the cavity boxes 140; the shapes of the absorbers 133 are not limited to sheets but may also be, but not limited to, cylinders, parallelepipeds, etc.; the sides 134 of the cavity 139 are removable and allow several modules to be connected to form a single detector cavity. Examples of the neutron reactive materials that may be included as the coating or foil include boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 40:
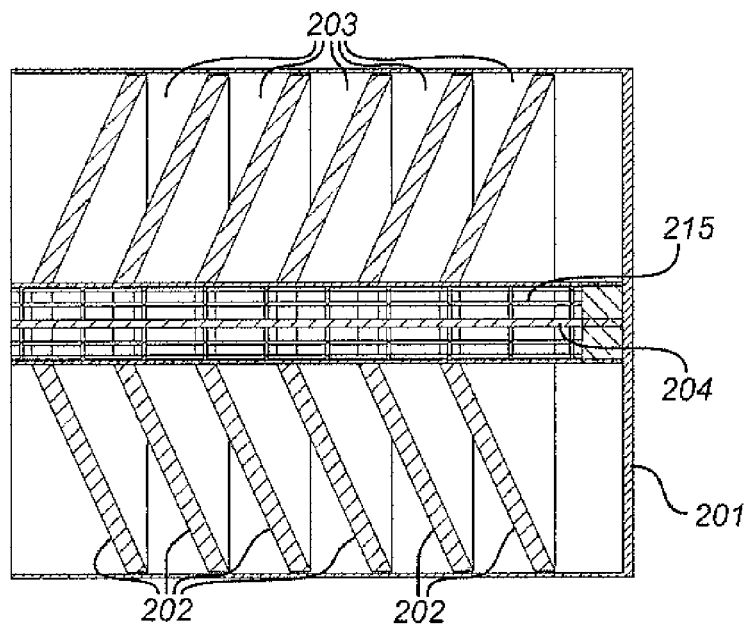
FIG. 40 is a cross sectional schematic view of a coaxial gas-filled neutron detector where the neutron absorbing material is a series of angled washers; one or more reaction products may escape both sides of the neutron absorber concurrently and be measured in the non-reactive gas region simultaneously; there is an electrically conductive grid between the neutron absorber washers and the thin anode wire; the grid assists with charge collection.

Referring now to FIG. 40, there is shown a cross sectional schematic view of a coaxial gas-filled neutron detector where the neutron absorbing material takes the form of a series of angled washers 202; reaction products may escape both sides of each neutron absorber 202 concurrently and can be measured in the non-reactive gas region simultaneously; there is an electrically conductive grid 215 between the neutron absorber washers 202 and a thin anode wire 204; the grid 215 assists with charge collection.

Figure 41:
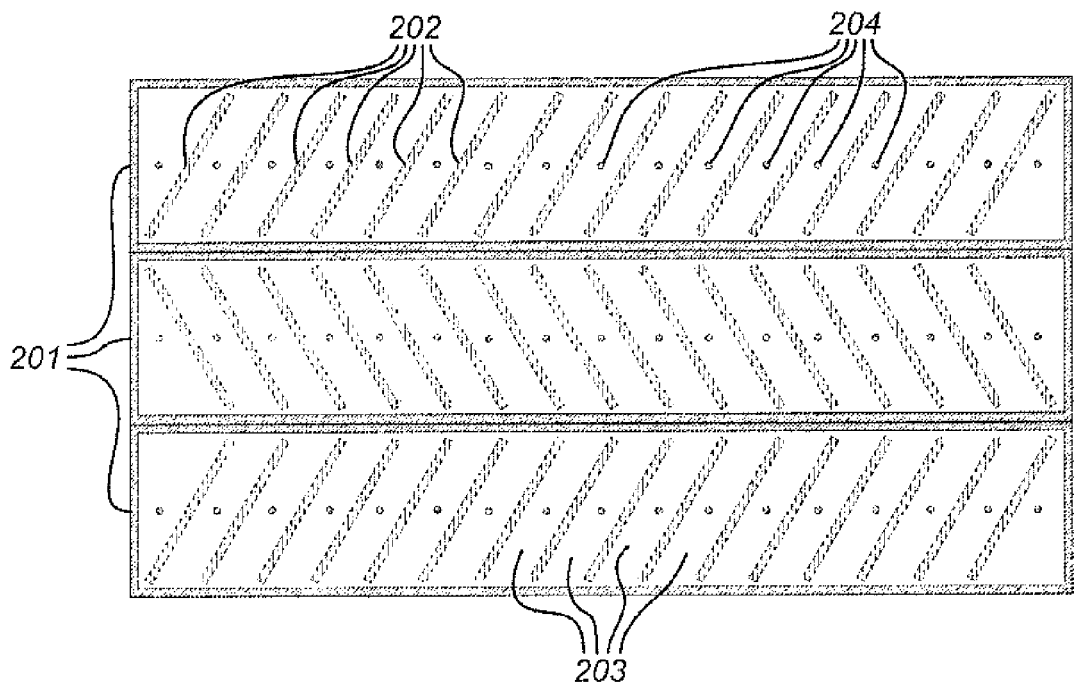
FIG. 41 is a cross sectional view of three separate chambers each with a series of angled louvers with a thin anode wire between each louver; the louvers are composed of either ultra-thin neutron absorber or low-density high-porosity material, both allow one or more reaction products to escape both sides concurrently and be measured simultaneously in a non-reactive gas volume; the louvers are not restricted to any particular angle; the casing acts as a boundary to enclose the non-reactive charge transport gas and as a ground electrode.

Referring now to FIG. 41, there is shown a cross sectional view of three separate detector chambers each with a series of angled, neutron-reactive louvers 202 and a thin anode wire 204 between each louver 202; each louver 202 is composed of either an ultra-thin neutron absorber or low-density high-porosity material, both of which allow reaction products to escape concurrently and can be measured simultaneously in a non-reactive gas volume 203; the louvers 202 are not restricted to any particular angle; a casing 201 acts as a boundary to enclose the non-reactive, charge transport gas and as a ground electrode.

Figure 42:
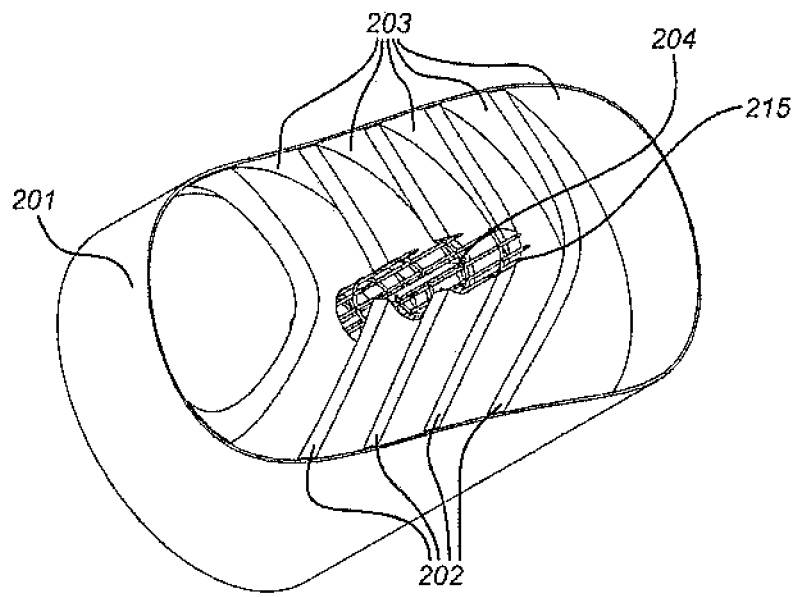
FIG. 42 is a cross sectional schematic view of a cut out of a coaxial neutron detector; this is a different angle of the same detector in FIG. 40.

Referring now to FIG. 42, there is shown a cross sectional schematic view of a cut out of a coaxial neutron detector; neutron absorbing material 202 takes the form of a series of angled washers 202; reaction products may escape both sides of each neutron absorber 202 concurrently and can be measured in the non-reactive gas region simultaneously; an electrically conductive grid 215 is disposed between the neutron absorber washers 202 and a thin anode wire 204; the grid 215 assists with charge collection.

Figure 43:
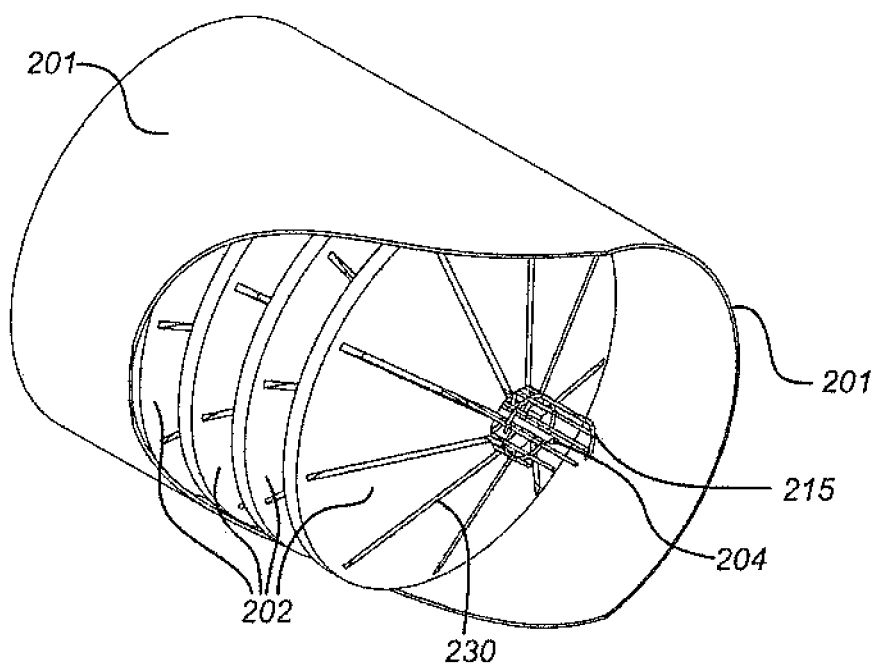
FIG. 43 is a cross section schematic view with a cut out of the detector; the neutron absorber is a series of angled washers with thin slots cut into the washer to increase the electric field axially in the detector; there is an electrically conductive grid between the angled washers and the thin anode wire, which is not required; the grid assists in charge collection in the detector.

Referring now to FIG. 43, there is shown a cross section schematic view with a cut out of yet another detector; a neutron absorber 202 takes the form of a series of angled washers 202 with thin slots 230 cut into each washer 202 to increase transport and electric field strength axially in the detector; an electrically conductive grid 215 is disposed between the angled washers 202 and a thin anode wire 204; the grid 215 assists in charge collection in the detector.

Figure 44:
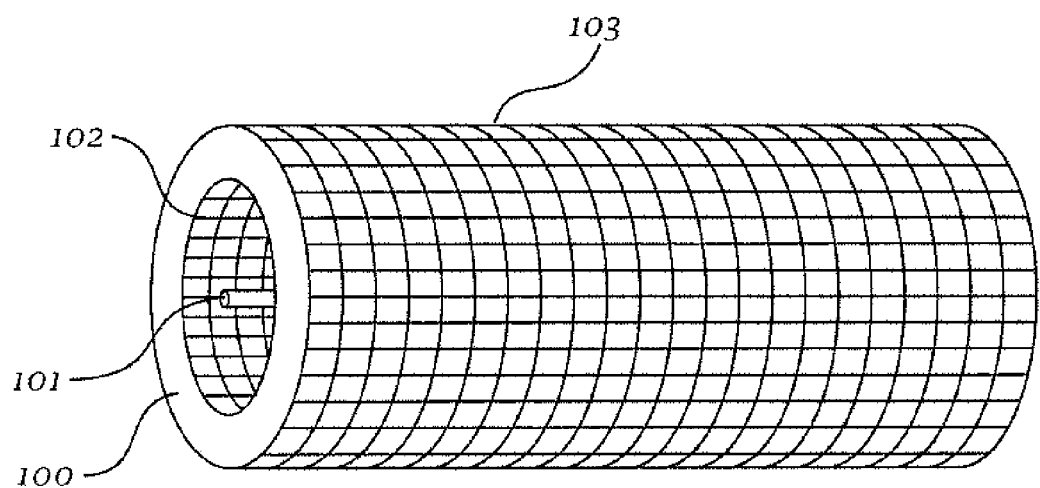
FIG. 44 is an isometric view of a removable detector neutron reactive absorber section composed of an outer electrode grid, and inner electrode grid, and an innermost anode wire.

Referring now to FIG. 44, there is shown a partial side view of a removable detector neutron reactive absorber section 100 composed of an outer electrode grid 103, an inner electrode grid 102, and an innermost anode wire 101. The removable neutron detector section 100 can be inserted into a gas-filled chamber to perform as a neutron detector.

Figure 45:
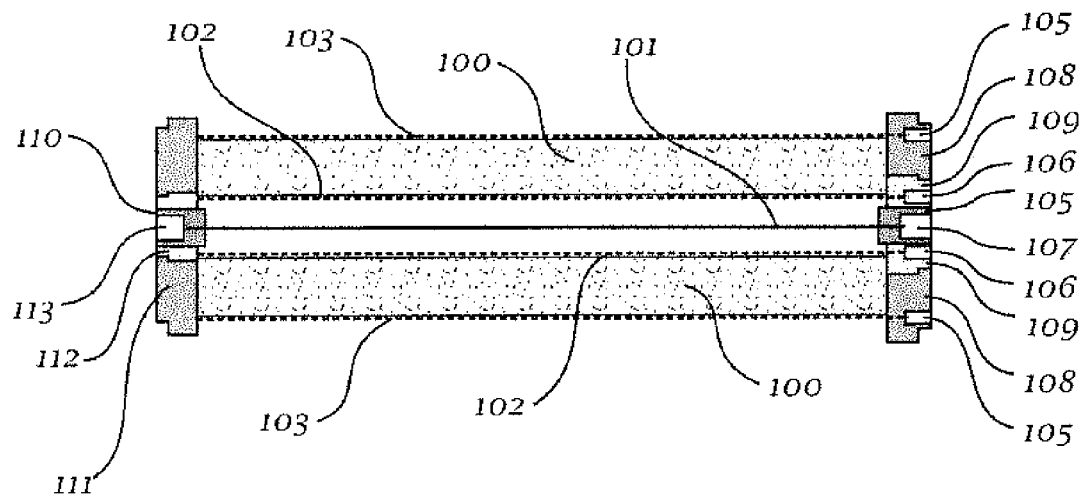
FIG. 45 is a sectional view of a side section of a removable detector neutron reactive absorber section composed of an outer electrode grid, and inner electrode grid, and an innermost anode wire and indexing sockets; the removable section can be inserted into a detector cavity to form a neutron detector.

Referring now to FIG. 45, there is shown a sectional view of a side section of a removable detector neutron reactive absorber section 100 composed of an outer electrode grid 103, an inner electrode grid 102, an innermost anode wire 101 and indexing sockets 105, 106 and 107; the removable section 100 can be inserted into a detector cavity to form a neutron detector. The detector indexing sockets 105, 106 and 107 can serve as electrical connectors to the outer grid 103, the inner grid 102 and the anode 101. The detector indexing sockets 105, 106 and 107 are separated by insulators 108, 109, and 105. In one method of operation, the outer electrode 103 is grounded, the inner electrode 102 is positively biased and the anode 101 is positively biased with respect to the inner electrode 102. Neutrons interact in neutron reactive material and eject reaction products into the detector gas. The bias applied to the outer electrode 103 and the inner electrode 102 assists with extraction of electrons from the neutron absorber material. Electrons excited in the gas by the reaction products are accelerated towards the anode 101 and produce an avalanche of electron-ion pairs. Positive ions are then attracted to the inner grid 102, at which they are neutralized. The absorber material may be an ultra-low-density material, such as aerogel, foam, and/or filamentary materials; the absorber material may be a low-density material, such as Li metal. The neutron absorber material may be composed of boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 46:
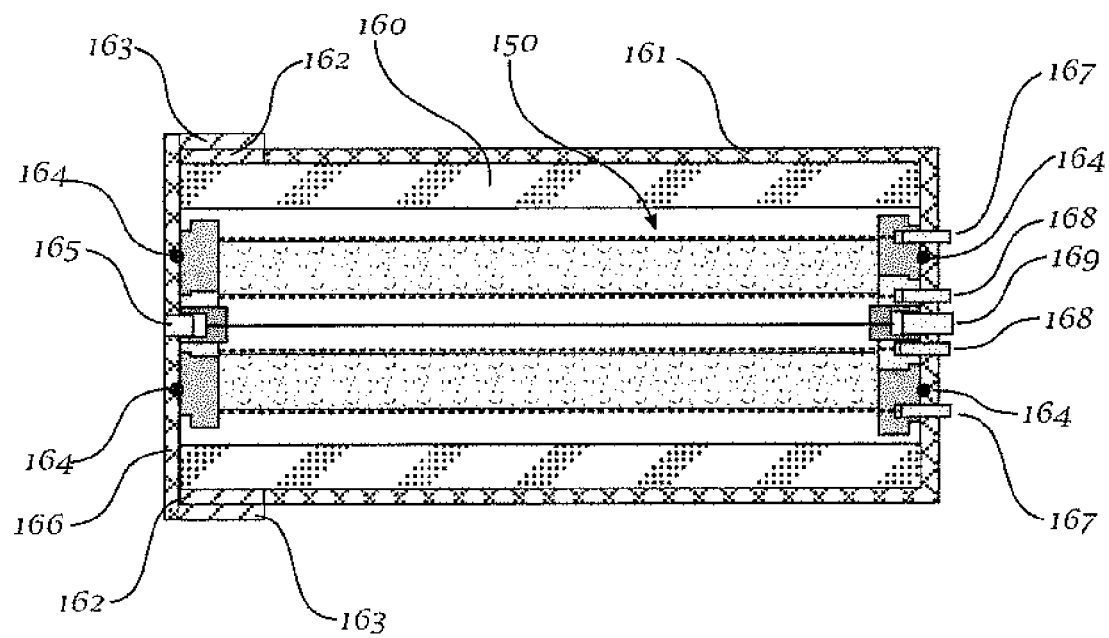
FIG. 46 is a sectional view of a side section of a removable detector neutron reactive absorber section of FIG. 45, composed of an outer electrode grid, and inner electrode grid, and an innermost anode wire and indexing sockets as inserted into a type of enclosure filled with gas; the removable section can be inserted into a detector cavity to form a neutron detector.

Referring now to FIG. 46, there is shown a sectional view of a side section of a removable detector neutron reactive absorber section 150 (i.e., 100 of FIG. 45), composed of an outer electrode grid, an inner electrode grid, an innermost anode wire and indexing sockets as inserted into a type of enclosure 161 filled with gas; the removable detector section 150 can plug into electrical sockets and stems 167, 168, and 169 to provide indexing and voltage to the removable section 150. O-rings 164 keep the removable detector section 150 snug and in place. A lid 166 screws onto the enclosure 161 via threads 163 and 162. An indexing pin 165 keeps the removable section 150 centered in the enclosure 161. A moderator 160 can be inserted into the enclosure 161 around the removable section 150, thereby, providing a means to slow down fast neutrons. Examples of moderators include hydrogenous material such as high density polyethylene (HDPE).

Figure 47:
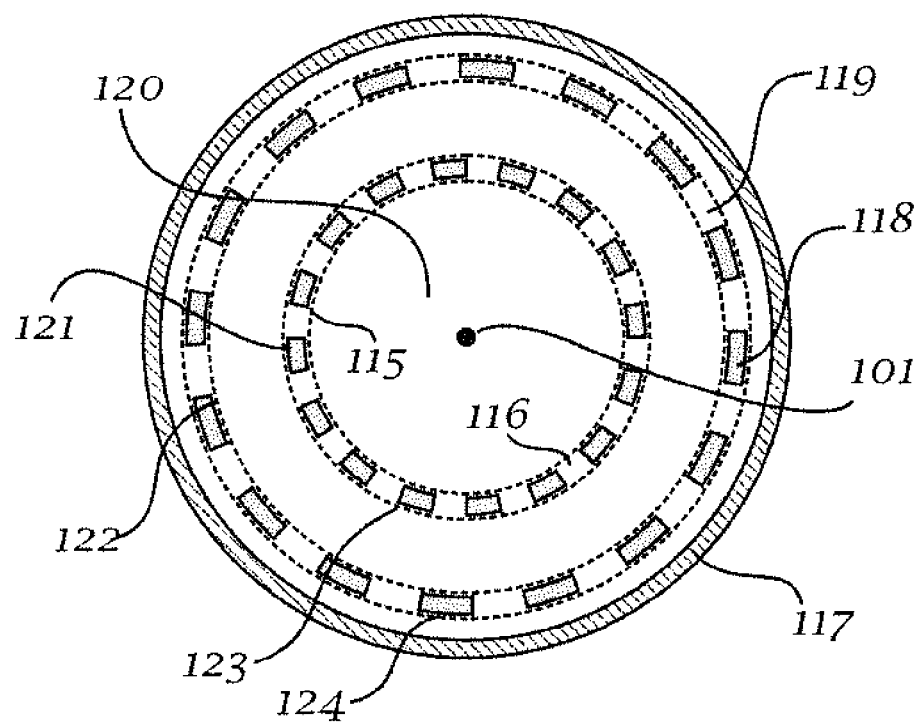
FIG. 47 is a sectional view of a cross section of a neutron detector composed of a plurality of neutron reactive absorbers encased in wire mesh; with additional portals in the neutron absorbers to allow for free transport of electrons to the central anode wire.

Referring now to FIG. 47, there is shown a sectional view of a cross section of a preferred embodiment of a neutron detector composed of neutron reactive absorbers 118 and 121 encased in wire mesh; the wire mesh is composed of screens 122 and 124 which encase the neutron absorber 118 and screens 115 and 123 which encase the neutron absorber 121; portals 119 and 116 in the neutron absorbers 118 and 121, respectively, allow for free transport of electrons to a central anode wire 101. Neutrons interact in the neutron reactive material of the absorbers 118 and 121 and eject reaction products into a detector gas in cavity 120. One mode of operation has the outer shell 117 grounded. A bias applied to the outer electrode grid 124 is positive with respect to the shell 117. The electrode grid 123 is positively biased with respect to the grid 122 and assists with extraction of electrons from the neutron absorber 118. The bias applied to the electrode grid 123 is positive with respect to the grid 122. The electrode grid 115 is positively biased with respect to the grid 123 and assists with extraction of electrons from the neutron absorber 121. Electrons excited in the gas by the reaction products are accelerated towards the anode 101 and produce an avalanche of electron-ion pairs. Positive ions are then attracted to the inner grid 115, to which they are neutralized. The slots or portals 119 and 116 in the absorbers 118 and 121, respectively, allow electrons to stream towards the anode 101. The absorber material may be an ultra-low-density material, such as aerogel, foam, filamentary materials; the absorber material may be a low-density material. The neutron absorber material may be composed of boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 48:
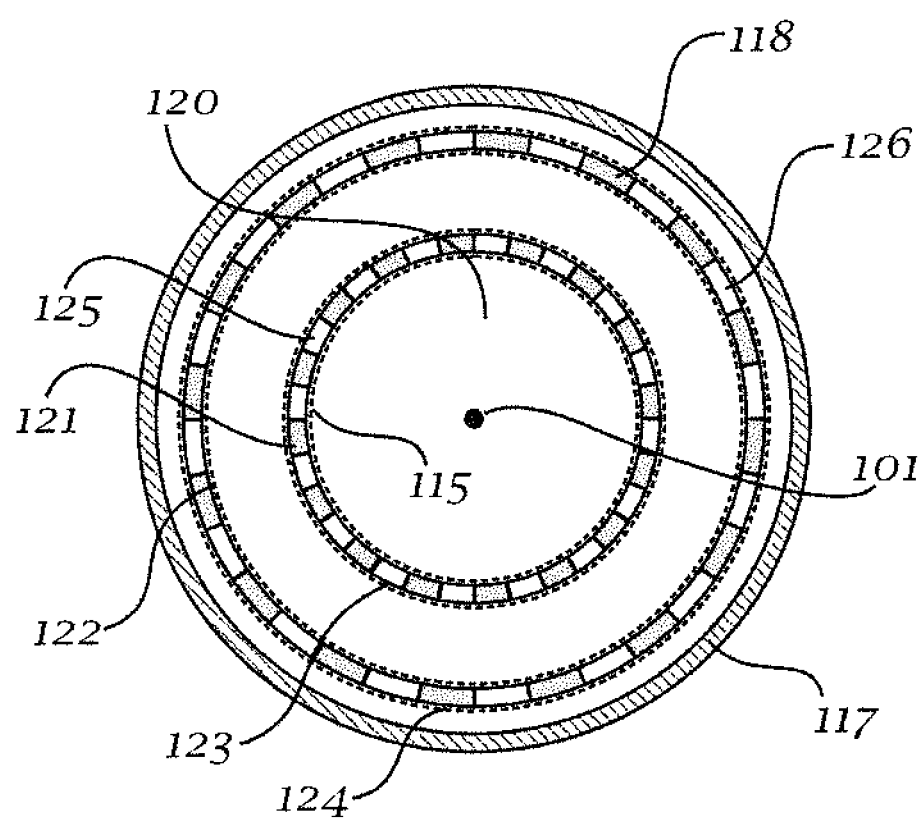
FIG. 48 is a sectional view of a cross section of a neutron detector composed of a plurality of neutron reactive absorbers encased in wire mesh; where there is more than one type of absorber.

Referring now to FIG. 48, there is shown a sectional view of a cross section of a preferred embodiment of a neutron detector composed of a plurality of neutron reactive absorbers 118 and 121 encased in wire mesh; the wire mesh is composed of screens 122 and 124 which encase the neutron absorbers 118 and screens 115 and 123 which encase the neutron absorbers 121; portals in the neutron absorbers 118 and 121 allow for free transport of electrons to a central anode wire 101. Neutrons interact in neutron reactive materials of the absorbers 118 and 121 and eject reaction products into the detector gas in cavity 120. One mode of operation has the outer shell 117 grounded. Bias applied to outer electrode grid 124 is positive with respect to the shell 117. The electrode grid 123 is positively biased with respect to the grid 122 and assists with extraction of electrons from the neutron absorber material of the absorber 118. Bias applied to the electrode grid 123 is positive with respect to the grid 122. The electrode grid 115 is positively biased with respect to the grid 123 and assists with extraction of electrons from the neutron absorber material of the absorber 121. Electrons excited in the gas by the reaction products are accelerated towards the anode 101 and produce an avalanche of electron-ion pairs. Positive ions are then attracted to the inner grid 115, at which they are neutralized. Additional absorbers 125 and 126 may act as moderators and can assist with neutron moderation. The absorber material may be an ultra-low-density material, such as aerogel, foam, filamentary materials; the absorber material may be a low-density material, such as Li metal. The neutron absorber material may be composed of boron-10, lithium-6 fluoride, lithium metal, lithium-6 metal, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of moderators include hydrogenous material such as high density polyethylene (HDPE).

In those embodiments disclosed in FIGS. 11-48 a common element taught is the incorporation of one or more objects or structure having large surface areas into a gas-filled detector, where these surfaces are coated with neutron reactive material, or the surfaces or surface portions are composed, at least partially, of neutron reactive material. The surfaces or surface portions are arranged in manner such that neutron streaming is minimal or eliminated when the detector is irradiated from a side of the detector. The surfaces may be flat or curved. The surface portions may be replaced with absorbers of low-density, ultra-low-density or ultra-thin materials acting as neutron absorbers. The surface portions may be replaced with absorbers of porous or filamentary material or a semi-solid material or aerogel. The incorporation of the extended surfaces coated with or composed of neutron reactive material increases the neutron detection efficiency of the gas-filled detectors over conventional coated designs.

Figure 49A:
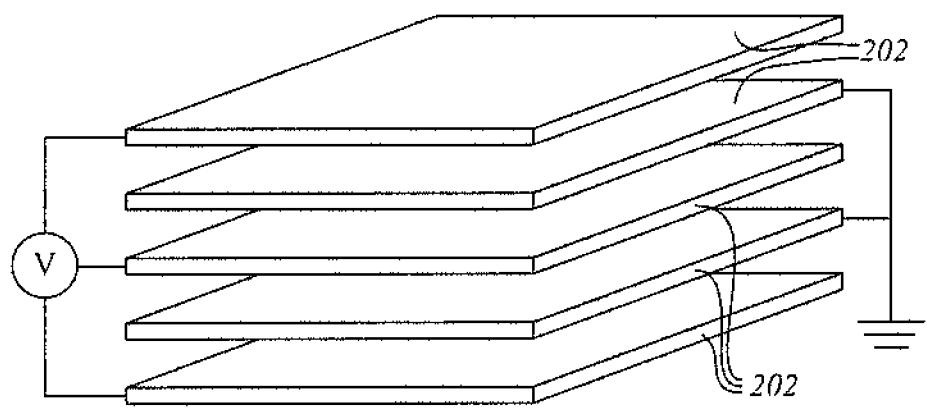
FIG. 49A shows a parallel plate detector consisting of Li foils spaced apart to make a series of stacked planes; the Li foils or absorber sheets act as both the cathode and the anode depending on the particular electrical connection; the absorber sheets are not limited in size or shape; the conductive sheets are supported with an insulating material that is minimally sensitive to neutrons, such as alumina ceramic.

FIG. 49a shows a parallel plate detector consisting of Li foils 202 spaced apart to make a series of stacked planes; the insides of the detector, the voltage bias is placed on every other layer of Li foil while the remaining foils are grounded, this creates the electric field between the sheets of foil to sweep out free charges generated from the reaction products traversing the gas-filled regions between the foils; the foils may be coated with a conductive metal such as copper to increase conductivity; the ultra-thin absorbers themselves do not need to be conductive if there is a conductive coating on the absorber sheets.

Figure 49B:
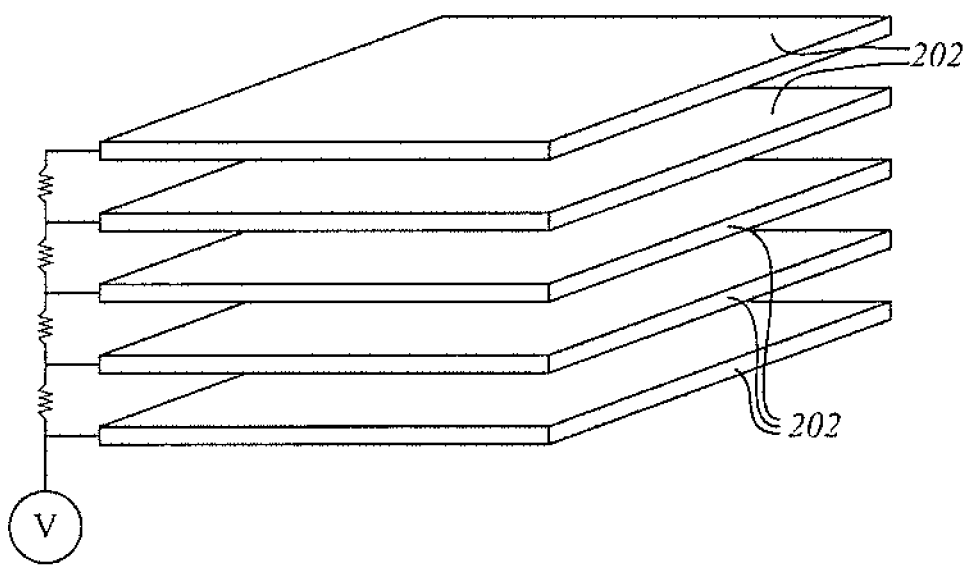
FIG. 49B shows the same structure as shown in FIG. 49a, but the electric field between each plate is substantially exactly the same magnitude; the Li foils or absorber sheets act as both the cathode and the anode depending on the particular electrical connection; the absorber sheets are not limited in size or shape; the conductive sheets are supported with an insulating material that is minimally sensitive to neutrons, such as alumina ceramic.

FIG. 49b shows the same structure as shown in FIG. 49a, but the electric field between each plate is substantially exactly the same magnitude; this is achieved by placing resistors in series such that the voltage drop across each resistor is the same, thus creating substantially the same magnitude of electric field between each plane.

Figure 50:
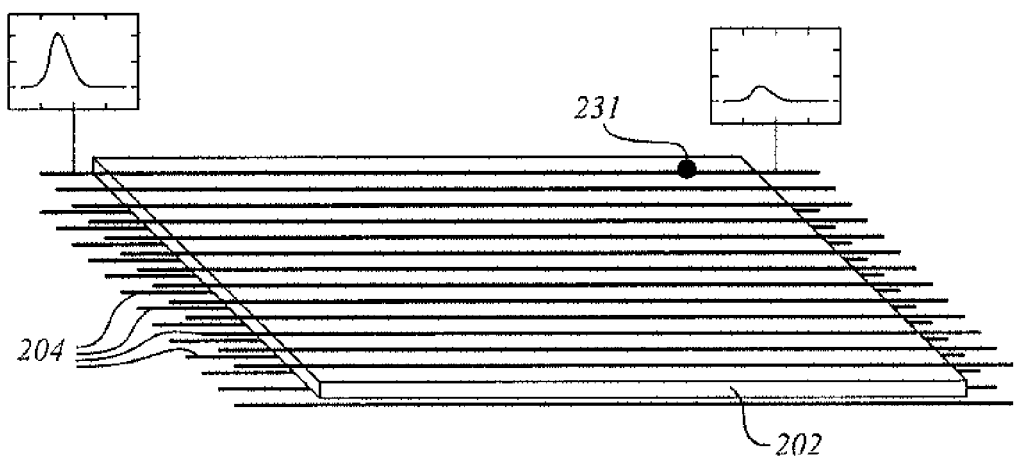
FIG. 50 illustrates a neutron imaging system using a neutron absorbing material such as Li foil; the size and shape of the imaging system is not limited.

FIG. 50 illustrates is a neutron imaging system using a neutron absorbing material such as Li foil; anode wires 204 are strung across the surface of the Li foil 202 which also behaves as an electrical ground plane; a voltage is applied to both ends of the anode wire and if a neutron interaction 231 occurs in the foil the pulse height at each end of the wire will be different because the charges will travel different lengths and thus induce a different amount of charge, as shown in the inset graphs; several layers of anode wires may be used in conjunction with multiple Li foil layers; the anode wires do not all have to run the same direction; the distance between the absorber planes may be less than the reaction product ranges; the neutron absorber sheets do not need to be in planar layout, but may form a corrugated, chevron, or sinusoidal pattern.

Figure 51:
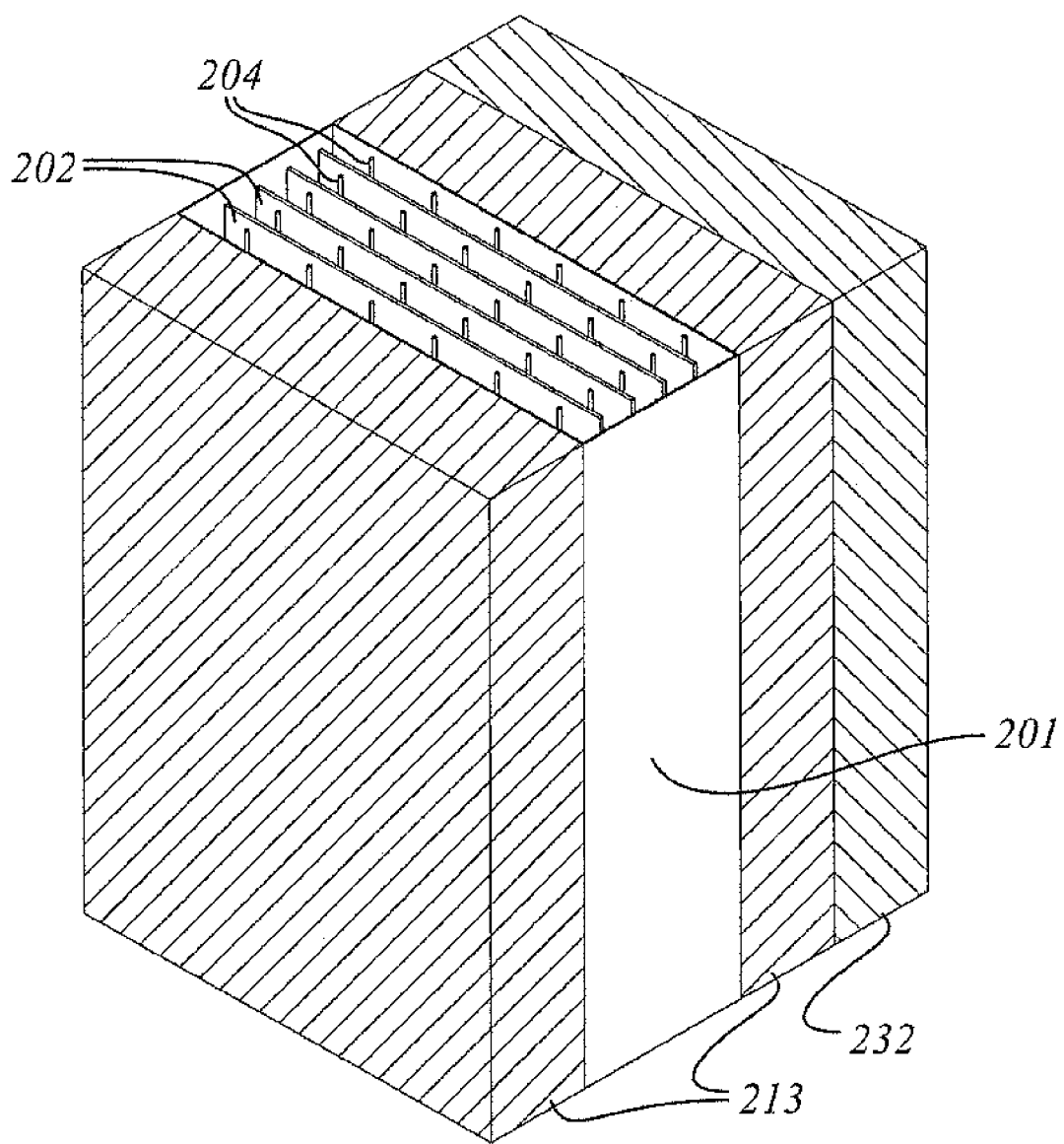
FIG. 51 illustrates a multi-wire proportional counter containing neutron absorber sheets positioned between banks of anode wires and housed on a structural enclosure; the detector is surrounded by moderator where at least a portion of the moderator is also a scintillation material that may double as a gamma ray sensitive region and a neutron moderator, one example of this material is a plastic scintillator.

FIG. 51 illustrates a multi-wire proportional counter containing neutron absorber sheets 202 positioned between banks of anode wires 204 and housed on a structural enclosure 201; the top of the detector removed as to expose the inner schematic of the detector; neutron moderator is included 213 on both front and back of the detector, but more moderators in other forms may be included; an additional sheet of moderator 232 is included that may also have scintillation properties when exposed to gamma-rays; one example of this material may be a plastic scintillator.

Figure 52:
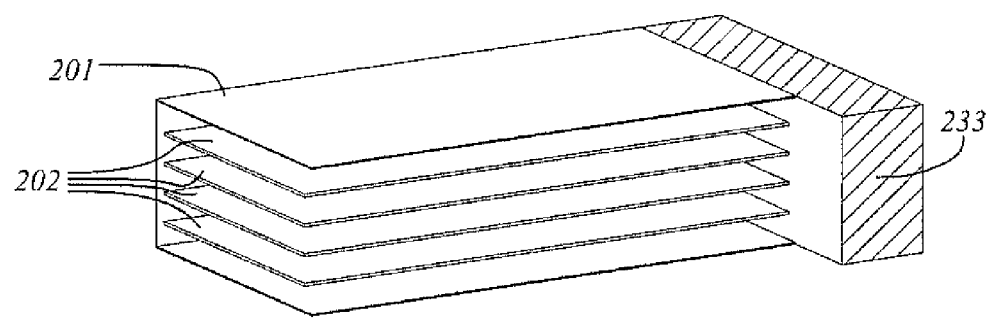
FIG. 52 is a schematic illustration with portions removed of a scintillation neutron detector; absorber sheets of thin material are stacked in a light tight enclosure; the reaction products escaping the neutron absorber sheets excite the scintillation gas; the absorber sheets may be thin absorber sheets such as Li foil or Mylar coated with a neutron reactive material; the absorber sheets may also be low density high porosity materials such as impregnated foam or aerogel or any other absorber material such that there is a probability that more than one reaction product can escape the absorber sheet concurrently; the reaction products may be measured simultaneously.

FIG. 52 is a schematic illustration with portions removed of a scintillation neutron detector; ultra-thin neutron absorbers 202, or low-density high-porosity absorber sheets, are placed in a light tight enclosure 201; the volume within 201 is filled with a scintillating gas, such as Xe; as the reaction products traverse the space between the absorber sheets they excite the gas and upon de-excitation light is emitted; the emitted light is collected at a light sensitive device 233 such as a photomultiplier tube or a photodiode.

Figure 53:
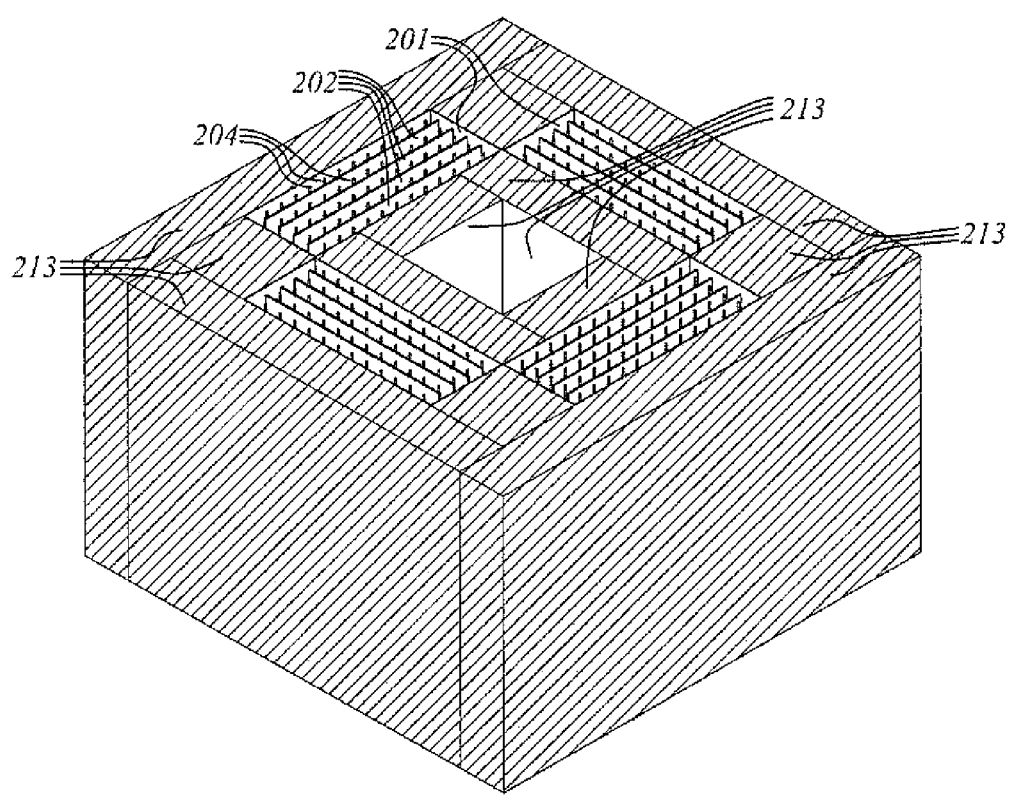
FIG. 53 is an isometric view of a neutron multiplicity counter containing multi-wire proportional counter neutron detectors and neutron moderator.

FIG. 53 is an isometric view of a neutron multiplicity counter containing multi-wire proportional counter neutron detectors and neutron moderator; the pattern of the detectors is not restricted to square, but could be trigonal, hexagonal, or contain a bottom and/or top detector; the detectors' top sections have been removed to view the inner components of each detector comprising the anode wires 204, absorber sheets 202, and detector housing 201. The neutron absorbers inside the detectors are not limited to planar patterns.

Figure 54A:
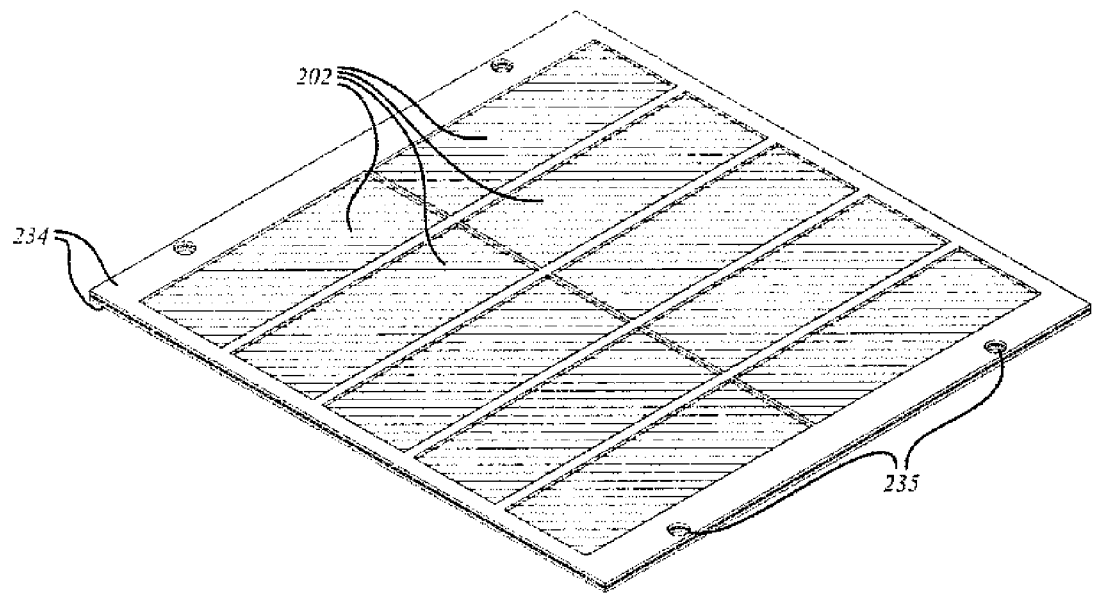
FIG. 54a is an isometric view of a thin neutron absorber sheet supported between two frames.

FIG. 54a is an isometric view of a thin neutron absorber sheet 202 supported between two frames 234 with locations for fasteners 235 to hold the frames 234 securely together.

Figure 54B:
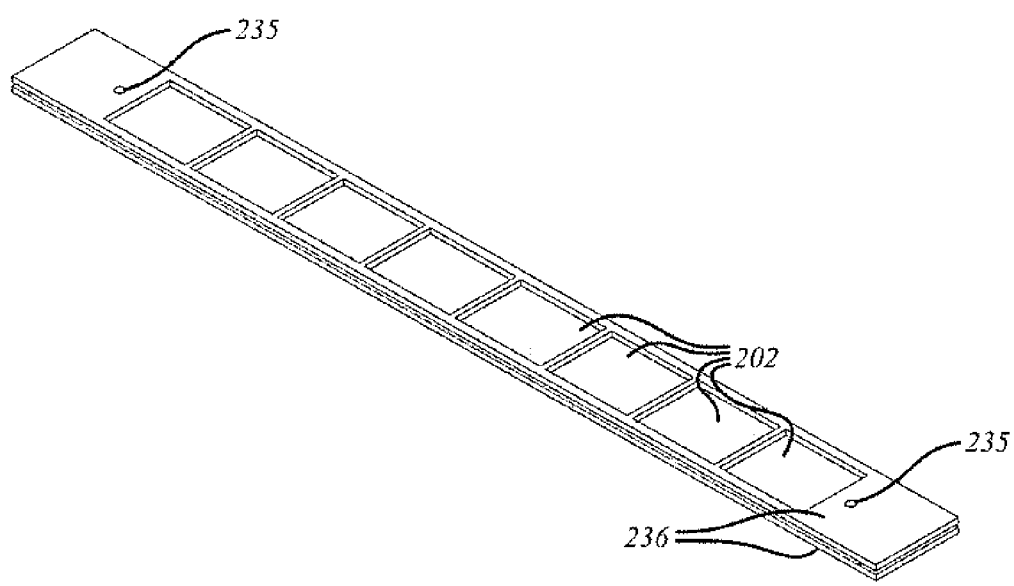

FIG. 54b is an isometric view of a smaller embodiment of a similar design as shown in FIG. 54a. Instead of frames 234, frames 276 are provided.

Figure 55:
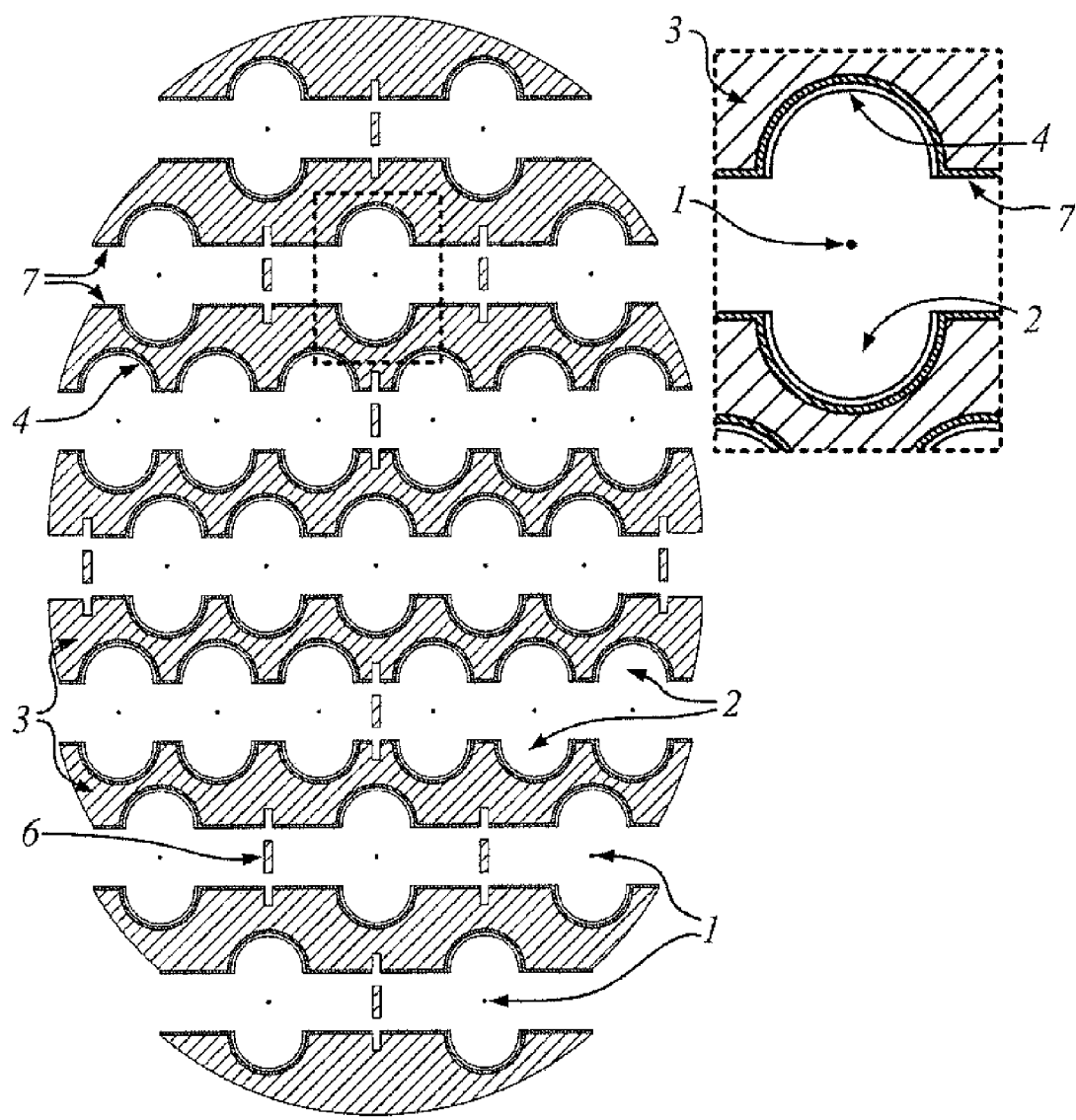
FIG. 55 is an exploded top view of a schematic of a series of neutron moderator sections that may be coated with an electrically conductive material together with an enlarged section.

FIG. 55 is an exploded top view of a schematic of a series of neutron moderator sections 3 that may be coated with an electrically conductive material 7 and still coated further with a neutron absorber coating 4. The sections are positioned together using a key 6 and when collapsed the cavities form tubes of coated neutron detectors with anode wires 1 positioned centrally down each cavity 2; an enlarged view of a portion of opposing sections 3 is shown in the upper right-hand corner of FIG. 55.

Figure 56:
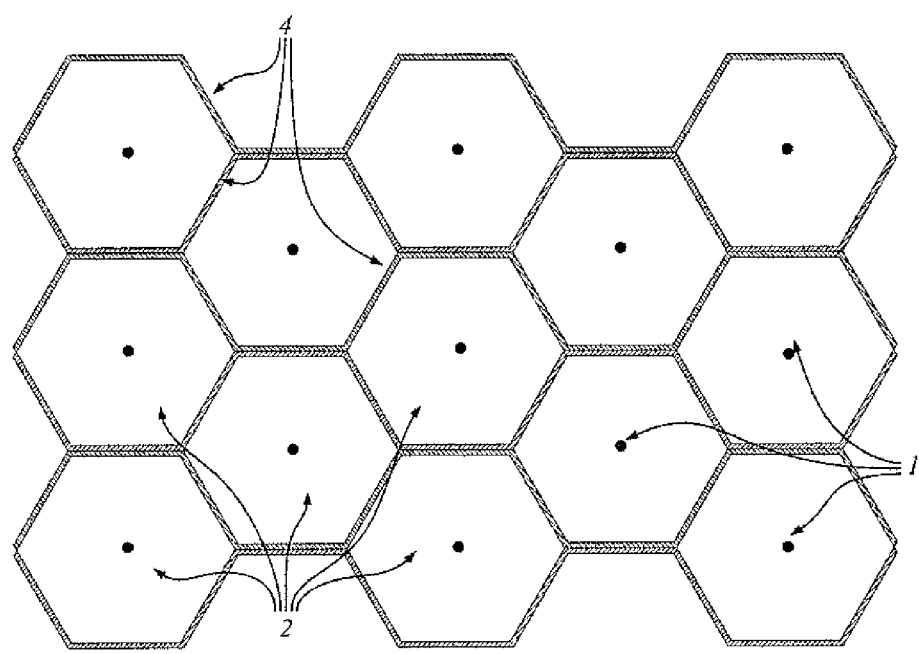
FIG. 56 is a top view of a schematic of a series of neutron absorber sheets pre-pressed in such a way that when brought together they form hexagonally shaped cavities; the pre-pressed sheets are not limited to hexagonal patterns or shapes.

FIG. 56 is a top view of a schematic of a series of neutron absorber sheets 4 pre-pressed in such a way that when brought together they form hexagonally shaped cavities 2. It is to be understood that while FIG. 56 shows hexagonal geometry, other geometries or shapes are possible including other interlocking and non-interlocking geometries. The sheets 4 may be designed such that reaction products can escape both sides of the absorber sheets 4, even when absorber sheets 4 are double thick in locations when the pre-pressed sheets 4 are joined together.

Figure 57:
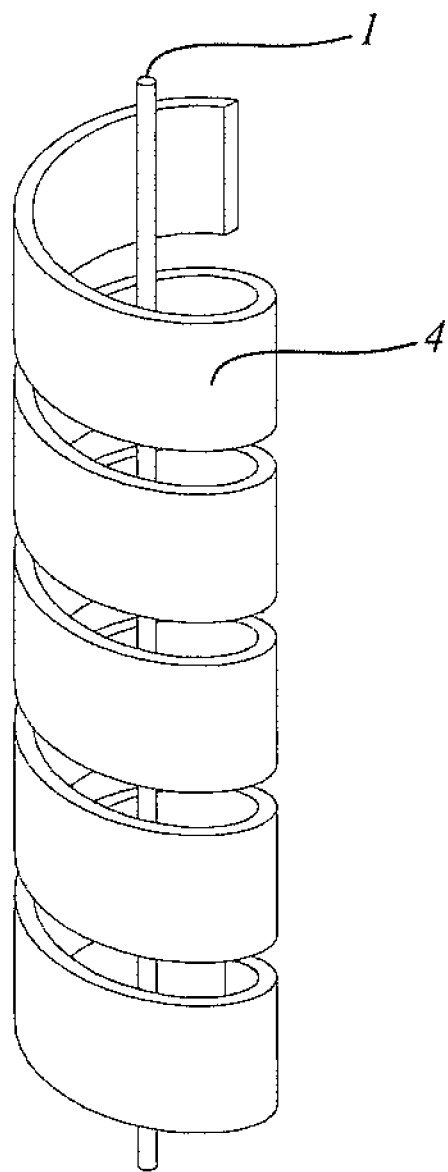
FIG. 57 is an isometric expanded view of thin neutron absorber material spiraled together and an anode wire positioned centrally down the center of the resulting tube.

FIG. 57 is an isometric expanded view of thin neutron absorber material spiraled together 4 and an anode wire 1 positioned centrally down the center of the resulting tube. When the spiral is collapsed it forms a cylindrical tube. When forming a cylindrical tube, the design is not limited to the spiral pattern, but any method may be used to form a cavity where a centrally positioned anode wire would suffice such that all free ions generated from reaction product interaction would be collected.

Figure 58:
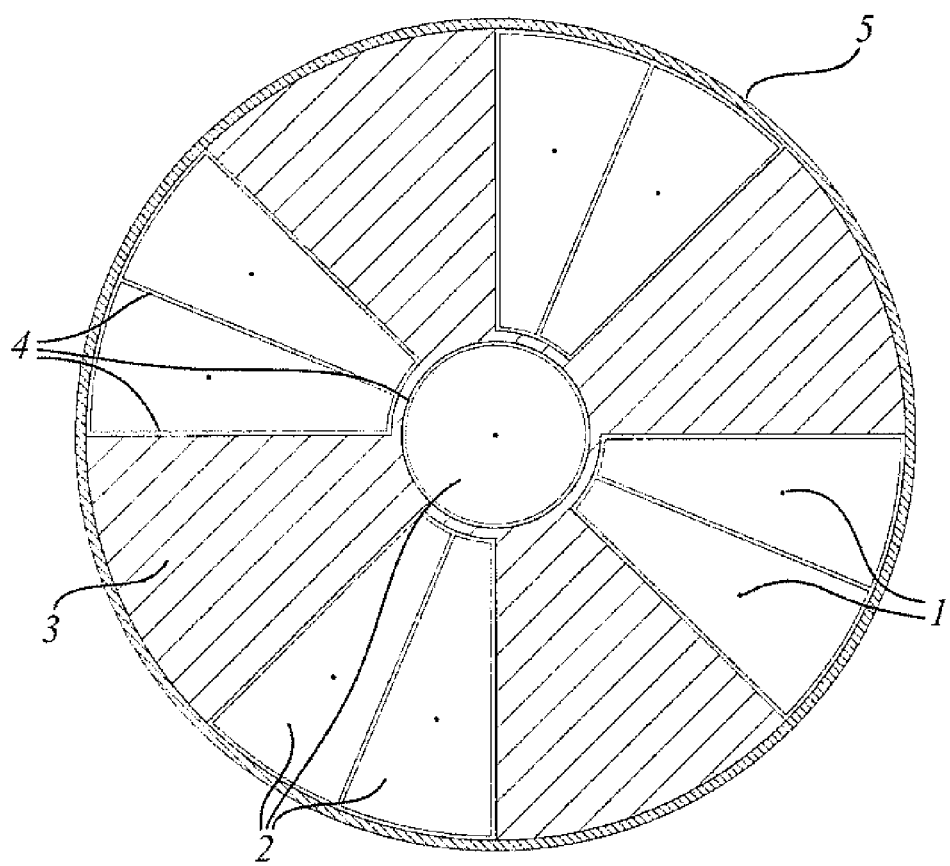
FIG. 58 is a cross-sectional top view of detector containing a neutron moderator in section and neutron absorbing material and cavities backfilled with a proportional gas.

FIG. 58 is a cross-sectional top view of detector containing a neutron moderator 3 in section and neutron absorbing material 4 and cavities 2 are backfilled with a proportional gas. In these cavities 2 anode wires 1 collect free charges generated from reaction product interaction.

Figure 59:
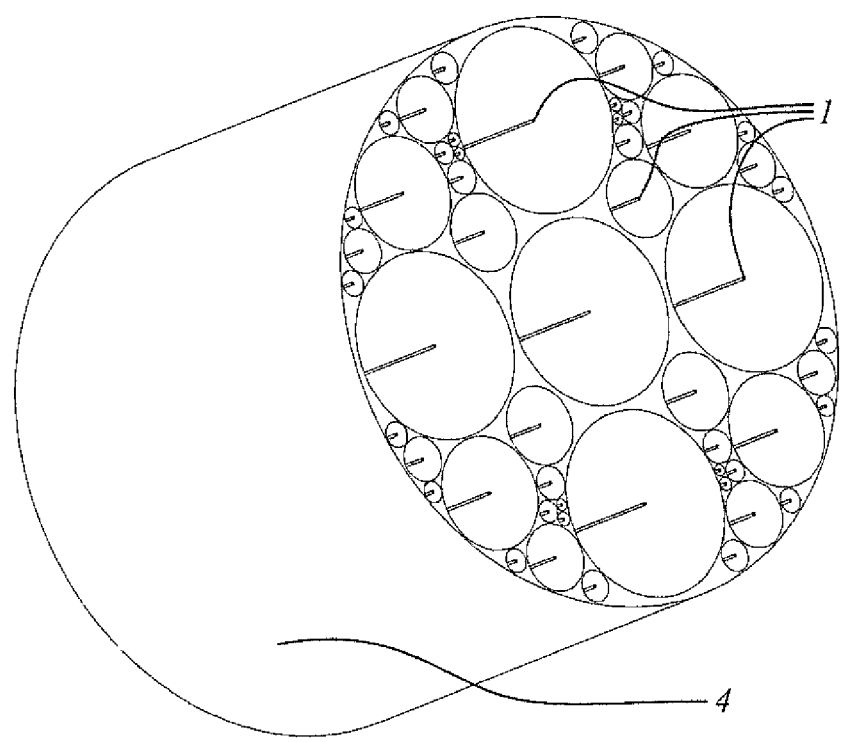
FIG. 59 is an isometric view of a portion of a detector wherein an ingot of neutron absorbing material has a series of cavities removed and an anode wire is positioned down the center of each cavity.

FIG. 59 is an isometric view of a portion of a detector wherein an ingot 4 of neutron absorbing material has a series of cavities removed and an anode wire 1 is positioned down the center of each cavity. The removed sections do not all need to be the same size and can be spaced such that there is a chance for reaction products to escape concurrently and be measured in the gas region simultaneously.

The ultra-thin material may include a conducting, semi-conducting, semi insulating, or insulating substrate which a neutron reactive material composed of at least one of elemental enriched, or compound forms of tithium boron, gadolinium, cadmium uranium, plutonium, and thorium deposited on at least one side or portion of the substrate. An example of this material may be $^6$LiF deposited on Biaxially-oriented polyethylene terephthalate (BoPET) with an aluminum coating.

Detector Uses:

The compartmentalized neutron detectors can be used at numerous facilities where neutron measurements are important in the energy range usually characterized by cold to epi-thermal neutrons. High density polyethylene (HDPE) plates in front, behind, or embodying sections of the detector can be used to thermalize fast neutrons and provide some energy information on the incident neutron field. Selectively chosen collimator holes in the HDPE can assist with directional sensitivity. The new devices can be fabricated because of the advances realized with aerogel, impregnated-foam, and Li foil technologies. Other types of foils may be used such as alloyed foils, perforated foils and reinforced foils. Furthermore, the technology described is relatively inexpensive to fabricate and deploy.

The compartmentalized neutron detectors can be used in harsh environments, such as oil-well logging and nuclear reactor controls. The compartmentalized neutron detectors can be used for homeland security monitoring of special nuclear materials and nuclear weapons. The compartmentalized neutron detectors can also be used for neutron research and can be deployed at neutron scattering institutions such as the Spallation Neutron Source in Oak Ridge, Tenn. The detectors of at least one embodiment of the present invention can be used as handheld, stand-alone, or back-pack neutron detector systems or integrated into multi-radiation detection systems.

The compartmentalized neutron detectors are unique and different from prior art for many reasons. Unlike common $^3$He and $^{10}$BF$_3$ gas-filled neutron detectors, the compartmentalized neutron detector does not need to be pressurized to increase neutron detection sensitivity. Unlike prior art coated neutron detectors, such as $^{10}$B-lined gas-filled detectors, in which only one reaction product can enter the detection gas, more than one reaction product from a single neutron interaction can enter the detector gas for compartmentalized neutron detectors. Unlike prior art neutron detectors with simple coated "washer" inserts that are only sensitive to neutrons from one direction, compartmentalized neutron detectors are designed to be sensitive to neutrons from multiple directions with a reduction or elimination of neutrons streaming through the device that do not intersect the neutron reactive materials. Unlike prior art coated neutron detectors, such as $^{10}$B-lined gas-filled detectors with coatings on the outer wall, compartmentalized neutron detectors have multiple neutron reactive surfaces and inserts that allow for a large increase in neutron detection efficiency. Unlike prior art coated neutron detectors, the compartmentalized neutron detectors can have the compartments built too small for background radiation to deposit enough energy to be measured, while the compartments are still large enough for the reaction products from the neutron reactive material to deposit enough energy to be measured, thereby reducing or eliminating background radiation interference.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. Apparatus for efficiently detecting neutrons, the apparatus comprising:
a detector cavity in which a detector gas is contained;
at least one object formed of non-porous material disposed within the cavity, wherein at least surface portions of the at least one object include neutron reactive material and wherein the surface portions are sized and arranged in the cavity to reduce or prevent neutron streaming through the cavity, the material absorbing neutrons and the at least one object releasing fewer than all ionizing radiation reaction products resulting from absorbed neutrons into the gas; and
a plurality of electrodes including at least one anode and at least one cathode for generating an electric field within the cavity upon the application of a voltage to the electrodes.

2. The apparatus as claimed in claim 1, wherein the at least one object includes one or more inserts, each of the inserts having a substrate portion.

3. The apparatus as claimed in claim 2, wherein each substrate portion is composed of neutron reactive low or ultra-low density, non-porous material that allows one or more reaction products to be released into the surrounding gas for each neutron interaction event.

4. The apparatus as claimed in claim 2, wherein each substrate portion is composed of low density neutron reactive material that allows one or more reaction products to be released into the surrounding gas.

5. The apparatus as claimed in claim 2, wherein each insert is neutron reactive and is composed of at least one of insulating, semi-insulating, semiconducting and conducting materials to ensure that the insert does not disrupt the electric field within the cavity.

6. The apparatus as claimed in claim 2, wherein each insert is arranged geometrically within the cavity to reduce or prevent neutron streaming through the cavity.

7. The apparatus as claimed in claim 1, wherein the neutron reactive material includes at least one of elemental, enriched and compound forms of lithium, gadolinium, cadmium, uranium, plutonium and thorium.

8. The apparatus as claimed in claim 1, wherein the surface portions are composed of neutron reactive low or ultra-low density material that allows substantially one or more reaction products to be released into the surrounding gas.

9. The apparatus as claimed in claim 8, wherein the neutron reactive low or ultra-low density material includes at least one of elemental, enriched or compound forms of lithium, gadolinium, cadmium, uranium, plutonium and thorium.

10. The apparatus as claimed in claim 1, wherein the at least one object has a substrate portion composed of neutron reactive low or ultra-low density material and wherein the substrate portion releases charged particles and light or photons that interact with the detector gas.

11. The apparatus as claimed in claim 1, further comprising a plurality of subcompartments disposed within the cavity and which restrict the ranges of the reactive products.

12. The apparatus as claimed in claim 1, wherein each object comprises a thin foil of neutron reactive material.

13. The apparatus as claimed in claim 1, wherein each object comprises a thin sheet of neutron reactive material.

14. The apparatus as claimed in claim 1, wherein each object includes a thin sheet of material coated with a thin layer of neutron reactive material.

15. Apparatus for efficiently detecting neutrons, the apparatus comprising:
a plurality of walls at least partially defining a detector cavity which encloses a detector gas, the walls of the cavity being operable as an outer electrode;
a thin conductive wire disposed within the cavity and operable as an inner electrode;
a conductive grid surrounding the thin wire and operable as an intermediate electrode; and
at least one object formed of non-porous material disposed within the cavity, wherein at least surface portions of the at least one object include neutron reactive material and wherein the surface portions are sized and arranged in the cavity to reduce or prevent neutron streaming through the cavity, the material absorbing neutrons and the at least one object releasing fewer than all ionizing radiation reaction products into the surrounding gas.

16. The apparatus as claimed in claim 15, further comprising a surface which at least partially defines the cavity and a coating of neutron reactive material on the surface.

17. The apparatus as claimed in claim 15, wherein the at least one object includes one or more inserts each of the inserts having a substrate portion.

18. The apparatus as claimed in claim 17, wherein the surface portions are coatings of neutron reactive materials on each substrate portion.

19. The apparatus as claimed in claim 18, wherein each insert and its respective coating have a total thickness less than summed ranges of the reaction products.

20. The apparatus as claimed in claim 17, wherein each substrate portion is composed of neutron reactive low or ultra-low density, non-porous material that allows one or more reaction products to be released into the surrounding gas.

21. The apparatus as claimed in claim 17, wherein each substrate portion is composed of neutron reactive low and ultra-low density material that allows one or more reaction productions to be released into the surrounding gas.

22. The apparatus as claimed in claim 17, wherein each substrate portion of each insert is composed of one or more conductive materials.

23. The apparatus as claimed in claim 17, wherein each substrate portion of each insert is composed of at least one of insulating, semi-insulating, semiconducting and conducting materials to ensure that the inserts do not disrupt the electric field within the cavity.

24. The apparatus as claimed in claim 17, wherein each insert is arranged geometrically within the cavity to reduce or prevent neutron streaming through the cavity.

25. The apparatus as claimed in claim 15, wherein the neutron reactive material includes at least one of elemental, enriched, or compound forms of lithium, gadolinium, cadmium, uranium, plutonium, and thorium.

26. The apparatus as claimed in claim 15, wherein the at least one object has a substrate portion, wherein the surface portions are coatings of the material on the substrate portion and wherein the coatings release charged particles and light or photons that interact with the detector gas.

27. The apparatus as claimed in claim 15, wherein the surface portions are composed of neutron reactive low or ultra-low density material that allows substantially one or more reaction products to be released into the surrounding gas.

28. The apparatus as claimed in claim 27, wherein the neutron reactive low or ultra-low density material includes at least one of elemental, enriched or compound forms of lithium, boron, gadolinium, cadmium, uranium, plutonium and thorium.

29. The apparatus as claimed in claim 27, wherein the surface portions are arranged geometrically within the cavity to reduce or prevent neutron streaming through the cavity.

30. The apparatus as claimed in claim 15, further comprising a plurality of subcompartments disposed within the cavity and which restrict the ranges of the neutron reaction products.

31. The apparatus as claimed in claim 15, wherein each object comprises a thin sheet of neutron reactive material.

32. The apparatus as claimed in claim 15, wherein each object includes a thin sheet of material coated with a thin layer of neutron reactive material.

33. The apparatus as claimed in claim 15, wherein each object comprises a thin foil of neutron reactive material.

34. Apparatus for efficiently detecting neutrons, the apparatus comprising:
a first surface which partially defines a detector cavity which encloses a detector gas, the first surface being operable as a first electrode;
a second surface which partially defines the cavity, the second surface being operable as a second electrode; and
a structure formed of non-porous material including a plurality of compartments filled with the gas and disposed within the cavity, wherein at least inner surface portions of the structure include neutron reactive material, wherein the surface portions are sized and arranged in the cavity to reduce or prevent neutron streaming through the cavity, the material absorbing neutrons and the structure releasing fewer than all ionizing radiation reaction products having ranges resulting from absorbed neutrons into the gas and wherein the compartments restrict the ranges of the reaction products and limit total energy deposited in the apparatus such that response signals from background radiation are reduced and substantially eliminated.

35. The apparatus as claimed in claim 34, wherein the electrodes are arranged and connected so that the apparatus operates as a single detector.

36. The apparatus as claimed in claim 35, wherein the structure includes substrate portions, and wherein the surface portions are coatings of the neutron reactive material on the substrate portions.

37. The apparatus as claimed in claim 36, wherein the substrate portions are composed of one or more conductive materials.

38. The apparatus as claimed in claim 35, wherein the neutron reactive material includes at least one of elemental, enriched or compound forms of lithium, gadolinium, cadmium, uranium, plutonium, and thorium.

39. The apparatus as claimed in claim 36, wherein the substrate portions are composed of at least one of insulating and semi-insulating materials to ensure that the structure does not disrupt the electric field within the cavity.

40. The apparatus as claimed in claim 35, wherein the structure includes substrate portions, wherein the surface portions are coatings of the neutron reactive material on the substrate portions and wherein the coatings release charged particles and light or photons that interact with the detector gas.

41. The apparatus as claimed in claim 35, wherein the surface portions of the structure are arranged geometrically within the cavity to reduce or prevent neutron streaming through the cavity.

42. The apparatus as claimed in claim 35, wherein the surface portions of the structure are composed of low or ultra-low density material.

43. The apparatus as claimed in claim 42, wherein the surface portions are arranged geometrically within the cavity to reduce or prevent neutron streaming through the cavity.

44. The apparatus as claimed in claim 35, wherein the structure includes substrate portions, wherein the surface portions are coatings of neutron reactive porous material and wherein the coatings release charged particles and light or photons that interact with the detector gas.

45. The apparatus as claimed in claim 34, wherein the electrodes are arranged and separated so that the apparatus operates as a detector array having a plurality of individual detectors.

46. The apparatus as claimed in claim 45, wherein inner surface portions of neighboring compartments include different neutron reactive material.

47. The apparatus as claimed in claim 46, wherein the surface portions are arranged geometrically within the cavity to reduce or prevent neutron streaming through the cavity.

48. The apparatus as claimed in claim 46, wherein inner surface portions of neighboring compartments include different neutron reactive porous material.

49. The apparatus as claimed in claim 45, wherein the structure includes substrate portions, wherein the surface portions are coatings of the at least one neutron reactive material on the substrate portions.

50. The apparatus as claimed in claim 49, wherein the substrate portions are composed of one or more conductive materials.

51. The apparatus as claimed in claim 49, wherein the substrate portions are composed of at least one of insulating and semi-insulating material to ensure that the structure does not disrupt the electric field within the detector cavity.

52. The apparatus as claimed in claim 49, wherein the surface portions of the structure are arranged geometrically within the cavity to reduce or prevent neutron streaming through the cavity.

53. The apparatus as claimed in claim 45, wherein the neutron reactive materials includes at least one of elemental, enriched or compound forms of lithium, gadolinium, cadmium, uranium, plutonium, and thorium.

54. The apparatus as claimed in claim 45, wherein the structure includes substrate portions, wherein the surface portions are coatings of the neutron reactive material on the substrate portions and wherein the coatings release charged particles and light or photons that interact with the detector gas.

55. The apparatus as claimed in claim 34, wherein each object comprises a thin foil of neutron reactive material.

56. The apparatus as claimed in claim 34, wherein each object includes a thin sheet of material coated with a thin layer of neutron reactive material.

57. The apparatus as claimed in claim 34, wherein each object comprises a thin sheet of neutron reactive material.

58. An array of gas-filled neutron detector modules coupled together to form a single detector comprising:
a detector cavity in which a detector gas is contained;
a plurality of objects formed of non-porous material disposed within the cavity, wherein at least surface portions of each of the objects include neutron reactive material and wherein the surface portions are sized and arranged in the cavity to reduce or prevent neutron streaming through the cavity, the material absorbing neutrons and the objects releasing fewer than all ionizing radiation reaction products resulting from absorbed neutrons into the gas; and a plurality of electrodes including at least one anode and at least one cathode for generating an electric field within the cavity upon the application of a voltage to the electrodes.

59. An imaging system for imaging neutron emissions, the system comprising:

an array of gas-filled neutron detectors, each of the detectors including:

a detector cavity in which a detector gas is contained;

at least one object formed of non-porous material disposed within the cavity, wherein at least surface portions of the at least one object include neutron reactive material and wherein the surface portions are sized and arranged in the cavity to reduce or prevent neutron streaming through the cavity, the material absorbing neutrons and the at least one object fewer than all ionizing radiation reaction products resulting from absorbed neutrons into the gas; and a plurality of electrodes including at least one anode and at least one cathode for generating an electric field within the cavity upon the application of a voltage to the electrodes.

60. An assembly for efficiently detecting neutrons, the assembly comprising:

a container and a plurality of gas-filled neutron detectors housed within the container, the detectors being arranged in the container to define an opening which receives a sample wherein at least two of the detectors operate in coincidence and wherein each of the detectors includes:

a detector cavity in which a detector gas is contained;

at least one object formed of non-porous material disposed within the cavity, wherein at least surface portions of the at least one object include neutron reactive material and wherein the surface portions are sized and arranged in the cavity to reduce or prevent neutron streaming through the cavity, the material absorbing neutrons and the at least one object releasing fewer than all ionizing radiation reaction products resulting from absorbed neutrons into the gas; and a plurality of electrodes including at least one anode and at least one cathode for generating an electric field within the cavity upon the application of a voltage to the electrodes.

* * * * *